(12) United States Patent
Padala et al.

(10) Patent No.: US 9,882,798 B2
(45) Date of Patent: Jan. 30, 2018

(54) METHOD AND SYSTEM THAT ANALYZES OPERATIONAL CHARACTERISTICS OF MULTI-TIER APPLICATIONS

(71) Applicant: VMware, Inc., Palo Alto, CA (US)

(72) Inventors: Pradeep Padala, Sunnyvale, CA (US); Neelima Mukiri, Palo Alto, CA (US); Mazda A. Marvasti, Coto de Caza, CA (US)

(73) Assignee: VMware, Inc., Palo Alto, CA (US)

( * ) Notice: Subject to any disclaimer, the term of this patent is extended or adjusted under 35 U.S.C. 154(b) by 331 days.

(21) Appl. No.: 14/711,648

(22) Filed: May 13, 2015

(65) Prior Publication Data

US 2016/0337226 A1    Nov. 17, 2016

(51) Int. Cl.
| | |
|---|---|
| *G06F 15/173* | (2006.01) |
| *H04L 12/26* | (2006.01) |
| *H04L 29/08* | (2006.01) |
| *G06N 7/00* | (2006.01) |
| *G06F 9/455* | (2006.01) |
| *H04L 29/14* | (2006.01) |

(52) U.S. Cl.
CPC .......... *H04L 43/10* (2013.01); *G06F 9/45558* (2013.01); *G06N 7/005* (2013.01); *H04L 67/10* (2013.01); *H04L 67/20* (2013.01); *H04L 67/2804* (2013.01); *H04L 69/40* (2013.01); *G06F 2009/45562* (2013.01); *G06F 2009/45595* (2013.01)

(58) Field of Classification Search
CPC ....... H04L 43/04; H04L 43/10; H04L 43/045; H04L 43/062; H04L 67/10; H04L 63/1433; G06N 7/005; G06F 9/45558; G06F 2009/45595

USPC .......................................................... 709/224
See application file for complete search history.

(56) References Cited

U.S. PATENT DOCUMENTS

| | | | |
|---|---|---|---|
| 8,688,620 B2* | 4/2014 | Viswanathan | G06F 11/076 706/62 |
| 9,083,734 B1* | 7/2015 | Bishop | G06F 11/3495 |
| 9,378,111 B2* | 6/2016 | Ramesh Coimbatore | G06F 11/328 |

(Continued)

*Primary Examiner* — Frantz Jean

(57) ABSTRACT

The current document is directed to an analysis subsystem within a large distributed computing system, such as a virtual data center or cloud-computing facility, that monitors the operational states associated with a multi-tiered application and provides useful information for determining one or more causes of various types of failures and undesirable operational states that may arise during operation of the multi-tiered application. In one implementation, the analysis subsystem collects metrics provided by various different types of metrics sources within the computational system and employs principal feature analysis to select a generally small subset of the collected metrics particularly relevant to monitoring a multi-tiered application and diagnosing underlying causes of operational states of the multi-tiered application. The analysis subsystem develops one or more conditional probability distributions with respect to the subset of metrics. These one or more conditional probability distributions, in turn, allow the analysis subsystem to provide useful information for analysis of the causes of failures and undesirable system states associated with the multi-tiered application.

21 Claims, 46 Drawing Sheets

(56) References Cited

U.S. PATENT DOCUMENTS

| | | | | |
|---|---|---|---|---|
| 2006/0020923 | A1* | 1/2006 | Lo | G06F 11/0709 |
| | | | | 717/127 |
| 2011/0078106 | A1* | 3/2011 | Luchi | G06F 11/3452 |
| | | | | 706/48 |
| 2011/0093853 | A1* | 4/2011 | Bobak | G06Q 10/06 |
| | | | | 718/100 |
| 2012/0054472 | A1* | 3/2012 | Altman | G06F 11/3419 |
| | | | | 712/219 |
| 2015/0127783 | A1* | 5/2015 | Lissack | H04L 41/5054 |
| | | | | 709/220 |
| 2016/0155098 | A1* | 6/2016 | McElhinney | G06F 11/0751 |
| | | | | 705/305 |
| 2016/0359872 | A1* | 12/2016 | Yadav | H04L 43/04 |

* cited by examiner

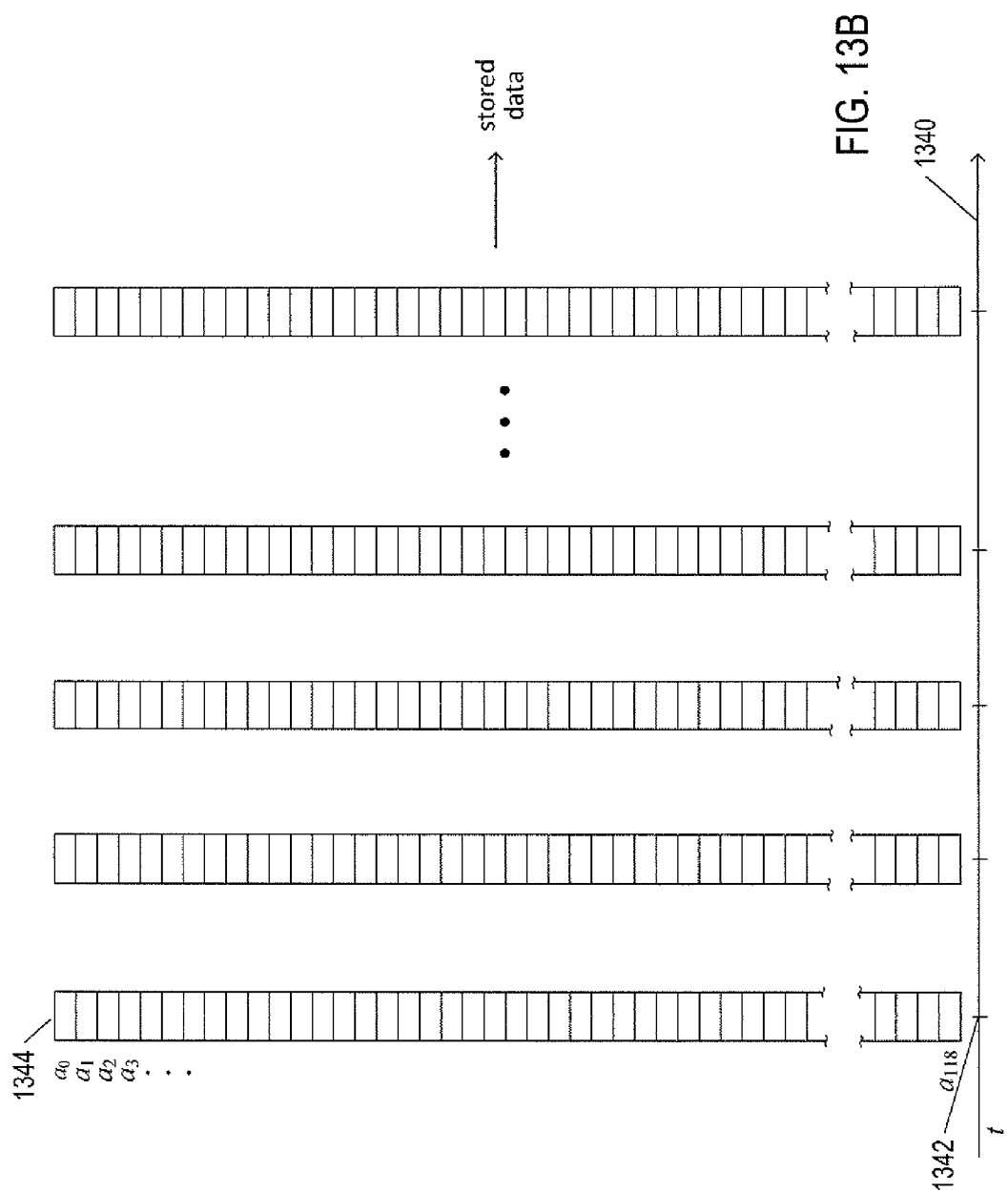

1402

| $\alpha_1$ | $\alpha_2$ | $\alpha_3$ |
|---|---|---|
| 4 | 4 | 12.8 |
| -6 | -1 | 8 |
| -2 | 12 | 2 |
| 3 | 9 | 6 |
| -4 | 4 | 8 |
| 4 | -8 | 7 |
| 5 | -5 | 2 |
| 4 | 6 | 11 |
| -5 | -7 | 9 |
| 1 | 3 | 12 |
| -5 | -6 | 11 |
| 6 | 3 | 3 |
| 7 | -2 | 8 |
| -1 | 1 | 13.5 |
| -3 | 9 | 6 |
| 2 | 7 | 10 |
| -4 | 8 | 1 |
| -4 | -2 | 4 |
| 4 | 1 | 8 |
| -7 | -3 | 6 |
| 3 | -10 | 9 |
| -3 | -6 | 5 |
| 5 | 4 | 1 |
| -4 | -7 | 7 |

FIG. 14A

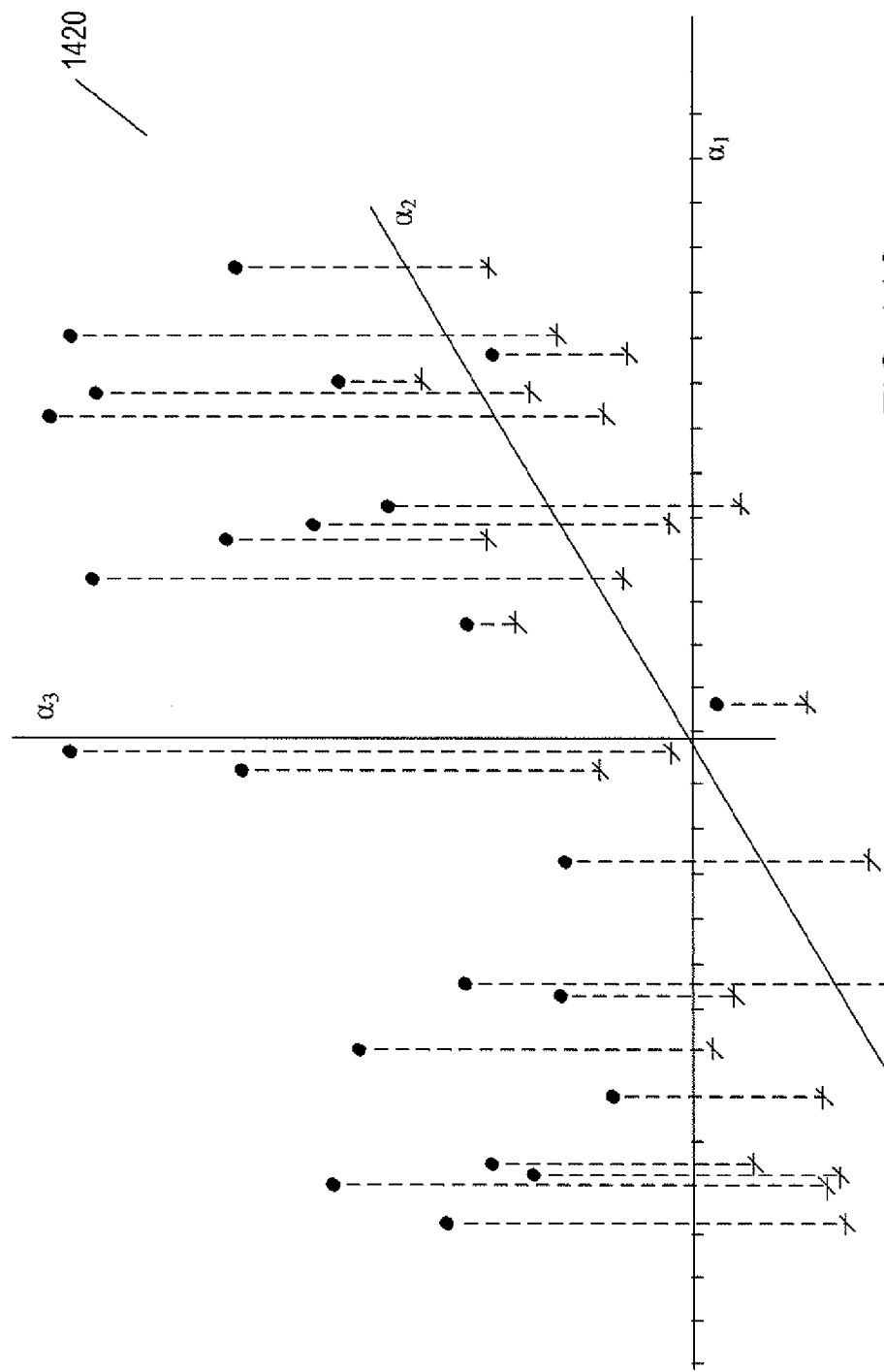

FIG. 15B

Assuming X represents random vector $\mathbf{X}^T$, where each $\mathbf{X}_i$ represents a sample of $\mathbf{X}^T$,
$C_{i,j} = \text{cov}(\mathbf{X}_i, \mathbf{X}_j) = E[(\mathbf{X}_i - \mu_i)(\mathbf{X}_j - \mu_j)]$ $Cv = \lambda v$ —— 1520
where $v$ = eigenvector of $C$; and
$\lambda$ = eigenvalue of $C$.

$Cv - \lambda v = 0$ —— 1522
$(C - \lambda I)v = 0$
$\det(C - \lambda I) = 0 \rightarrow (\lambda_1 - \lambda)(\lambda_2 - \lambda) \cdots (\lambda_p - \lambda)$ —— 1524

$V = [[v_1][v_2][v_3] \cdots [v_p]]$ —— 1526

$D = V^{-1}CV = \begin{bmatrix} \lambda_1 & & & & \\ & \lambda_2 & & & \\ & & \lambda_3 & & \\ & & & \lambda_4 & \\ & & & & \ddots \\ & & & & & \lambda_p \end{bmatrix}$ —— 1528

$g_j = \sum_{k=1}^{j} D'_{k,k}$ —— 1532 choose $q$ such that $g_q \geq$ threshold $(g_p)$ —— 1534

$D' = \begin{bmatrix} \lambda'_1 & & & & \\ & \lambda'_2 & & & \\ & & \lambda'_3 & & \\ & & & \lambda'_4 & \\ & & & & \ddots \\ & & & & & \lambda'_p \end{bmatrix}$ —— 1530 where each $\lambda'_i \in \{\lambda_i\}$ and $\lambda'_1 \geq \lambda'_2 \geq \lambda'_3 \cdots \geq \lambda'_p$ $V' = [[v'_1][v'_2][v'_3] \cdots [v'_p]]$ —— 1531

FIG. 15C

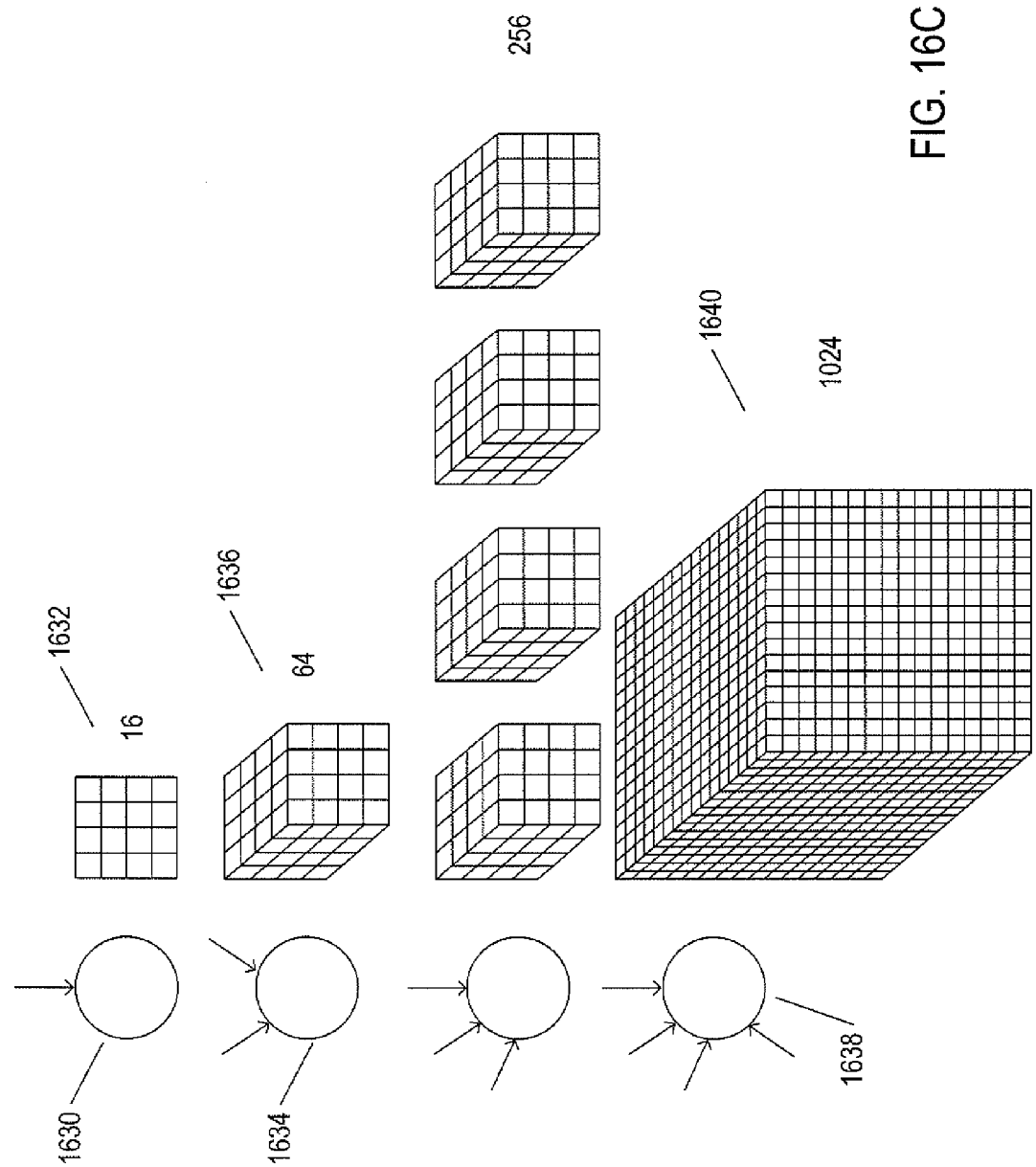

$Ia_1,a_3 + Ia_1,a_5 + Ia_5,a_6 + Ia_2,a_3 + Ia_1,a_3 + Ia_3,a_4 =$ weight of spanning tree $w$
$w \geq w$ of any other possible spanning tree

METHOD AND SYSTEM THAT ANALYZES OPERATIONAL CHARACTERISTICS OF MULTI-TIER APPLICATIONS

TECHNICAL FIELD

The current document is directed to virtualization layers and methods and, in particular, to an analysis subsystem in a distributed computer system that processes different types of metrics related to the operational status of the distributed computer system to provide information useful in diagnosis of the cause or causes of undesirable operational states of a multi-tiered application executing within the distributed computer system.

BACKGROUND

Computer hardware and software have, over the past 60 years, evolved at a spectacular rate. Early, room-size, vacuum-tube-based computer systems could muster only a tiny fraction of the processing bandwidth provided by one of the ubiquitous inexpensive microprocessors present in a wide variety of currently available electronic devices. Similarly, the data-storage subsystems and memories of early computers had capacities less than a tiny fraction of the data-storage and memory capacity of a modern smart phone. Early computers were stand-alone systems capable of running a single job, or executable, at a time. By contrast, enormous, complex virtualized data centers and cloud-computing facilities may include hundreds, thousands, or more server computers linked together with high-speed digital communications infrastructure and accessing enormous dedicated data-storage facilities to simultaneous execute myriad programs. Virtual data centers and cloud-computing facilities may be geographically distributed and generally provide Internet-based interfaces that allow remote users to configure and launch complex constellations of application programs distributed across large numbers of physical computer systems and accessed by thousands, tens of thousands, hundreds of thousands, or more concurrent users.

While the enormous sizes, complexities, and capacities of modern distributed computing systems provide great benefit to commercial and organizational users, the complexity and scale of these systems also presents a variety of challenges. One frequently encountered challenge is the need to monitor the operational states of complex multi-tiered applications and to determine one or more causes of undesirable operational states. Many different types of monitoring facilities are generally embedded within complex computational systems. They may produce enormous volumes of log-file entries, digitally encoded metrics, and other information that characterizes the operational states of the many different systems, subsystems, components, and subcomponents of a virtual data center or cloud-computing facility that hosts one or more multi-tiered applications. While this large body of continuously generated information generally contains sufficient information to diagnose many different types of failures and undesirable operational states, it is a decidedly non-trivial task to process the large volumes of operational information to identify the generally small subset of the information relevant to diagnosis of causes underlying failures and undesirable operational states of a particular multi-tiered application.

SUMMARY

The current document is directed to an analysis subsystem within a large distributed computing system, such as a virtual data center or cloud-computing facility, that monitors the operational states associated with a multi-tiered application and provides useful information for determining one or more causes of various types of failures and undesirable operational states that may arise during operation of the multi-tiered application. In one implementation, the analysis subsystem collects metrics provided by various different types of metrics sources within the computational system and employs principal feature analysis to select a generally small subset of the collected metrics particularly relevant to monitoring a multi-tiered application and diagnosing underlying causes of operational states of the multi-tiered application. The analysis subsystem develops one or more conditional probability distributions with respect to the subset of metrics. These one or more conditional probability distributions, in turn, allow the analysis subsystem to provide useful information for analysis of the causes of failures and undesirable system states associated with the multi-tiered application.

BRIEF DESCRIPTION OF THE DRAWINGS

FIGS. 13A-B illustrate the metric data that is collected, processed, and used by the analysis subsystem to which the current document is directed.

FIGS. 14A-D illustrate one of the problems associated with high-dimensional data sets, such as the metric data discussed above with reference to FIG. 13B.

FIGS. 15A-F illustrate the operations conducted in principal feature analysis to select a subset of the attributes, or dimensions, of a set of metric data in order to reduce the dimensionality of the metric data while retaining much of the useful information in the metric data.

FIGS. 16A-1D illustrate general Bayesian networks and naïve Bayesian networks.

DETAILED DESCRIPTION OF EMBODIMENTS

The current document is directed to an analysis subsystem within a large computing system, such as a private data center, virtual data center, or cloud-computing facility, that monitors the operational states associated with a multi-tiered application and provides useful information for determining one or more causes of various types of failures and undesirable operational states that may arise during operation of the multi-tiered application. The analysis subsystem collects metrics provided by various different types of metrics sources within the computational system and employs principal feature analysis to select a generally small subset of the collected metrics particularly relevant to monitoring of, and diagnostic tasks associated with, a multi-tiered application. The analysis subsystem develops a representation of one or more conditional probability distributions with respect to the subset of metrics. The one or more conditional probability distributions, in turn, allow the analysis subsystem to provide focused, targeted, and useful information for analyzing the causes of failures and undesirable system states associated with the multi-tiered application.

In a first subsection, below, a brief overview of virtualization technologies is provided with reference to FIGS. 1-12. A second subsection discusses principle feature analysis and Bayesian networks, with reference to FIGS. 13A-18E. In a final subsection, the analysis-subsystem methods and systems to which the current document is directed are discussed with reference to FIGS. 19-23G.

Overview of Virtualization Technologies

Figure 1:
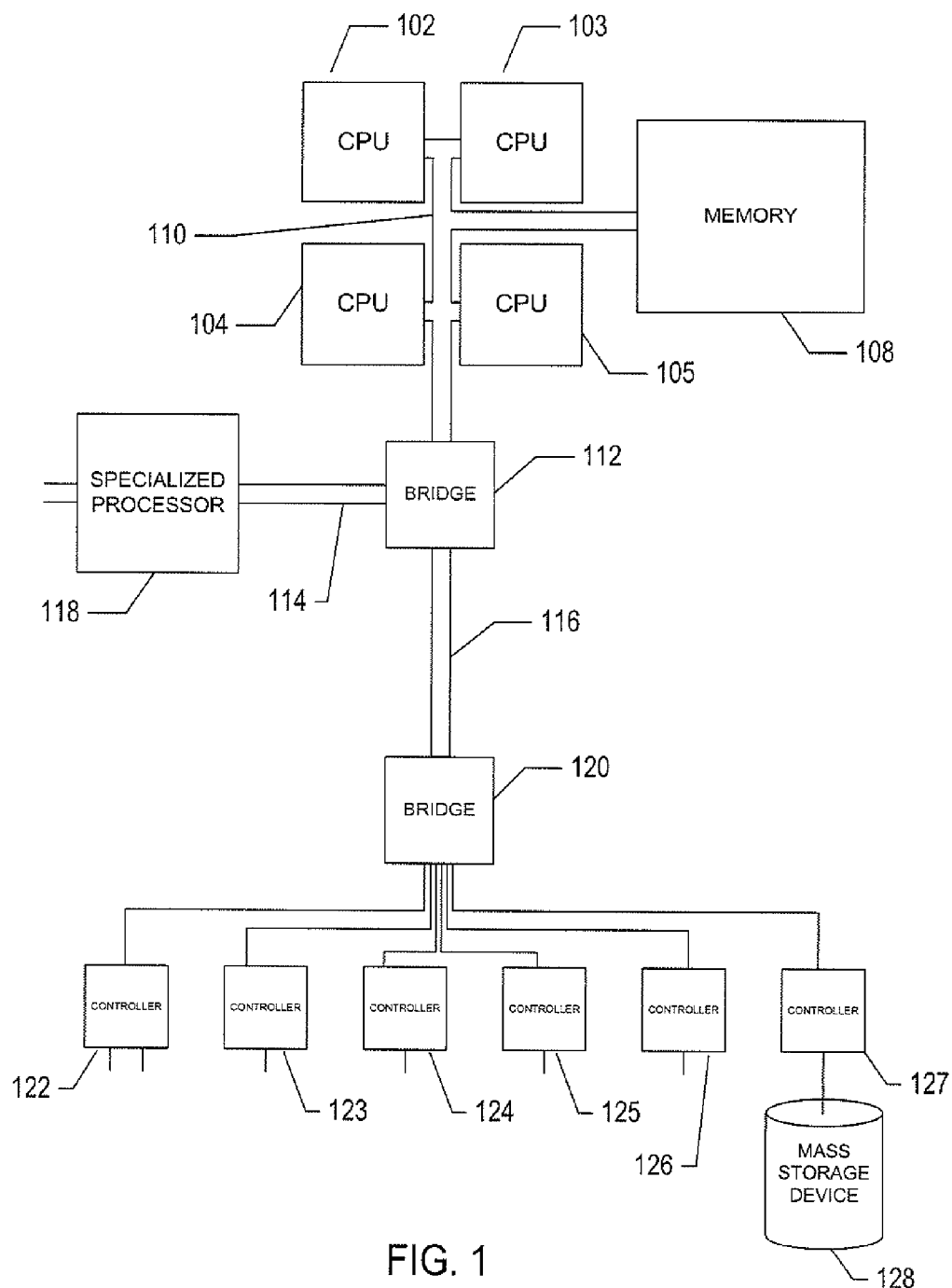
FIG. 1 provides a general architectural diagram for various types of computers.

FIG. 1 provides a general architectural diagram for various types of computers. Computers on which virtualization layers provide virtual execution environments for virtual machines may be described by the general architectural diagram shown in FIG. 1, for example. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
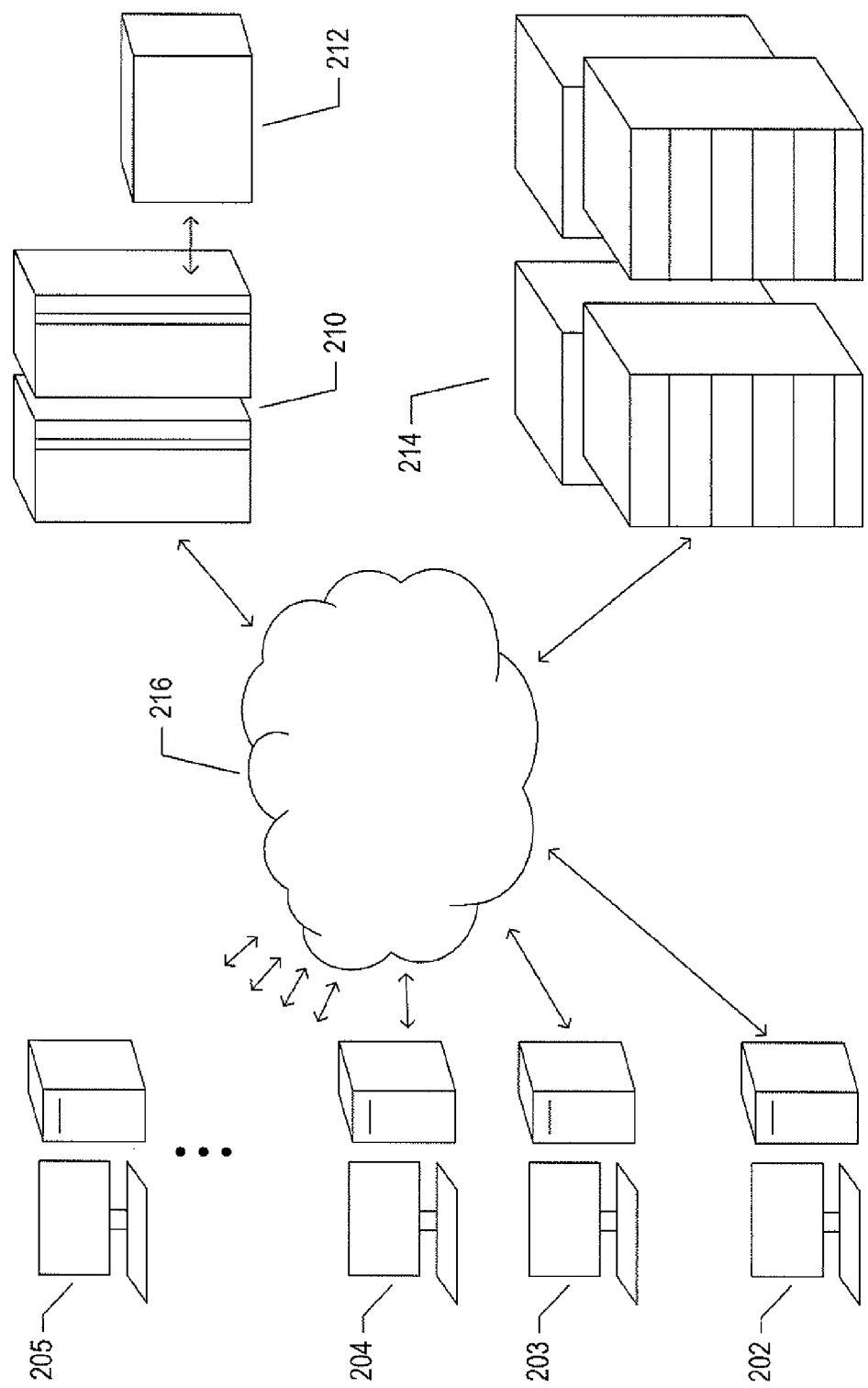
FIG. 2 illustrates an Internet-connected distributed computer system.

FIG. 2 illustrates an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
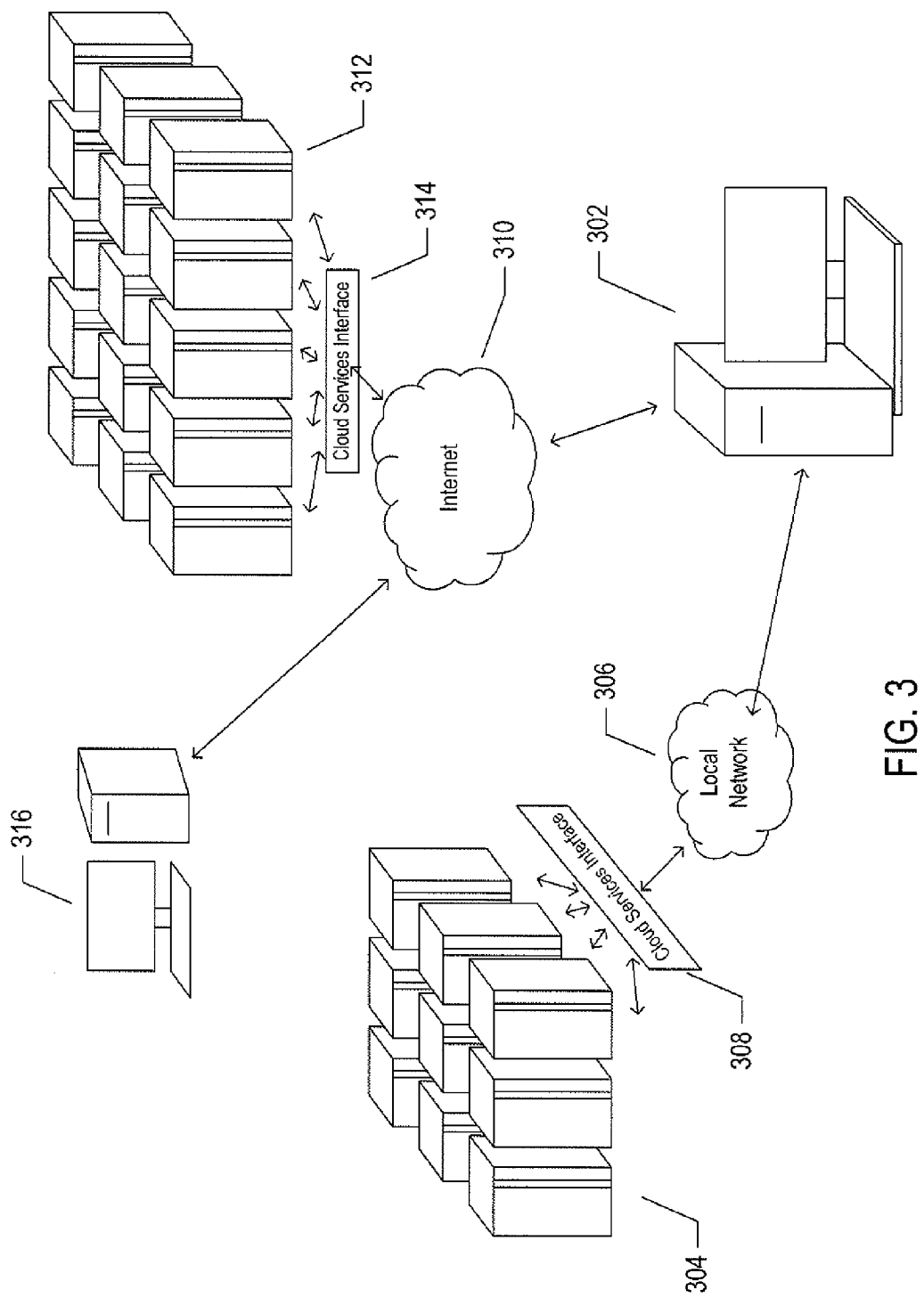
FIG. 3 illustrates cloud computing. In the recently developed cloud-computing paradigm, computing cycles and data-storage facilities are provided to organizations and individuals by cloud-computing providers.

FIG. 3 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
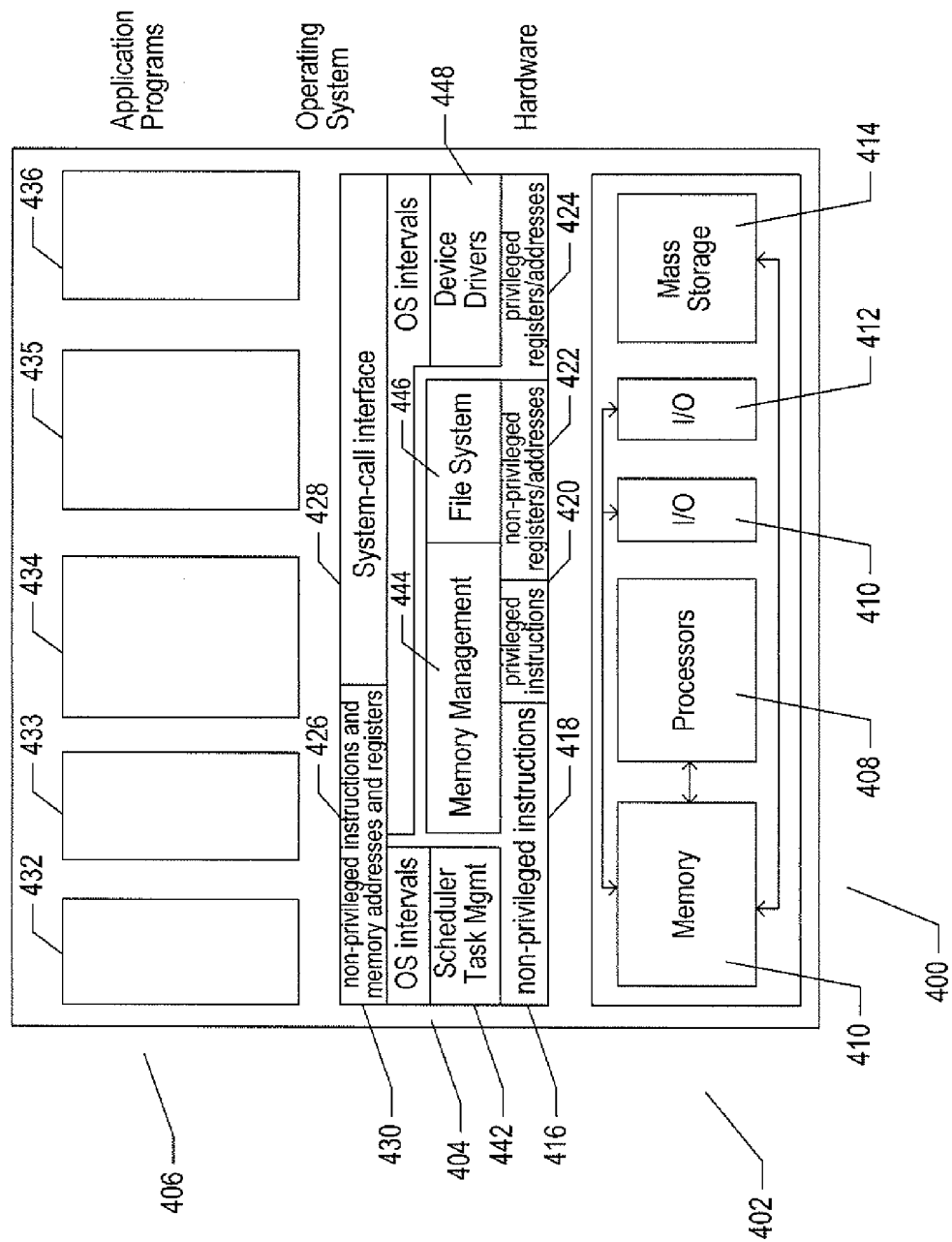
FIG. 4 illustrates generalized hardware and software components of a general-purpose computer system, such as a general-purpose computer system having an architecture similar to that shown in FIG. 1.

FIG. 4 illustrates generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 436 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
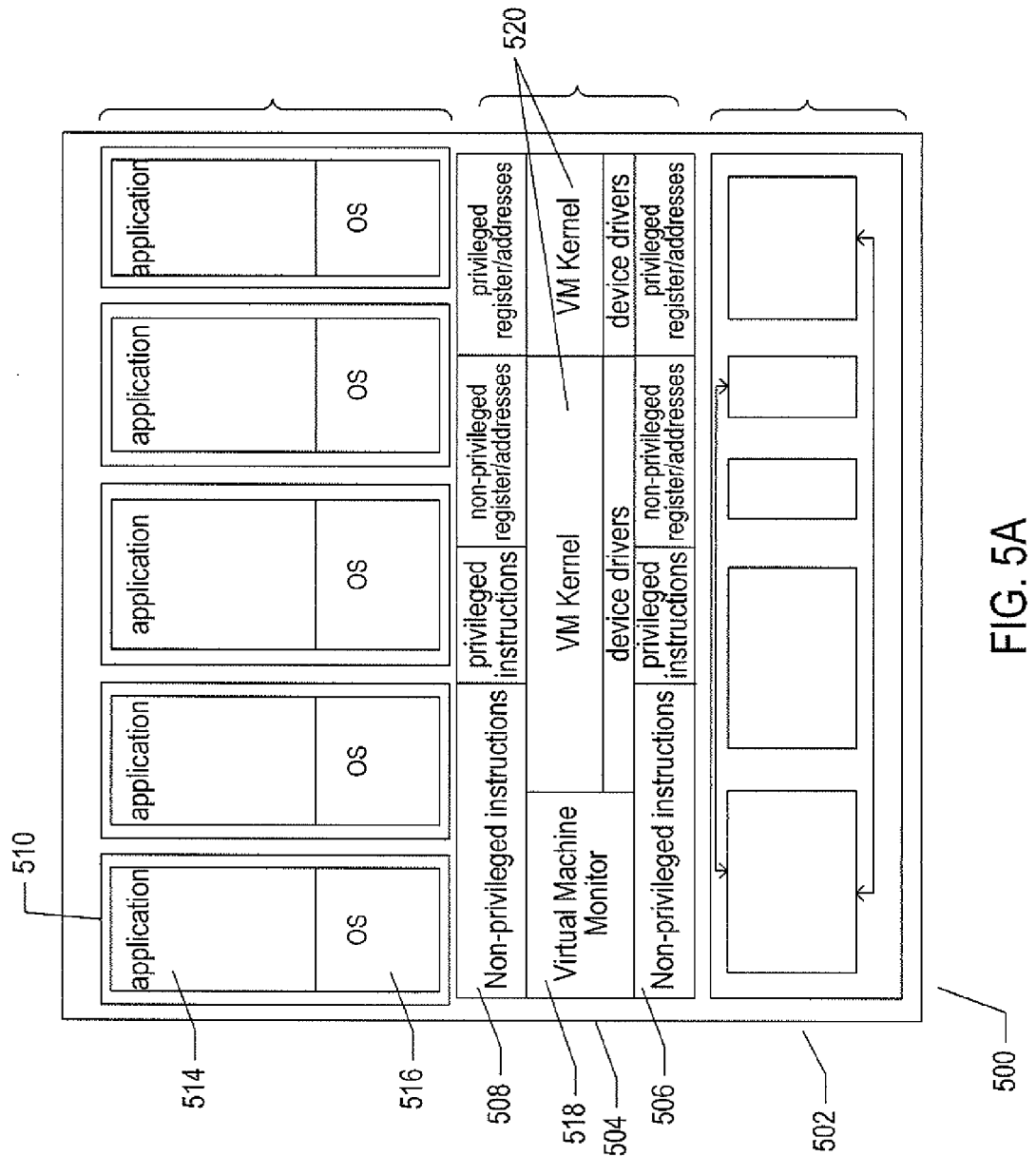
FIGS. 5A-B illustrate two types of virtual machine and virtual-machine execution environments.
Figure 5B:
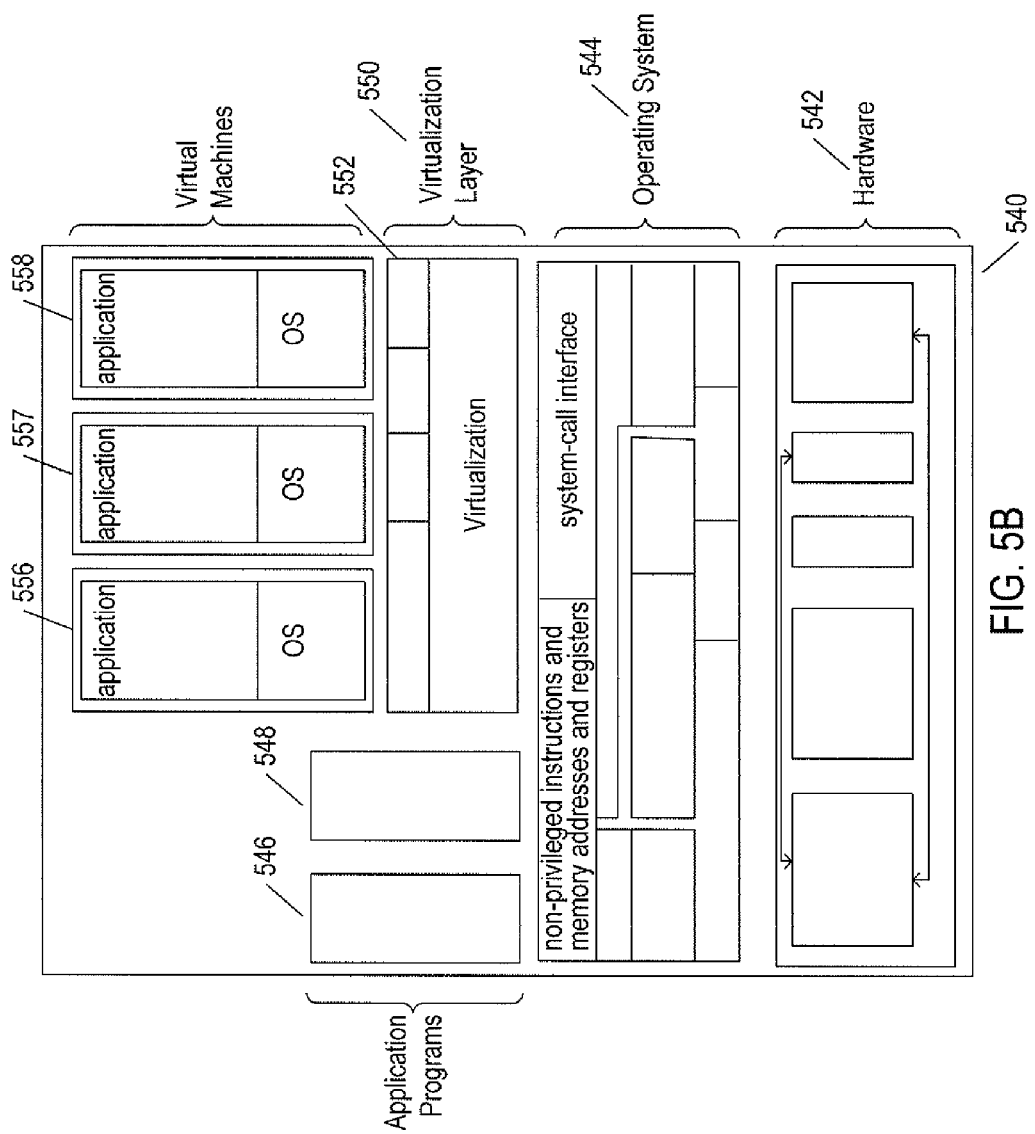

For all of these reasons, a higher level of abstraction, referred to as the "virtual machine," has been developed and evolved to further abstract computer hardware in order to address many difficulties and challenges associated with traditional computing systems, including the compatibility issues discussed above. FIGS. 5A-B illustrate two types of virtual machine and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment illustrated in FIG. 5A features a virtualization layer 504 that interfaces through a virtualization-layer/hardware-layer interface 506, equivalent to interface 416 in FIG. 4, to the hardware. The virtualization layer provides a hardware-like interface 508 to a number of virtual machines, such as virtual machine 510, executing above the virtualization layer in a virtual-machine layer 512. Each virtual machine includes one or more application programs or other higher-level computational entities packaged together with an operating system, referred to as a "guest operating system," such as application 514 and guest operating system 516 packaged together within virtual machine 510. Each virtual machine is thus equivalent to the operating-system layer 404 and application-program layer 406 in the general-purpose computer system shown in FIG. 4. Each guest operating system within a virtual machine interfaces to the virtualization-layer interface 508 rather than to the actual hardware interface 506. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 508 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 518 ("VMM"), also referred to as a "hypervisor," that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 508, the accesses result in execution of virtualization-layer code to simulate or emulate the privileged resources. The virtualization layer additionally includes a kernel module 520 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

FIG. 5B illustrates a second type of virtualization. In FIG. 5B, the computer system 540 includes the same hardware layer 542 and software layer 544 as the hardware layer 402 shown in FIG. 4. Several application programs 546 and 548 are shown running in the execution environment provided by the operating system. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of virtual machines 556-558, each including one or more application programs or other higher-level computational entities packaged together with a guest operating system.

In FIGS. 5A-B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

A virtual machine or virtual application, described below, is encapsulated within a data package for transmission, distribution, and loading into a virtual-execution environment. One public standard for virtual-machine encapsulation is referred to as the "open virtualization format" ("OVF").

Figure 6:
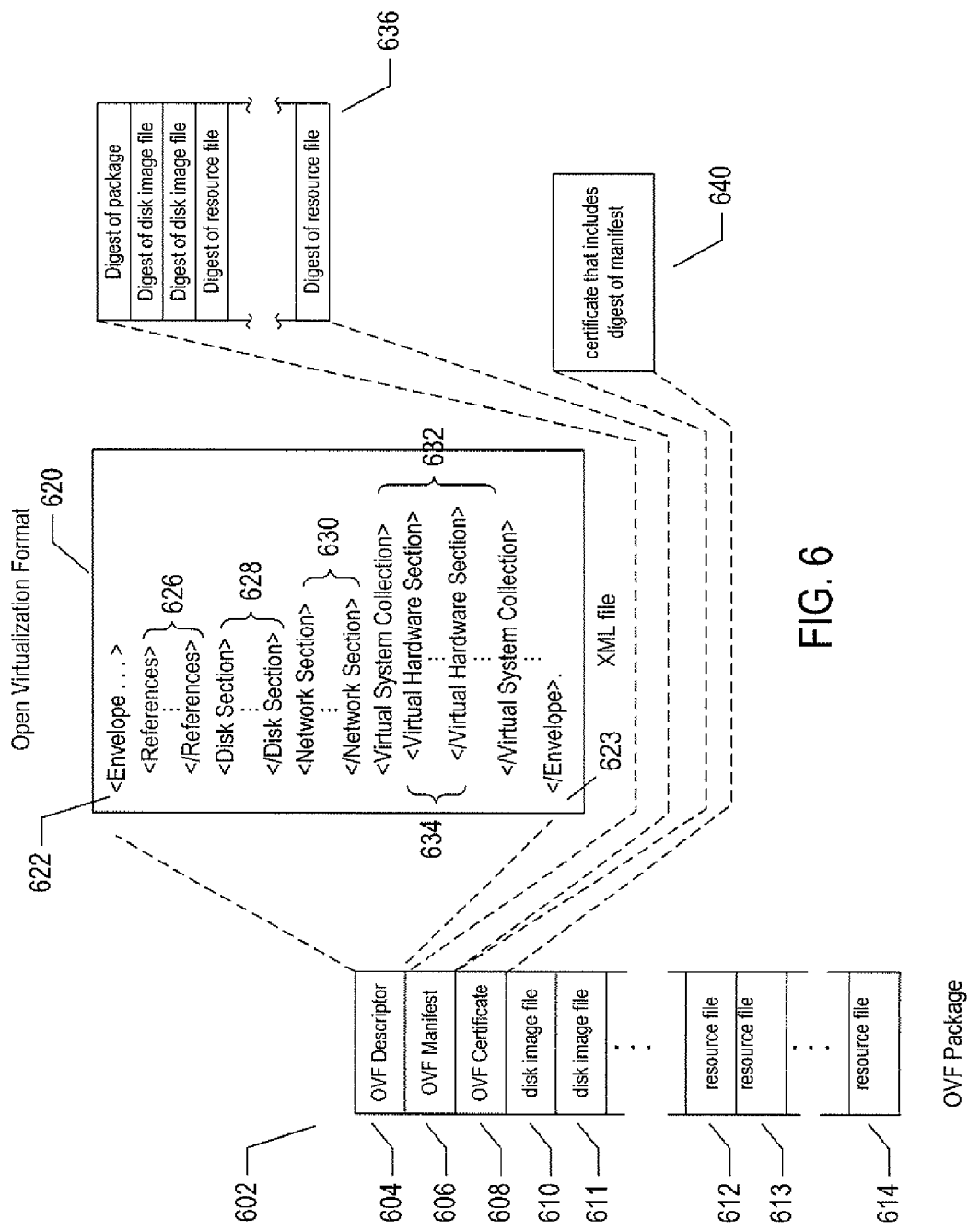
FIG. 6 illustrates an OVF package.

The OVF standard specifies a format for digitally encoding a virtual machine within one or more data files. FIG. 6 illustrates an OVF package. An OVF package 602 includes an OVF descriptor 604, an OVF manifest 606, an OVF certificate 608, one or more disk-image files 610-611, and one or more resource files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each virtual machine 634. There are many additional hierarchical levels and elements within a typical OVF descriptor. The OVF descriptor is thus a self-describing, XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and resource files 612 are digitally encoded content, such as operating-system images. A virtual machine or a collection of virtual machines encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more virtual machines that is encoded within an OVF package.

Figure 7:
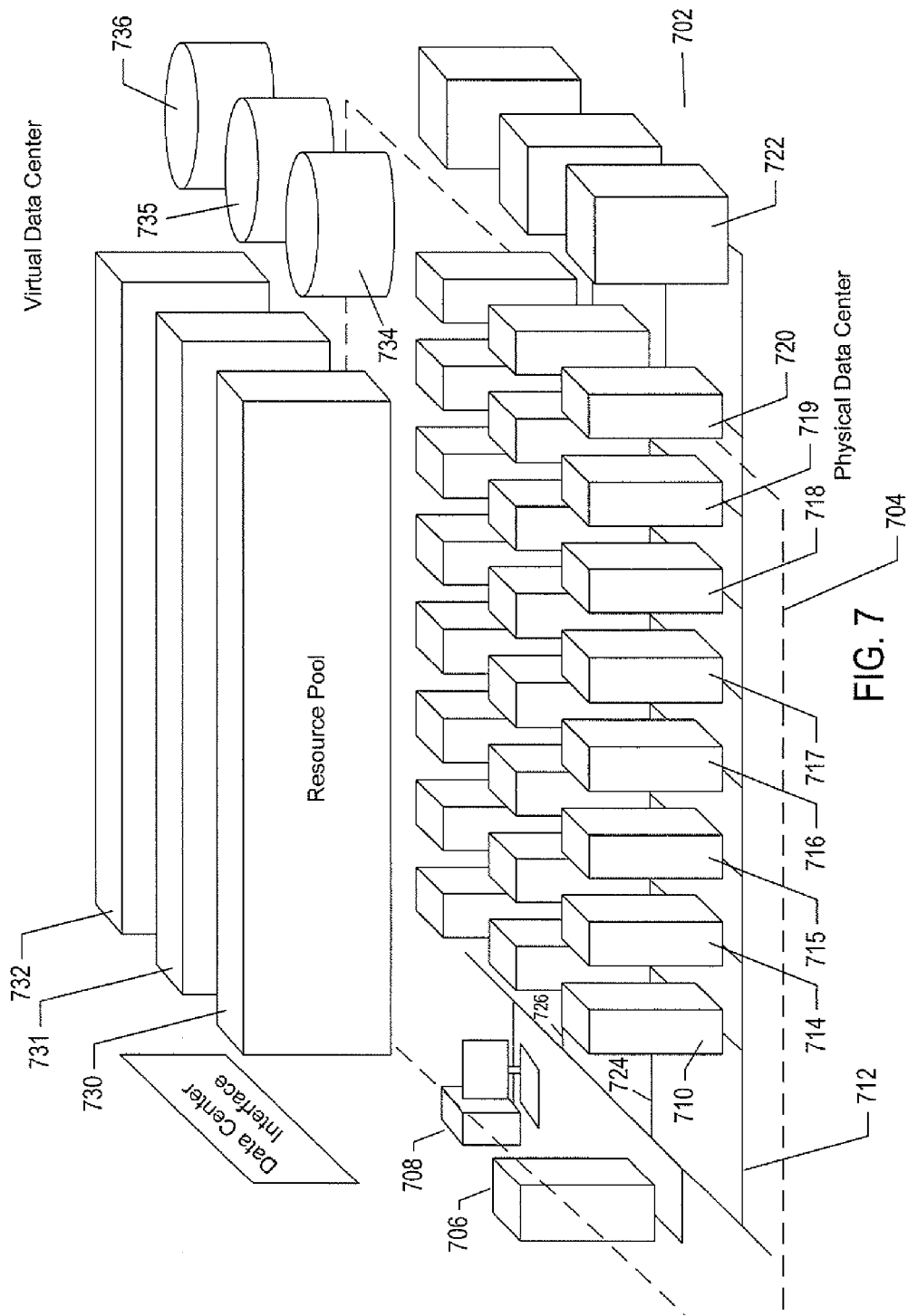
FIG. 7 illustrates virtual data centers provided as an abstraction of underlying physical-data-center hardware components.

The advent of virtual machines and virtual environments has alleviated many of the difficulties and challenges associated with traditional general-purpose computing. Machine and operating-system dependencies can be significantly reduced or entirely eliminated by packaging applications and operating systems together as virtual machines and virtual appliances that execute within virtual environments provided by virtualization layers running on many different types of computer hardware. A next level of abstraction, referred to as virtual data centers or virtual infrastructure, provide a data-center interface to virtual data centers computationally constructed within physical data centers. FIG. 7 illustrates virtual data centers provided as an abstraction of underlying physical-data-center hardware components. In FIG. 7, a physical data center 702 is shown below a virtual-interface plane 704. The physical data center consists of a virtual-data-center management server 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple virtual machines. Different physical data centers may include many different types of computers, networks, data-storage systems and devices connected according to many different types of connection topologies. The virtual-data-center abstraction layer 704, a logical abstraction layer shown by a plane in FIG. 7, abstracts the physical data center to a virtual data center comprising one or more resource pools, such as resource pools 730-732, one or more virtual data stores, such as virtual data stores 734-736, and one or more virtual networks. In certain implementations, the resource pools abstract banks of physical servers directly interconnected by a local area network.

The virtual-data-center management interface allows provisioning and launching of virtual machines with respect to resource pools, virtual data stores, and virtual networks, so that virtual-data-center administrators need not be concerned with the identities of physical-data-center components used to execute particular virtual machines. Furthermore, the virtual-data-center management server includes functionality to migrate running virtual machines from one physical server to another in order to optimally or near optimally manage resource allocation, provide fault tolerance, and high availability by migrating virtual machines to most effectively utilize underlying physical hardware resources, to replace virtual machines disabled by physical hardware problems and failures, and to ensure that multiple virtual machines supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of virtual machines and virtual appliances as well as to provide high-level, distributed functionalities that involve pooling the resources of individual physical servers and migrating virtual machines among physical servers to achieve load balancing, fault tolerance, and high availability.

Figure 8:
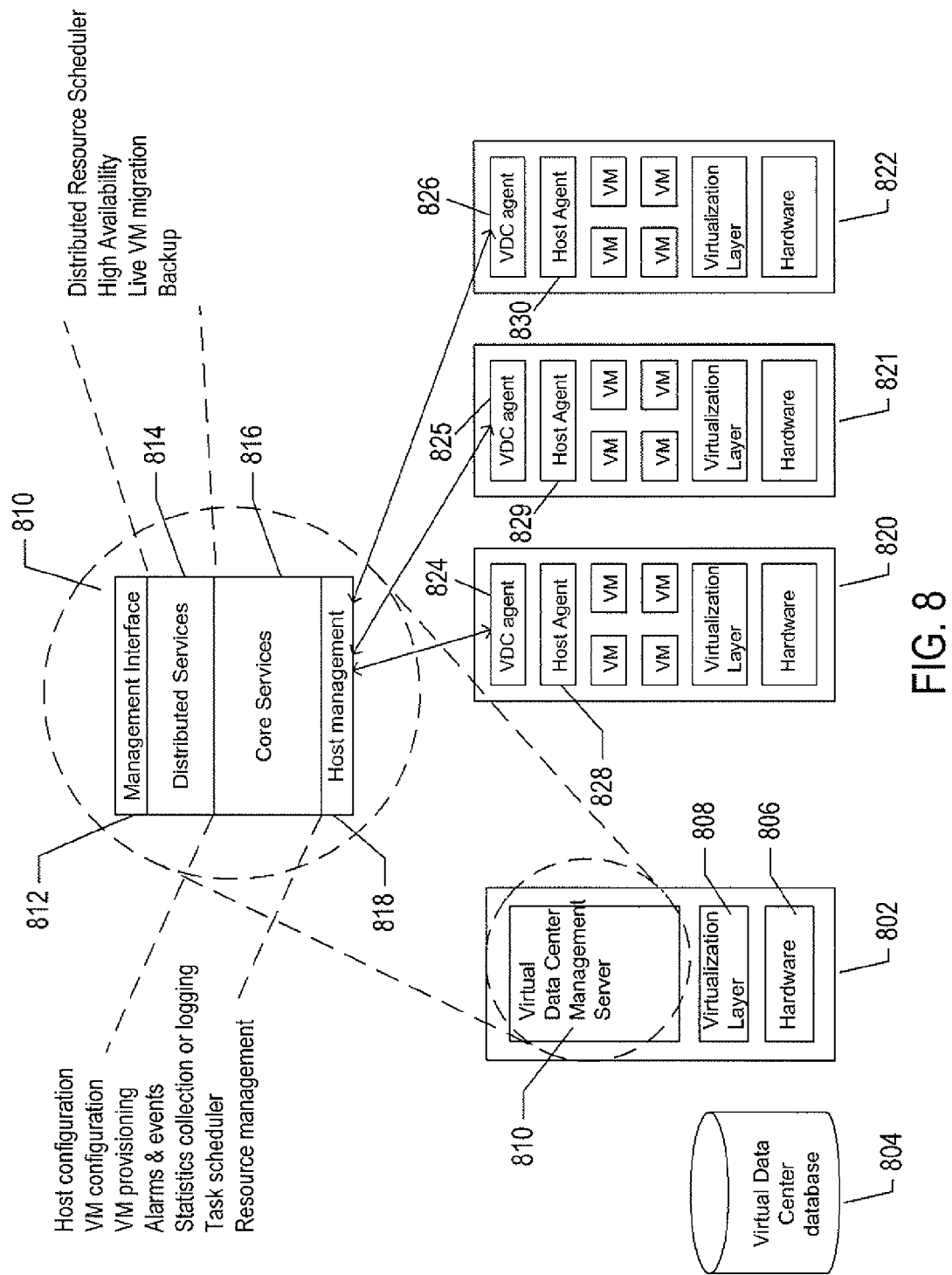
FIG. 8 illustrates virtual-machine components of a virtual-data-center management server and physical servers of a physical data center above which a virtual-data-center interface is provided by the virtual-data-center management server.

FIG. 8 illustrates virtual-machine components of a virtual-data-center management server and physical servers of a physical data center above which a virtual-data-center interface is provided by the virtual-data-center management server. The virtual-data-center management server 802 and a virtual-data-center database 804 comprise the physical components of the management component of the virtual data center. The virtual-data-center management server 802 includes a hardware layer 806 and virtualization layer 808, and runs a virtual-data-center management-server virtual machine 810 above the virtualization layer. Although shown as a single server in FIG. 8, the virtual-data-center management server ("VDC management server") may include two or more physical server computers that support multiple VDC-management-server virtual appliances. The virtual machine 810 includes a management-interface component 812, distributed services 814, core services 816, and a host-management interface 818. The management interface is accessed from any of various computers, such as the PC 708 shown in FIG. 7. The management interface allows the virtual-data-center administrator to configure a virtual data center, provision virtual machines, collect statistics and view log files for the virtual data center, and to carry out other, similar management tasks. The host-management interface 818 interfaces to virtual-data-center agents 824, 825, and 826 that execute as virtual machines within each of the physical servers of the physical data center that is abstracted to a virtual data center by the VDC management server.

The distributed services 814 include a distributed-resource scheduler that assigns virtual machines to execute within particular physical servers and that migrates virtual machines in order to most effectively make use of computational bandwidths, data-storage capacities, and network capacities of the physical data center. The distributed services further include a high-availability service that replicates and migrates virtual machines in order to ensure that virtual machines continue to execute despite problems and failures experienced by physical hardware components. The distributed services also include a live-virtual-machine migration service that temporarily halts execution of a virtual machine, encapsulates the virtual machine in an OVF package, transmits the OVF package to a different physical server, and restarts the virtual machine on the different physical server from a virtual-machine state recorded when execution of the virtual machine was halted. The distributed services also include a distributed backup service that provides centralized virtual-machine backup and restore.

The core services provided by the VDC management server include host configuration, virtual-machine configuration, virtual-machine provisioning, generation of virtual-data-center alarms and events, ongoing event logging and statistics collection, a task scheduler, and a resource-management module. Each physical server 820-822 also includes a host-agent virtual machine 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce resource allocations made by the VDC management server, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational resources of a cloud-computing facility to cloud-computing-infrastructure users. A cloud-director management server exposes virtual resources of a cloud-computing facility to cloud-computing-infrastructure users. In addition, the cloud director introduces a multi-tenancy layer of abstraction, which partitions VDCs into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
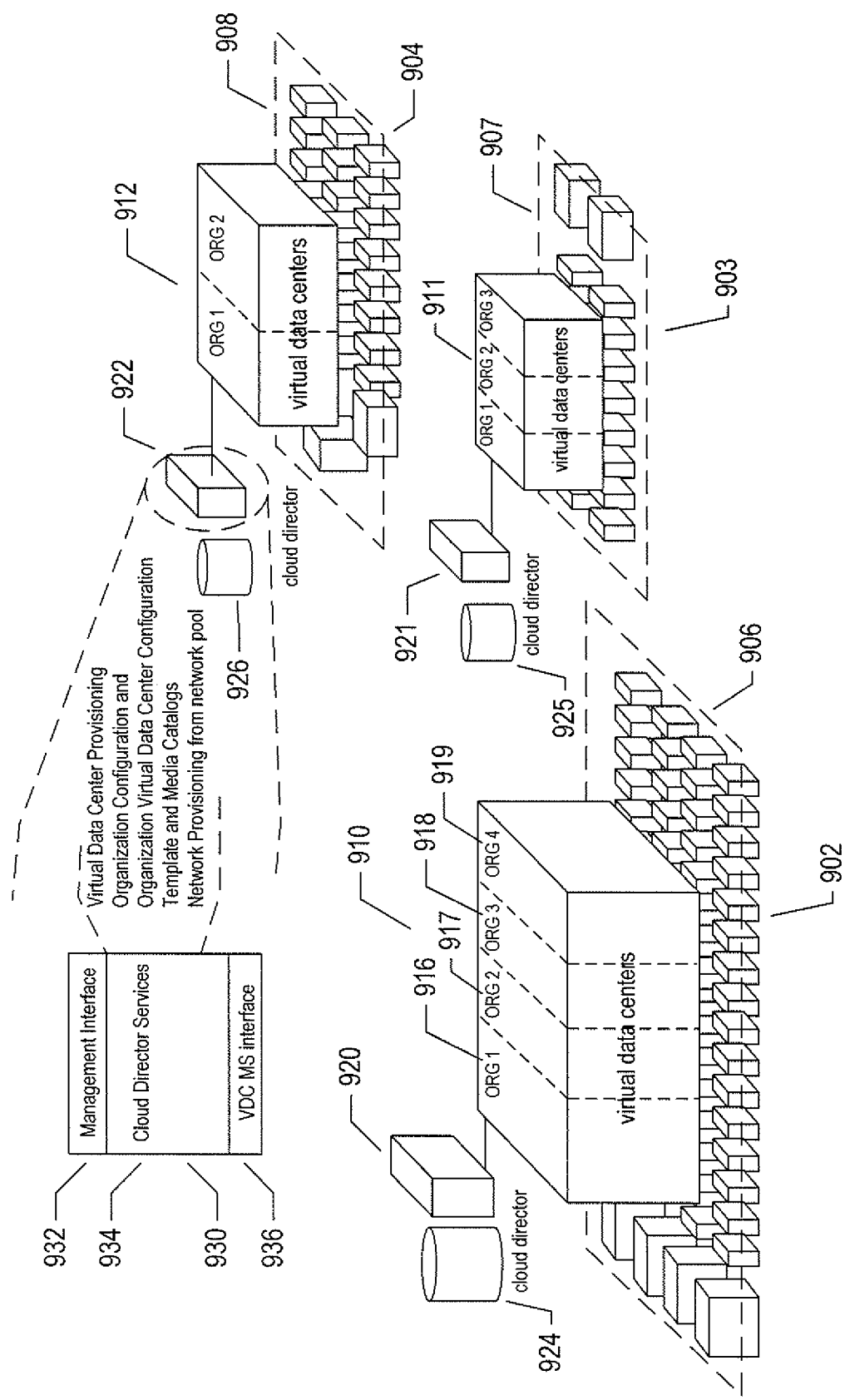
FIG. 9 illustrates a cloud-director level of abstraction.

FIG. 9 illustrates a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The resources of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are virtual machines that each contains an OS and/or one or more virtual machines containing applications. A template may include much of the detailed contents of virtual machines and virtual appliances that are encoded within OVF packages, so that the task of configuring a virtual machine or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VDC-server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
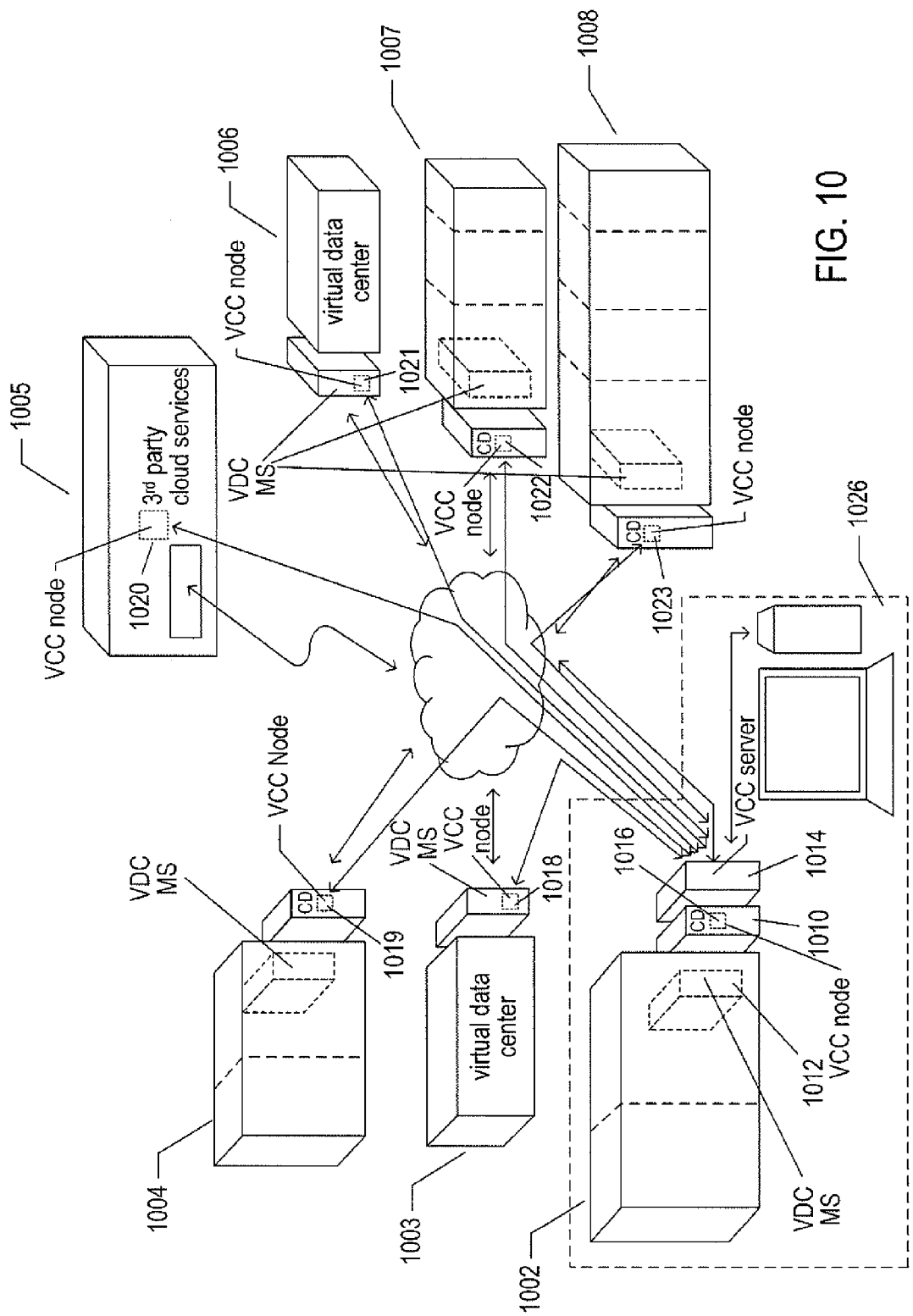
FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds.

FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are illustrated 1002-1008. Cloud-computing facility 1002 is a private multi-tenant cloud with a cloud director 1010 that interfaces to a VDC management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VDC management server that manages a single-tenant private cloud. The VCC server 1014 additionally interfaces, through the Internet, to VCC node virtual appliances executing within remote VDC management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Figure 11:
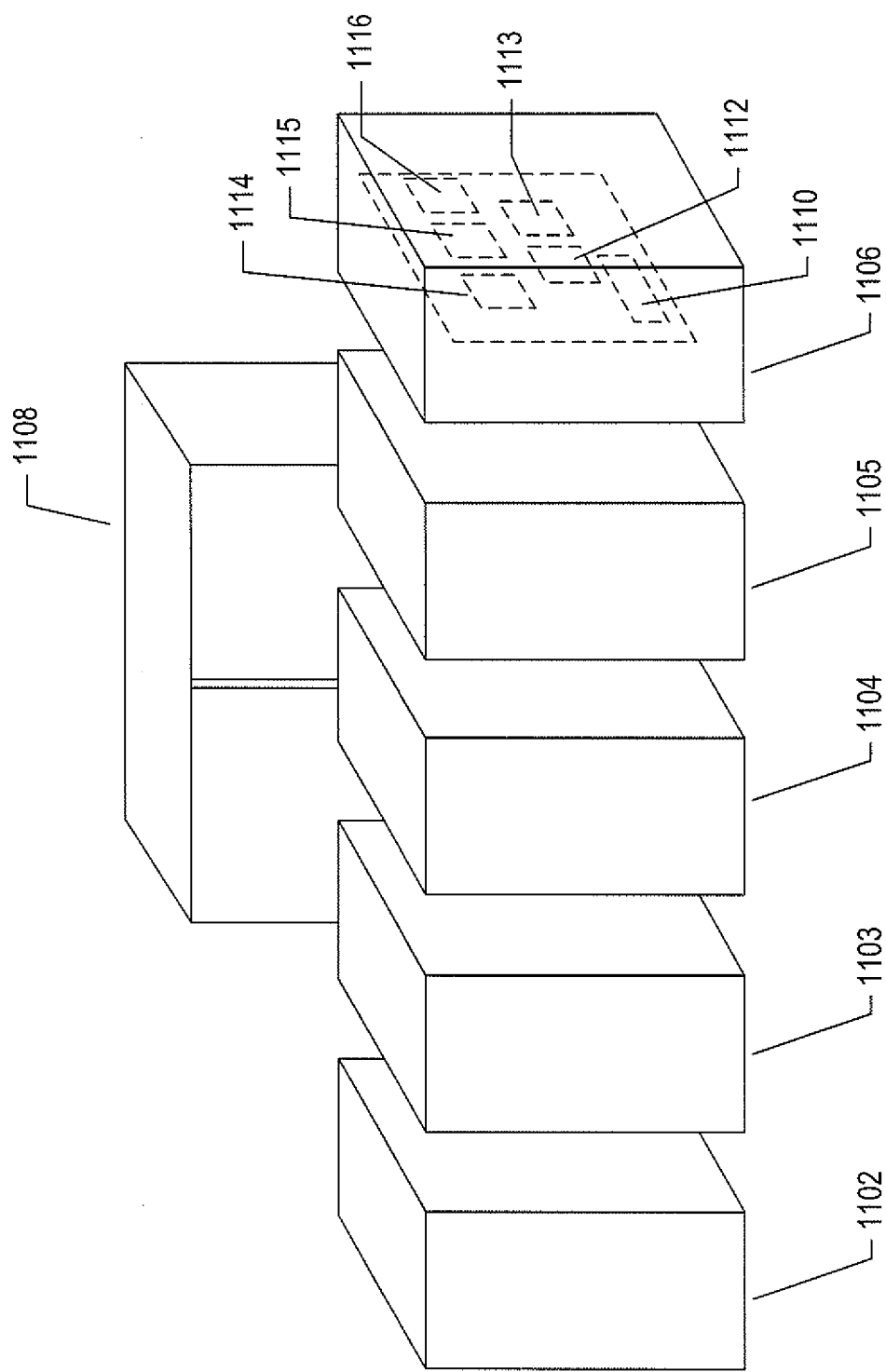
FIGS. 11-12 illustrate a resource pool, discussed briefly, above, with reference to FIG. 7.
Figure 12:
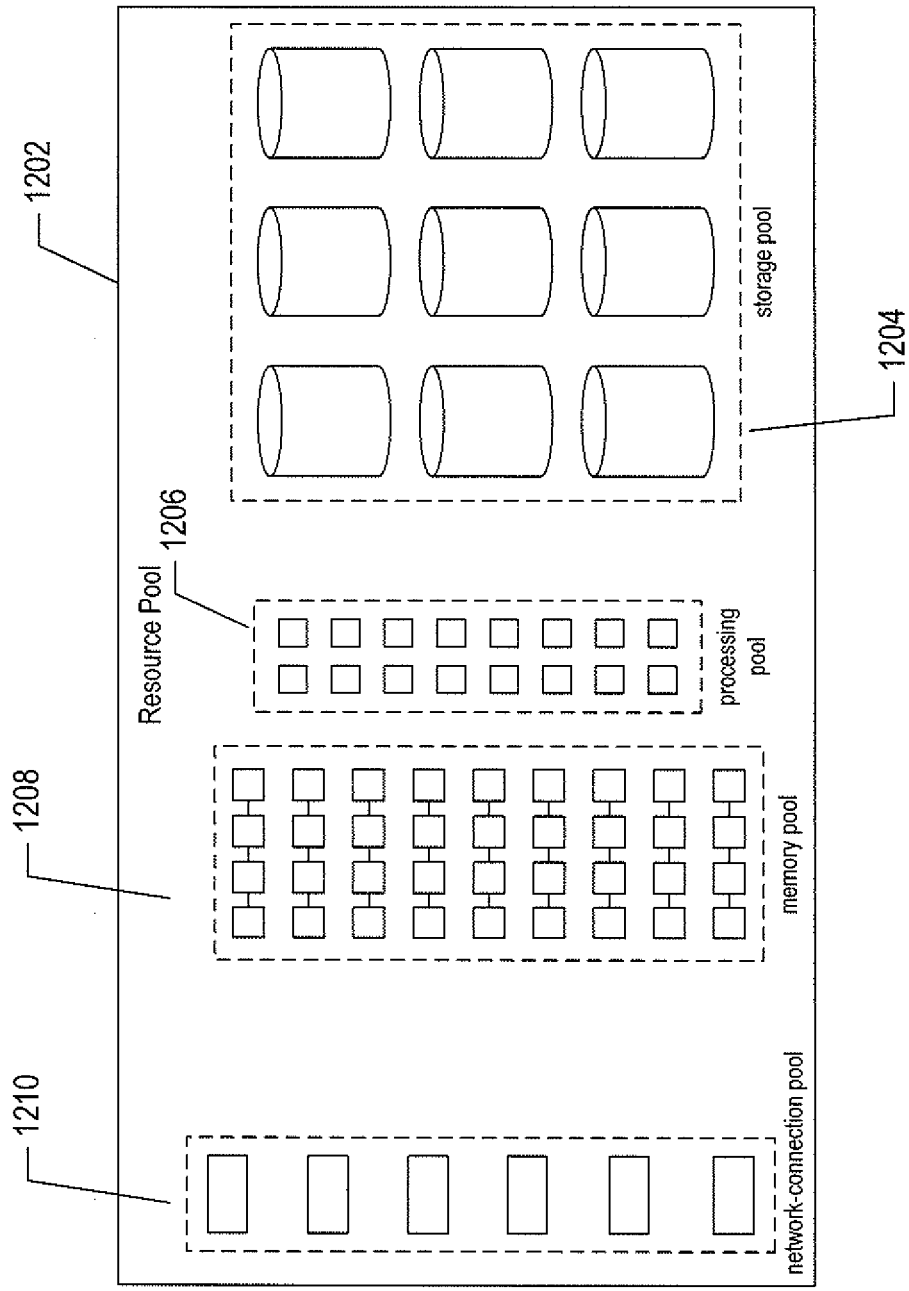

FIGS. 11-12 illustrate a resource pool, discussed briefly, above, with reference to FIG. 7. FIG. 11 shows a small cluster of physical computing machinery. In FIG. 11, five multi-processor servers 1102-1106 are shown along with a large data-storage-array enclosure 1108. Each of the server computers includes one or more network interconnect cards ("NICs") 1110, two or more processors 1112-1113, and generally multiple banks of integrated-circuit memory 1114-1116. The internal components of server 1106 are shown, in FIG. 11, as an example of the types of components contained within the remaining servers 1102-1105. Of course, server computers and storage arrays are extremely complex machines with hundreds to thousands of individual parts and subcomponents. FIG. 11 is intended only to illustrate the computing cluster at a high level.

FIG. 12 illustrates abstraction of the computing resources contained in the cluster shown in FIG. 11 as a resource pool. The resource pool 1202 includes a data-storage pool 1204, a processing pool 1206, a memory pool 1208, and a network-connection pool 1210. The storage pool 1204 is an abstract collection or aggregation of the data-storage resources of the cluster available to virtual machines for data storage, including portions of internal disk drives within the server computers as well as disk drives and other data-storage devices within the data-storage array 1108. The processing pool 1206 is an abstract aggregation of the processing bandwidth provided by hardware threads, cores, and processors within the server computers 1102-1106. Similarly, the memory pool 1208 includes the memory resources contained in the server computers 1102-1106 that are accessible for use by virtual machines. The network-connection pool 1210 is an abstract aggregation of the NICs and/or other communications hardware within the server computers 1102-1106 available for transmitting and receiving data at the request of virtual machines. The resource-pool abstraction represents, to virtual machines within a virtualized computer system, an overall, aggregate set of resources that can be accessed by the virtual machines without specifying the types and numbers of individual devices and components that are aggregated together to provide the overall bandwidth and/or capacity of the various component pools of the resource pool.

Principle Feature Analysis and Bayesian Networks

Figure 13A:
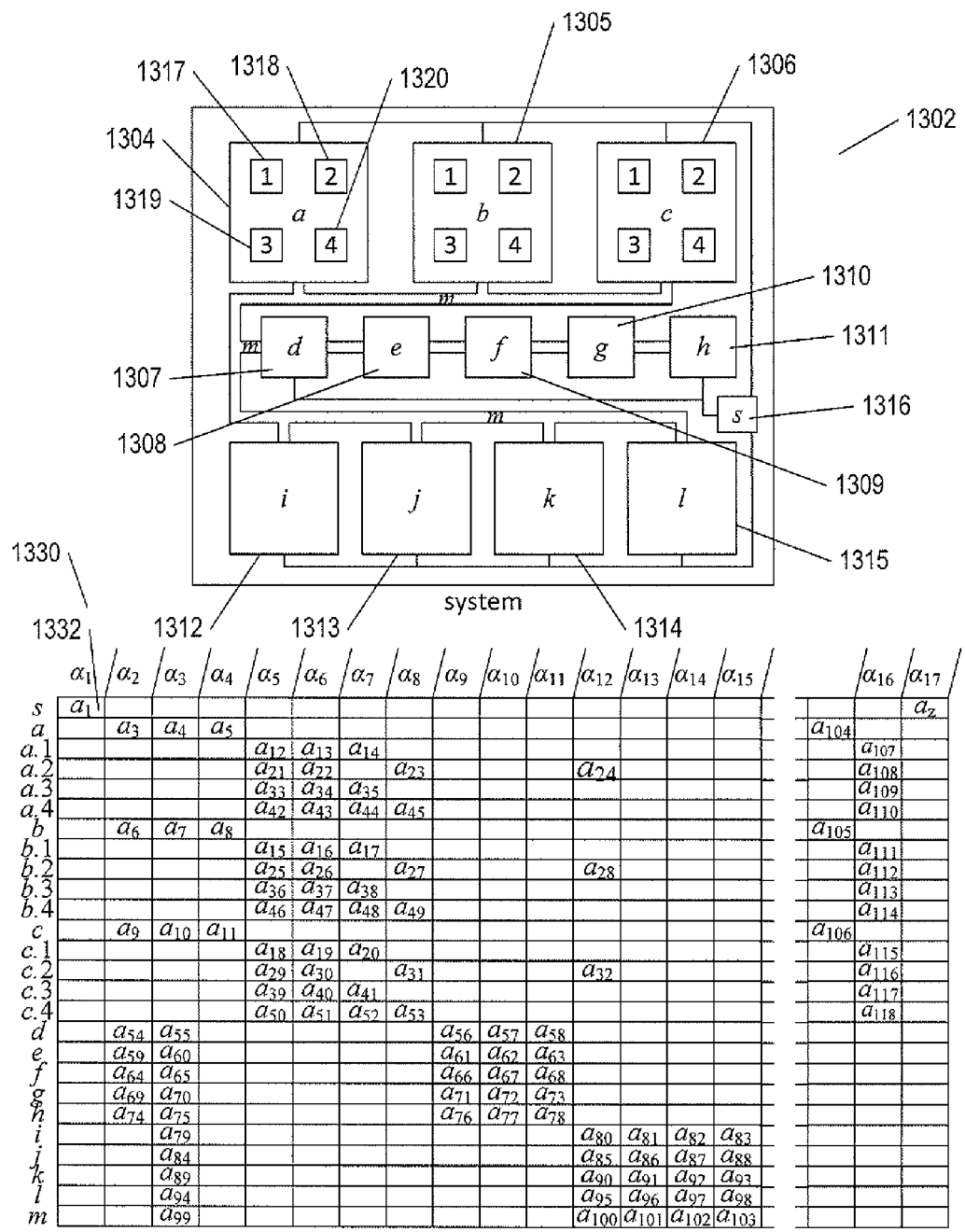

FIGS. 13A-B illustrate the metric data that is collected, processed, and used by the analysis subsystem to which the current document is directed. At the top of FIG. 13A, an abstract system block diagram 1302 is shown. This system includes 13 main subcomponents a-m and s 1304-1316 and four subcomponents in each of components a, b, and c, such as subcomponents 1317-1320 in component a 1304. The system is abstractly characterized and no further details with regard to component functionalities, interfaces, and connections are provided.

In a complex system, as further discussed below, various types of information are collected with regard to the operational states and statuses of many, if not all, components, subcomponents, systems, and subsystems. The information can be encoded in many different ways, can be expressed in many different forms, and can be provided by a number of different information sources. For example, metrics may be provided by various types of monitoring applications and monitoring hardware within a computer system. As another example, metrics may be obtained from log files that store various types of log messages and error messages generated by computer-system components. However, for the purposes of the current discussion, this information can be described as a set of attributes $\alpha_1$-$\alpha_n$, also referred to as "features" or "dimensions" at different points in the following discussion. For the purposes of the current discussion, the attributes have values that are generally either binary TRUE and FALSE values, integer and integer-subrange values, and real and real-subrange values. Clearly, even for descriptive textual information, there is generally a finite number of different values or forms of the information for a particular attribute because the information is automatically generated by programmed reporting facilities, as a result of which any such information can be mapped to integer values. Thus, no generality is lost by considering the information from various types of monitoring and diagnostic agents and subsystems within the system to be numeric values, also referred to as "metric values" and "metric data." Information may be generated, within the system, with regard to each of the systems, subsystems, components, and subcomponents within a computational system. Thus, the operational state and status of each component, subcomponent, system, and subsystem is described, at any given point in time, by the values for all attributes reported for the component, subcomponent, system, or subsystem. However, in general, only a subset of the attributes are relevant to any particular component, subcomponent, system, or subsystem. Thus, as a hypothetical example, Table 1330, in the lower portion of FIG. 13A, illustrates the attributes produced by the system as attributes $\alpha_1$-$\alpha_{118}$, each attribute associated with a particular component, subcomponent, system, or subsystem and with a particular attribute type. For example, attribute $\alpha_1$ 1332 is an attribute of type $\alpha_1$ associated with component s 1316. In an actual, complex computational system, such as a private data center, virtual data center, or cloud-computing facility, the computational system may internally generate values for tens of thousands, hundreds of thousands, or more different attributes.

FIG. 13B illustrates, at a relatively high abstraction level, the metric data that is collected and stored within a computational system. As shown in FIG. 13B, at each point in time, with time is represented by horizontal axis 1340, the operational state of the system may be described by the current values for all of the attributes for which values are internally generated within the system. For example, at the point in time represented by point 1342 on the horizontal time axis 1340, the operational state of the hypothetical system 1302 shown in FIG. 13A may be represented by a tuple or vector 1344 of values for each of the 118 attributes generated internally within the system. Again, in actual computational systems, the vector or tuple may contain tens of thousands, hundreds of thousands, or more entries.

While the state of a computational system may be represented, at each point in time, by the current values of the attributes, as shown in FIG. 13B, attribute values generally need only be reported by sources of metrics within the computational system when they change. Thus, a full set of attribute values is usually not collected continuously for each small interval of time. Nonetheless, when the values of tens of thousands to hundreds of thousands or more attributes are generated within a computational system, even when attribute values are reported only when their values change, the amount of data generated over hours and days may nonetheless be immense. It is not only be a challenge to record and store this data on an ongoing basis, but also to use the data for monitoring system and component states and diagnosing problems.

Figure 14B:
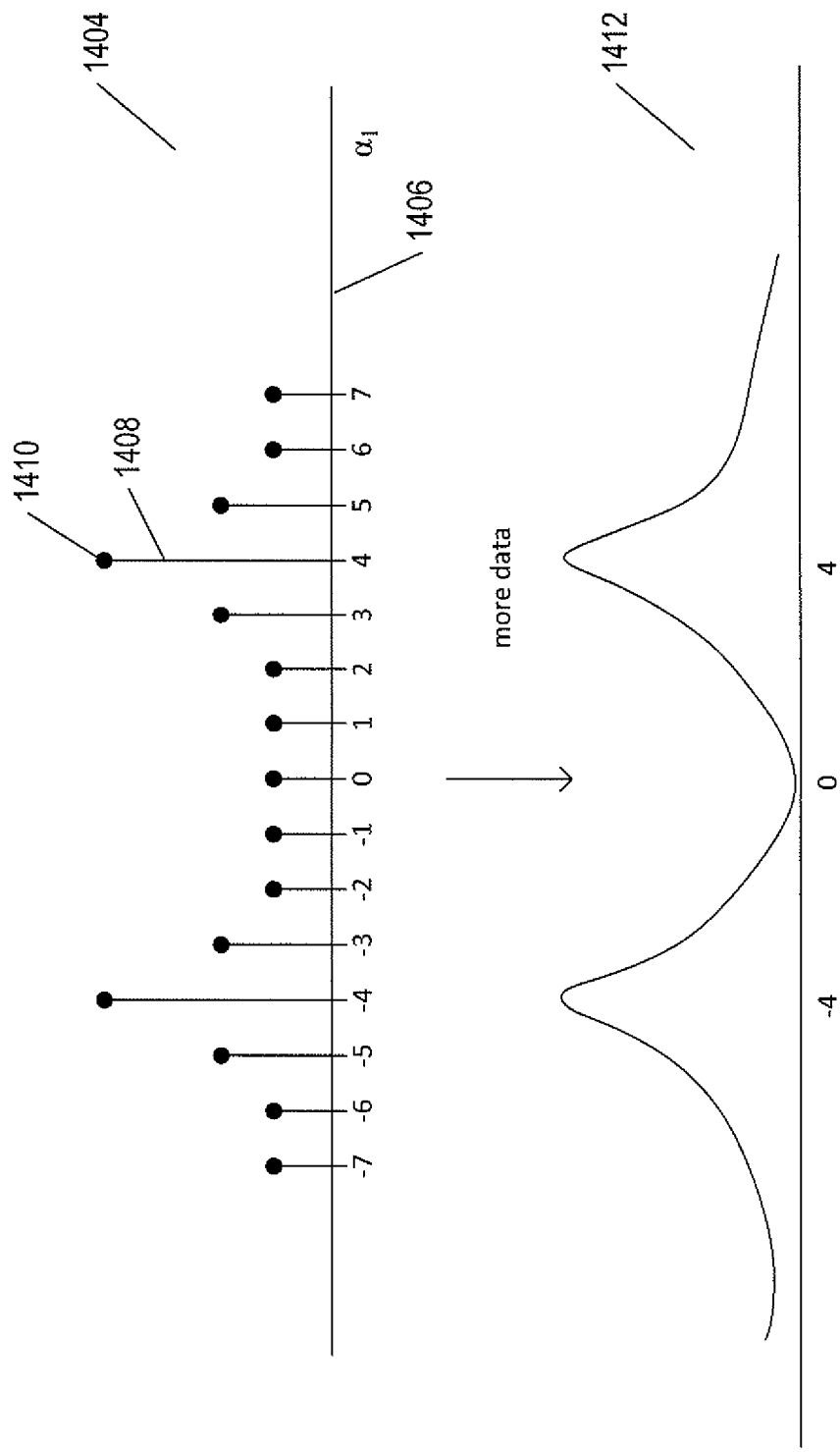

FIGS. 14A-D illustrate one of the problems associated with high-dimensional data sets, such as the metric data discussed above with reference to FIG. 13B. FIG. 14A shows a small table 1402 of attribute values. Each row in the table represents an attribute-value vector or tuple collected at a particular point in time. Visual inspection of the attribute values included in the table provides no obvious patterns in attribute values or obvious relationships between the values of groups of attributes. A significant task of analysis subsystems is to identify such patterns and relationships in data sets as a foundation for diagnoses and predictions. FIG. 14B illustrates a pattern or distribution of values of attribute $\alpha_1$ that emerges when the numbers of vectors having each value of attribute $\alpha_1$ are plotted. In the first plot 1404 in FIG. 14B, the height of the data points above the horizontal axis 1406, such as the height 1408 of data point 1410, represents the number of vectors in table 1402 shown in FIG. 14A in which the attribute $\alpha_1$ has the attribute value below the data point on the horizontal axis 1406. Even though only a relatively small number of vectors are contained in table 1402, a pattern emerges. Were far more vectors collected and plotted, a discrete or continuous bimodal distribution, as shown in the continuous lower plot 1412, may well emerge. The bimodal distribution indicates that the values of attribute $\alpha_1$ tend to cluster around 4 and −4, which may, in turn, indicate that attribute $\alpha_1$ values reflect which of two general states a component, subcomponent, system, or subsystem of the computational system inhabits at a given point in time. Recognition of this type of pattern may lead to both simplification in subsequent prediction and diagnosis tasks as well as to insight into the operational characteristics of the component, subcomponent, system, or subsystem.

Figure 14D:
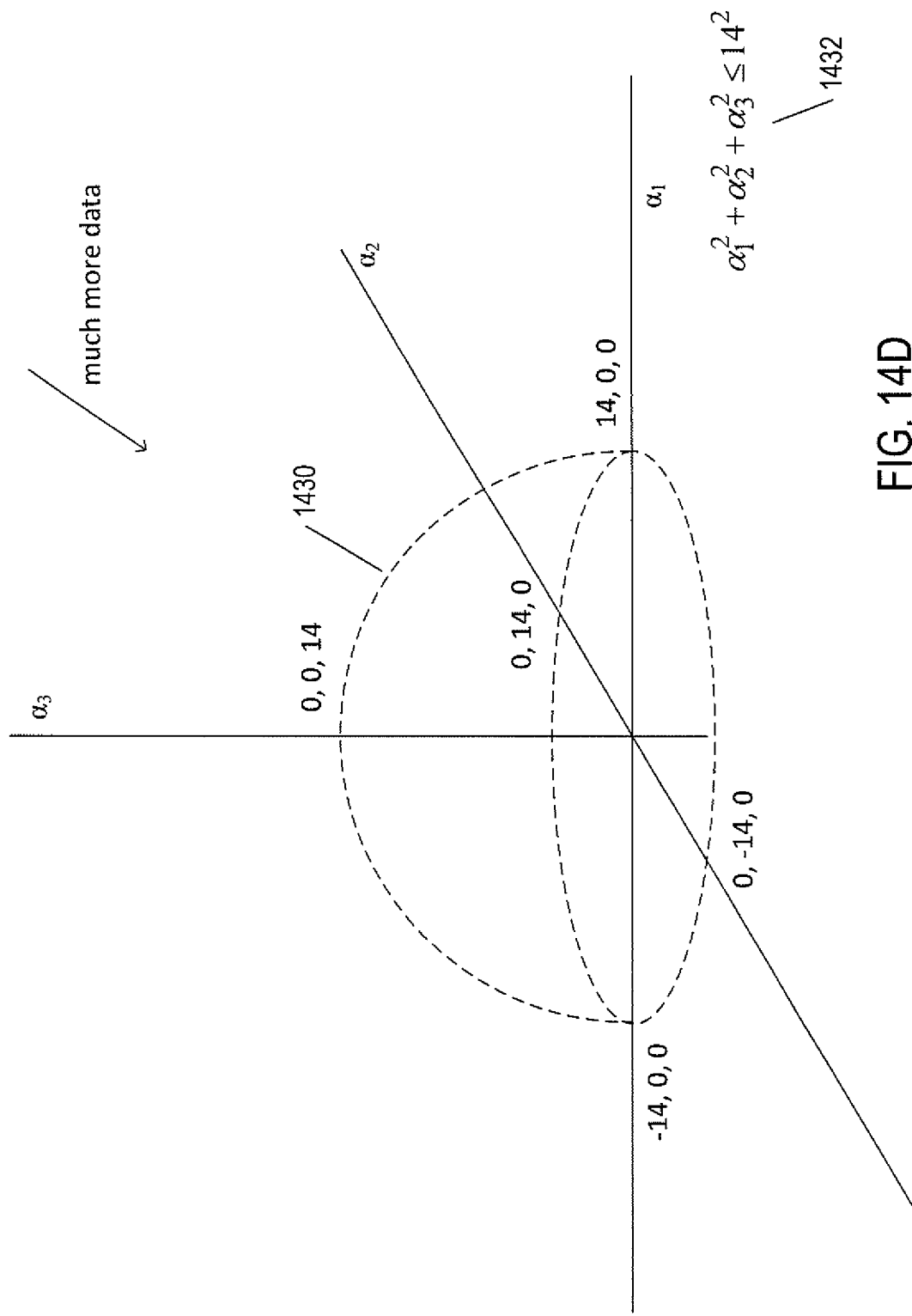

FIG. 14C shows a three-dimensional plot 1420 of the three-attribute vectors or rows in table 1402 shown in FIG. 14A. Other than concluding that the third attribute $\alpha_3$ appears to be always positive, no particular pattern or trend emerges. As shown in FIG. 14D, were very much more data to be collected, it would be possible to recognize that the data points corresponding to the three-dimensional vectors all fall within a hemispherical volume 1430 and that the values of the three attributes $\alpha_1$, $\alpha_2$, and $\alpha_3$ are related by constraint 1432. However, recognition of this pattern and associated constraint would likely require collection of many times more data. Clearly, as the dimensionality of the attribute vectors increases, exponentially greater amounts of data are generally required in order to have any chance of detecting patterns and relationships involving increasing number of attributes. With the extremely high dimensionality of actual metrics collected in computational systems, it would be impossible to collect a sufficient amount of data to have any hope of recognizing patterns and relationships involving even a small fraction of the total number of attributes. Furthermore, in many cases, many attributes are essentially redundant. Large numbers of closely related, redundant attributes may introduce a great deal of noise and low-level variation within the data set that obscures patterns, trends, and distributions that, were they recognized, would provide for simplification in higher-level prediction and diagnosis as well as insight into complex system behaviors.

Principle feature analysis ("PFA") is a technique used to select a subset of the dimensions of a high-dimensional data space that includes a significant portion of the overall variance within the data set. FIGS. 15A-F illustrate the operations conducted in principal feature analysis to select a subset of the attributes, or dimensions, of a set of metric data in order to reduce the dimensionality of the metric data while retaining much of the useful information in the metric data. By reducing the dimensionality, much of the redundancy in information is removed and the lower dimensionality facilitates identification of meaningful patterns and distributions.

Figure 15A:
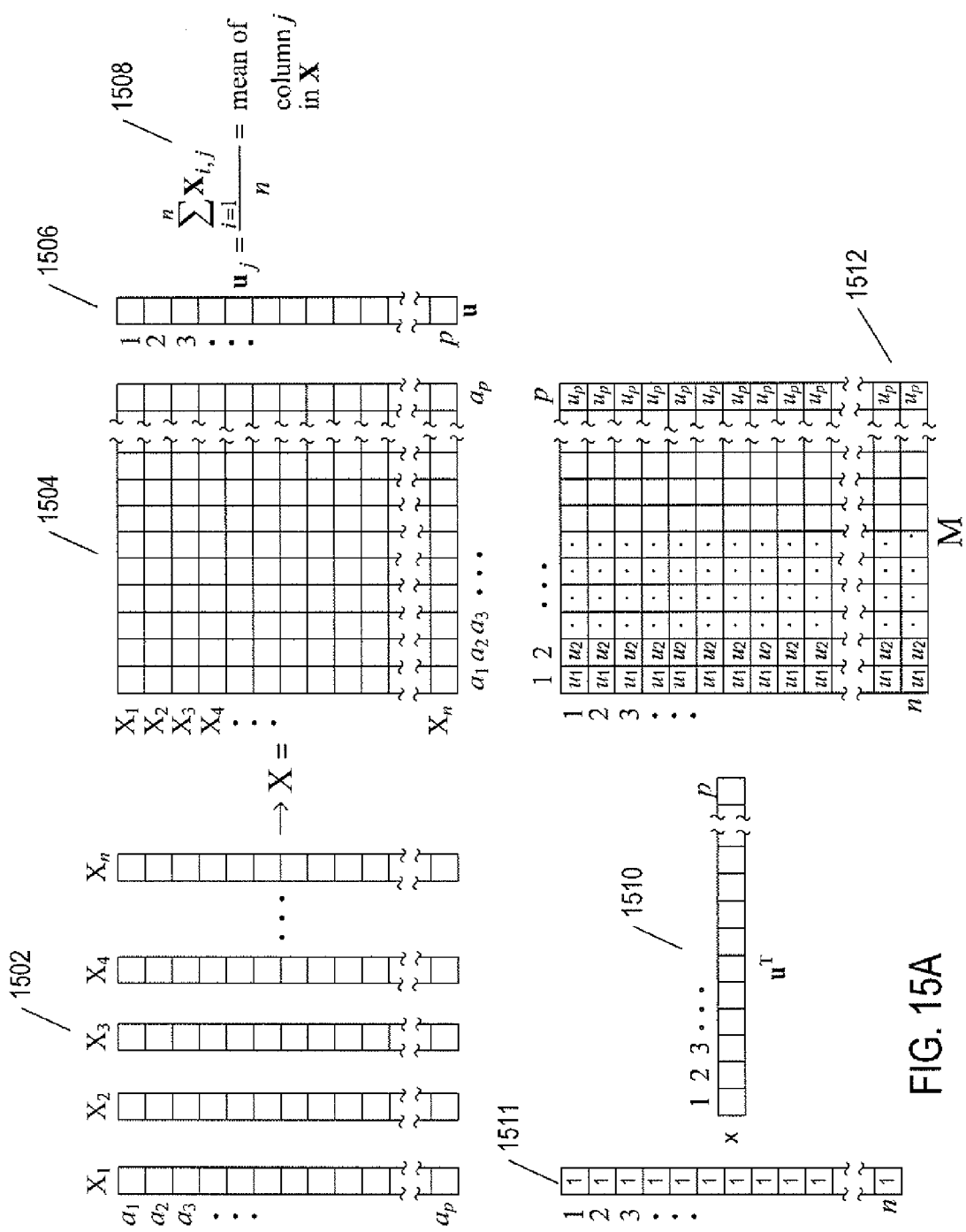

As shown in FIG. 15A, the initial metric data 1502 is a set of n attribute vectors $X_1, X_2, \ldots, X_n$. Each attribute vector includes values for p different attributes $\alpha_1, \alpha_2, \ldots, \alpha_p$. Again, without loss of generality, the values can be considered to be floating-point numbers. In a first step, as shown in FIG. 15A, the attribute vectors, or metric vectors, are transposed into row vectors that are assembled into the metric-data matrix X 1504. Each row in the matrix X corresponds to a different one of the metric vectors 1502. In addition, a column vector u 1506 is constructed with p entries. Each entry of vector u includes the numeric mean of the entries in a column of the matrix X, as indicated by expression 1508 in FIG. 15A. Thus, $u_j$ is the numeric mean of column j in matrix X.

In a next step, shown in FIG. 15A, the column vector u is transposed to a row vector 1510 and multiplied with a column vector containing all "1" entries 1511 to produce the matrix M 1512. The matrix M contains, in each row, a copy of the transposed column vector u. Next, as shown in FIG. 15B, the matrix M 1512 is subtracted from the matrix X 1504 to produce the matrix B 1513. The matrix B stores mean-subtracted metric data. Note that all of matrices X, M, and B are n×p dimensional matrices.

Next, as shown in the lower portion of FIG. 15B, the matrix B is multiplied with the transpose of matrix B, $B^T$ 1514, and the resulting p×p matrix is multiplied by $$\frac{1}{n-1}$$

to produce the covariance matrix C 1516. The covariance matrix provides the covariance for each pair of attributes or dimensions within the metric data, as shown in expression 1516.

Next, as shown in FIG. 15C, the eigenvalues and eigenvectors of the covariance matrix C are found. The basic eigenvalue expression 1520 states that an eigenvector v of the covariance matrix C multiplied with the covariance matrix C is equal to the product of a scalar value $\lambda$ and the eigenvector v. This equation can be rearranged, as shown in the pair of equations 1522, to show that the product of matrix $(C-\lambda I)$ and the eigenvector v is equal to the all-zeros column vector 0. This expression leads to non-trivial results only when the determinant of the matrix $(C-\lambda I)$ is equal to 0 or, in other words, when the matrix $(C-\lambda I)$ is not invertible. The expression for the determinate being 0 leads to a polynomial expression in $\lambda$ with n roots 1524. Solving of this polynomial expression leads to the eigenvalues of the covariance matrix. With these eigenvalues determined, expression 1520 can be used to find the eigenvectors of the covariance matrix $v_1, v_2, \ldots, v_p$ using the eigenvalue equation 1520. The eigenvectors can be combined together to produce the matrix V 1526. The matrix V can then be used to diagonalize the covariance matrix C to produce the diagonal matrix D 1528. The values along the diagonal of matrix D are the eigenvalues of the covariance matrix. These eigenvalues can be rearranged in order of decreasing magnitude, with the corresponding eigenvectors identically rearranged, to produce matrices D' and V' 1530 and 1531. The matrix D' is then used to choose a value q as the dimension of the subset of the metric data generated by principal feature analysis. A value $g_j$ is defined as the sum of the values along the diagonal of D' down to and including the $j^{th}$ eigenvalue $\lambda'_j$ 1532. The value q is chosen so that $g_q$ is greater than or equal to a threshold percentage times $g_p$ 1534. The eigenvalues represent the distribution of the energy of the metric data among each of the eigenvectors and $g_j$ is the cumulative energy for the eigenvalues from 1 to j.

Figure 15D:
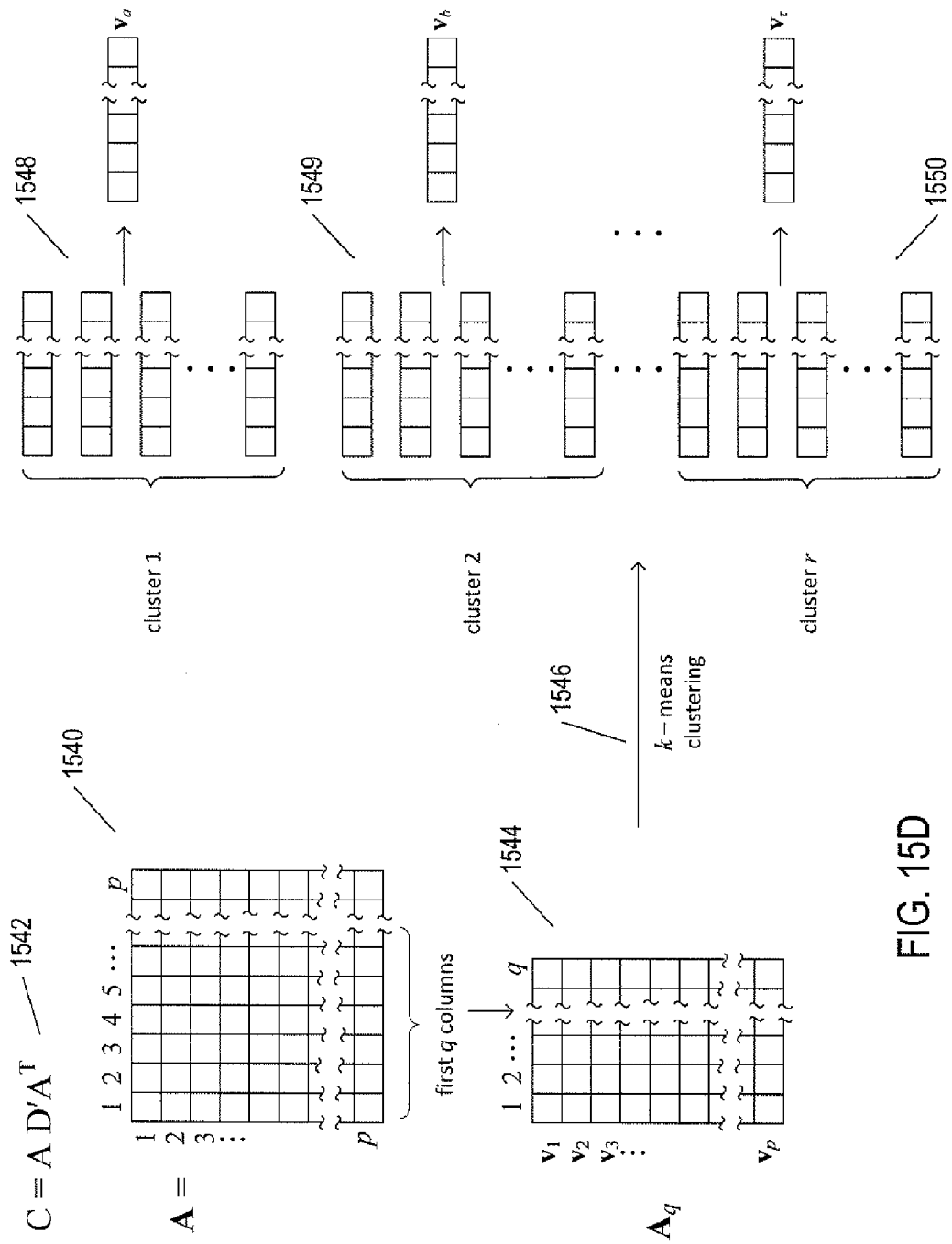
Figure 15E:
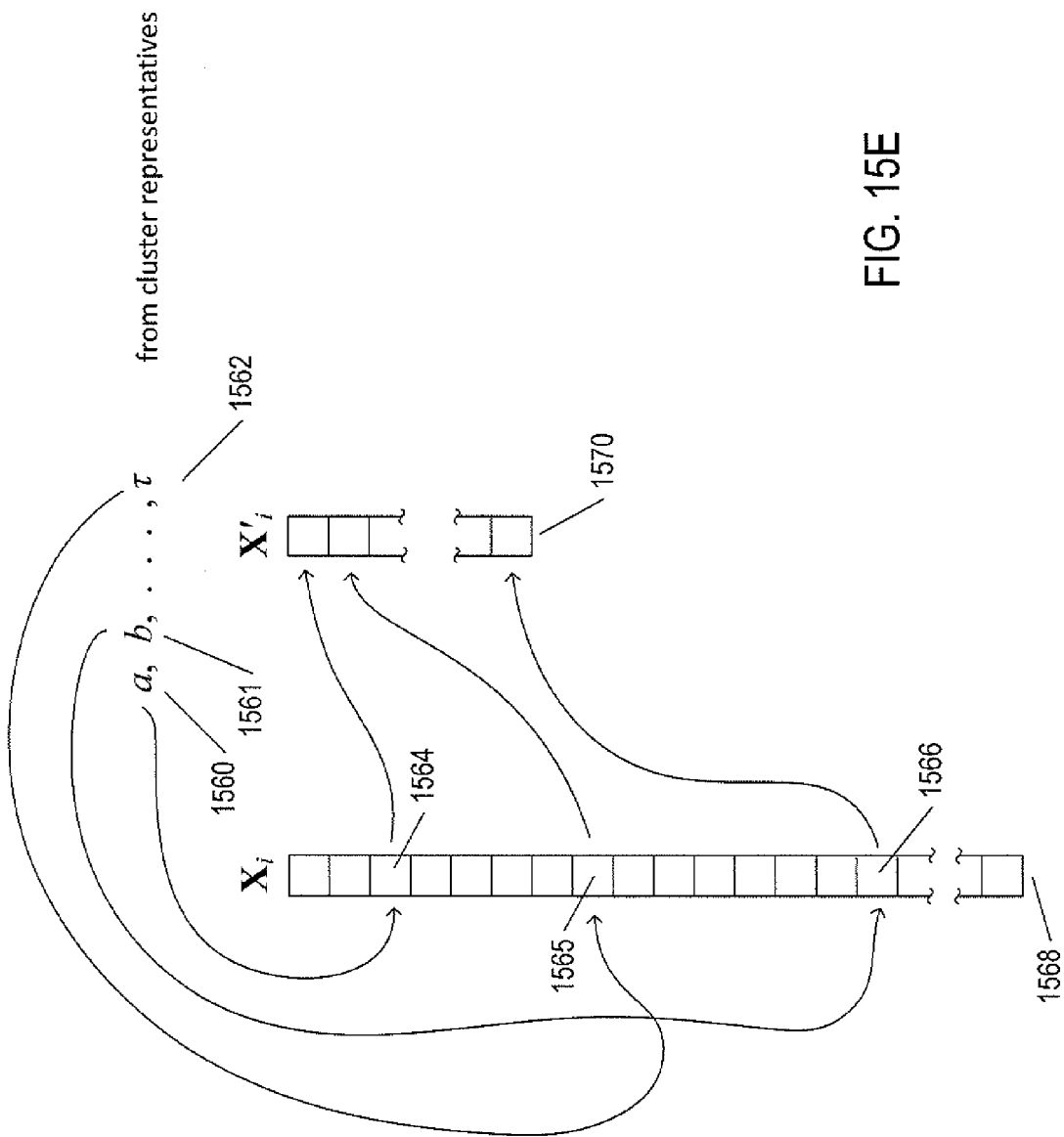

In FIG. 15D, the matrix A 1540 is essentially equivalent to matrix V' discussed above with reference to FIG. 15C. Thus, the matrix A 1540 can be used to diagonalize the covariance matrix C to produce matrix D' and can be used to generate the covariance matrix C from matrix D' 1542. Matrix A contains re-sorted eigenvectors for the covariance matrix. Next, the first q columns of matrix A are selected to form the p×q matrix $A_q$ 1544. The rows of this matrix represent projections of n-dimensional features into a q-dimensional subspace. These q-dimensional rows are labeled $v_1, v_2, \ldots, v_p$ in FIG. 15D. In a next step, shown in FIG. 15D, a k-means clustering method 1546 is used to cluster the rows of matrix $A_q$ into r clusters, where p>r>q. The centroids of the r clusters 1548-1550 are computed and the q-dimensional vectors closest to the centroids of each cluster are selected as the features for lower-dimensional metric vectors that together form the metric-data subset generated by the principal feature analysis. As shown in FIG. 15E, the identities of the selected features 1560-1562 are used to select corresponding attributes 1564-1566 from the initial metric vectors $X_i$ 1568 for inclusion in the lower-dimensional metric vectors $X'_i$ 1570. In certain implementations, r−q of the lowest populated clusters can be merged into the remaining clusters in order that the final number of clusters is q.

Figure 15F:
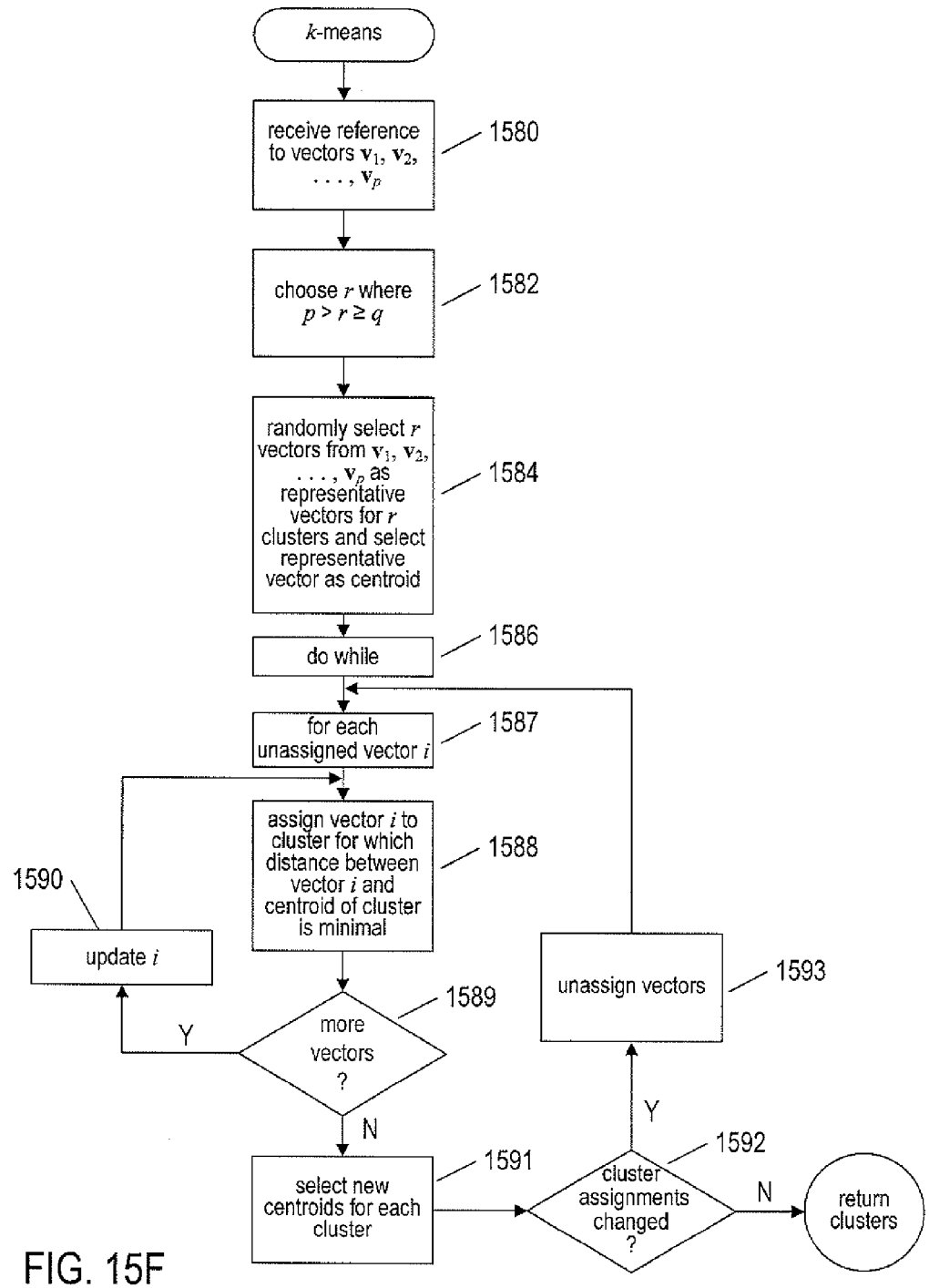

FIG. 15F illustrates k-means clustering. In step 1580, the k-means clustering routine receives a reference to the set of vectors $v_1, v_2, \ldots, v_p$ extracted from matrix $A_q$. In step 1582, the number of clusters r is chosen. Then, in step 1584, r vectors are randomly selected from the received vectors as representative vectors for r clusters and are used as the initial centroids for the clusters. Next, in an outer loop 1586-1593, clusters are iteratively reconstructed until there is no change in cluster membership from the most recently constructed set of clusters and the previous set of clusters. In the inner for-loop of steps 1587-1590, each unassigned vector of the p receive vectors is assigned to a cluster with a centroid closest to the unassigned vector. Once all vectors have been assigned to clusters, a new centroid is computed for each cluster in step 1591. When the assignments of vectors to clusters has changed, as determined in step 1592, the vectors are unassigned from clusters and reassigned to clusters in a next iteration of the outer loop of steps 1586-1593. This process continues until the assignment of vectors to clusters becomes stable and does not change over two iterations.

Figure 16A:
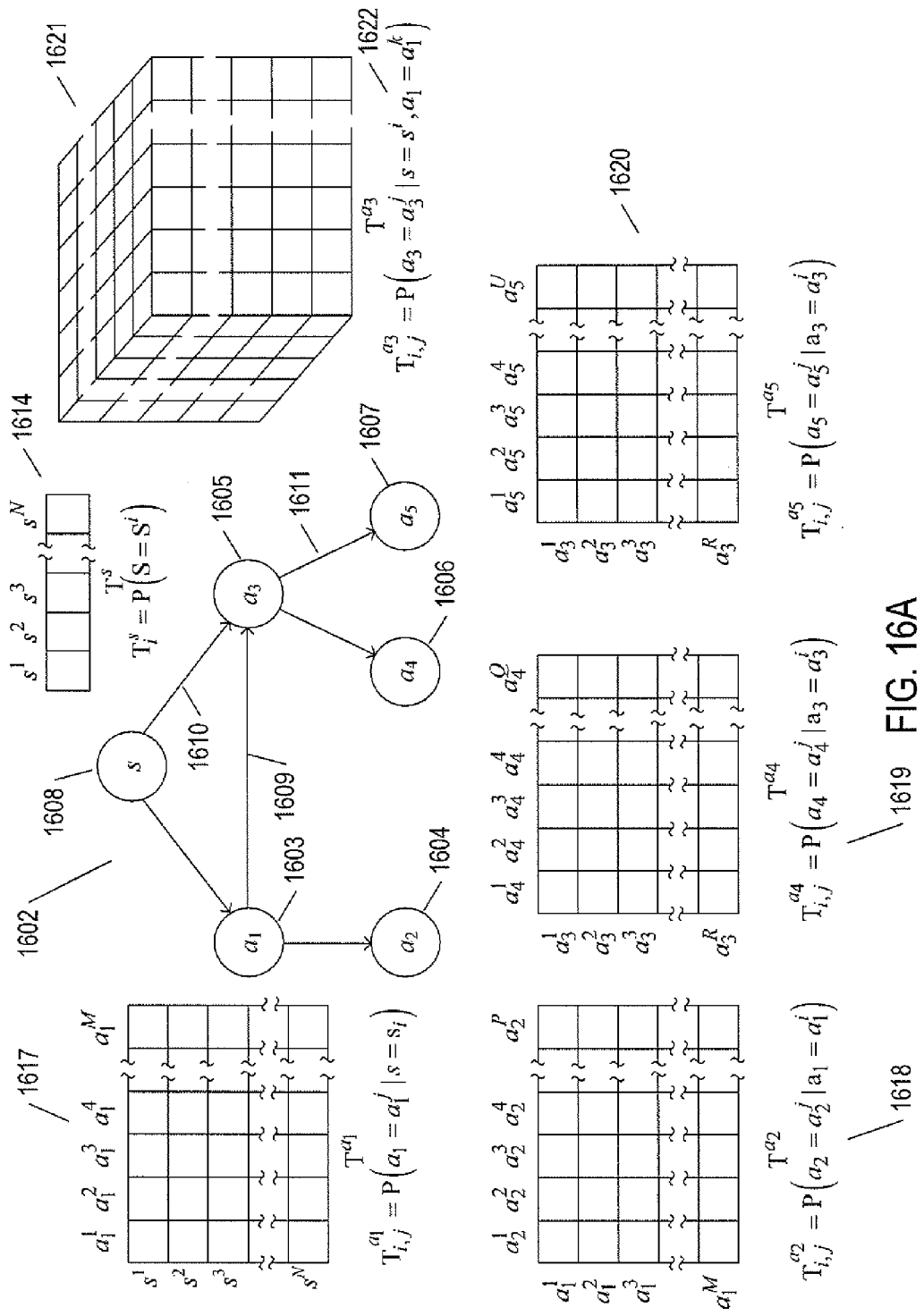

Bayesian networks are convenient, graphical representations of joint probability distributions. FIGS. 16A-D illustrate general Bayesian networks and naïve Bayesian networks. A Bayesian network is represented as a directed acyclic graph ("DAG"). FIG. 16A shows a very simple DAG representation 1602 of a Bayesian network. Each node of a Bayesian network represents a variable. In the current discussion, the variables are attributes or metrics that can take on various different values. The example Bayesian network 1602 include five nodes 1603-1607 that represent general attributes $\alpha_1$-$\alpha_5$ and a sixth node 1608 that represents a special metric s that is discussed further below. The directed edges, represented by single-headed arrows, such as arrow 1609, represent conditional dependencies. For example, edge 1609 indicates that the value of attribute $\alpha_3$ is conditionally dependent on the value of attribute $\alpha_1$. In the following discussion, the expression $P(\alpha_3=2)$ represents the probability that attribute $\alpha_3$ currently has the value 2. The expression $P(\alpha_3=2|\alpha_1=3)$ represents the probability that attribute or metric $\alpha_3$ has the value 2 given that the value of metric $\alpha_1$ is 3. The first expression, in which only $\alpha_3$ occurs, is an unconditional probability and the second expression is a conditional probability. In the following discussion, for notational convenience, the expression $P(\alpha_3)$ is used to indicate the probability of any particular possible value of attribute $\alpha_3$ and the expression $P(\alpha_3|\alpha_1)$ is used to indicate the probability that $\alpha_3$ has a particular probability given that metric $\alpha_1$ has the same or a different particular value. Another way of looking of these last two expressions is that they stand for probability distributions. The expression $P(\alpha_3)$ may be represented by a one-dimensional table in which the probability for $\alpha_3$ having one of the possible values for $\alpha_3$ is given by an entry indexed by the possible value. The expression $P(\alpha_3|\alpha_1)$ may stand for a conditional probability distribution which, for attributes $\alpha_3$ and $\alpha_1$ have values selected from two sets of discrete values, may be represented as a two-dimensional table, each row of which represents the probability distribution for attribute $\alpha_3$ given that attribute $\alpha_1$ has a particular value. Examples of such tables are shown in FIG. 16A and are discussed, in more detail, below. In probability and statistics, a variable that can take on different values when the value of the variable is sampled by experiment or observation is referred to as a "random variable." Thus, the metrics that are collected and analyzed by the analysis subsystem to which the current document is directed can be considered to be random variables. However, for the sake of brevity, these metrics or attributes are referred to simply as "variables" in the present discussion.

In the case that $P(\alpha_3|\alpha_1)=P(\alpha_3)$, the variables $\alpha_3$ and $\alpha_1$ are considered to be independent. That is, the probability that $\alpha_3$ currently has any particular value does not depend on the current value of attribute $\alpha_1$. By contrast, when $P(\alpha_3|\alpha_1) \neq P(\alpha_3)$, then variable $\alpha_3$ is conditionally dependent on variable $\alpha_1$. In a Bayesian network, all of the direct conditional dependencies are represented by directed edges. The absence of a path between two variables in the DAG representation of a Bayesian network indicates that the two variables are independent. A directed edge between two variables indicates that the variable to which the edge points is conditionally dependent on the variable from which the edge points. A path of arrows linking two variables, such as edges 1610 and 1611 linking variables 1608, 1605, and 1607 indicates that, given knowledge of the current value of the middle variable $\alpha_3$, there is no dependence between the variable s and the variable $\alpha_5$. In other words, because the current value of variable $\alpha_3$ is known, the probability of variable $\alpha_5$ having any particular value can be determined without regard to the current value of variable s.

Each node in the DAG representing the Bayesian network is associated with a representation of the probability or conditional probability of the values of the variable. There are no conditional dependencies with respect to the variable s 1608 and, therefore, a one-dimensional unconditional probability table 1614 is associated with node 1608 representing variable s. This unconditional probability table $T^s$ includes N entries indexed by the possible values of variable s $s^1, s^2, s^3, \ldots, s^N$. Each entry represents the probability of the variable s having the corresponding indexing value at a particular time or, in other words, when randomly selected. Node 1603 representing the variable $\alpha_1$ conditionally depends on the value of variable s, as indicated by directed edge 1616. Therefore, node 1603 is associated with a two-dimensional probability table $T^{\alpha_1}$ 1617. Each row in the table is indexed by one of the N possible values of the variable s. Each column in the table is indexed by one of the M possible values for variable $\alpha_1$. Thus, each row in table $T^{\alpha_1}$ is a one-dimensional probability distribution for variable $\alpha_1$ given a particular value of the variable s. Each of nodes 1604, 1606, and 1607 also have a single conditional dependency and therefore each of these nodes is associated with a corresponding two-dimensional conditional probability table 1618, 1619, and 1620, respectively. Node 1605, corresponding to variable $\alpha_3$, has two conditional dependencies, indicated by directed edges 1609 and 1610, as a result of which node 1605 is associated with a three-dimensional conditional probability table 1621. As indicated in the expression 1622 below the depiction of the three-dimensional probability table 1621, a given element of this table $T_{i,j,k}^{\alpha_3}$, is the probably of the variable $\alpha_3$ having the particular value $\alpha_3^j$ given that the variable s has the value $s^i$ and the variable $\alpha_1$ has the value $\alpha_1^k$.

The hypothetical Bayesian network 1602 shown in FIG. 16A is extremely simple, with only a handful of variables, each having only 0, 1, or 2 conditional dependencies on other variables. For a complex higher-dimensional metric subspace, there would be many more nodes, some of which generally associated with much higher-dimensional conditional probability tables dues to many more conditional dependencies.

Figure 16B:
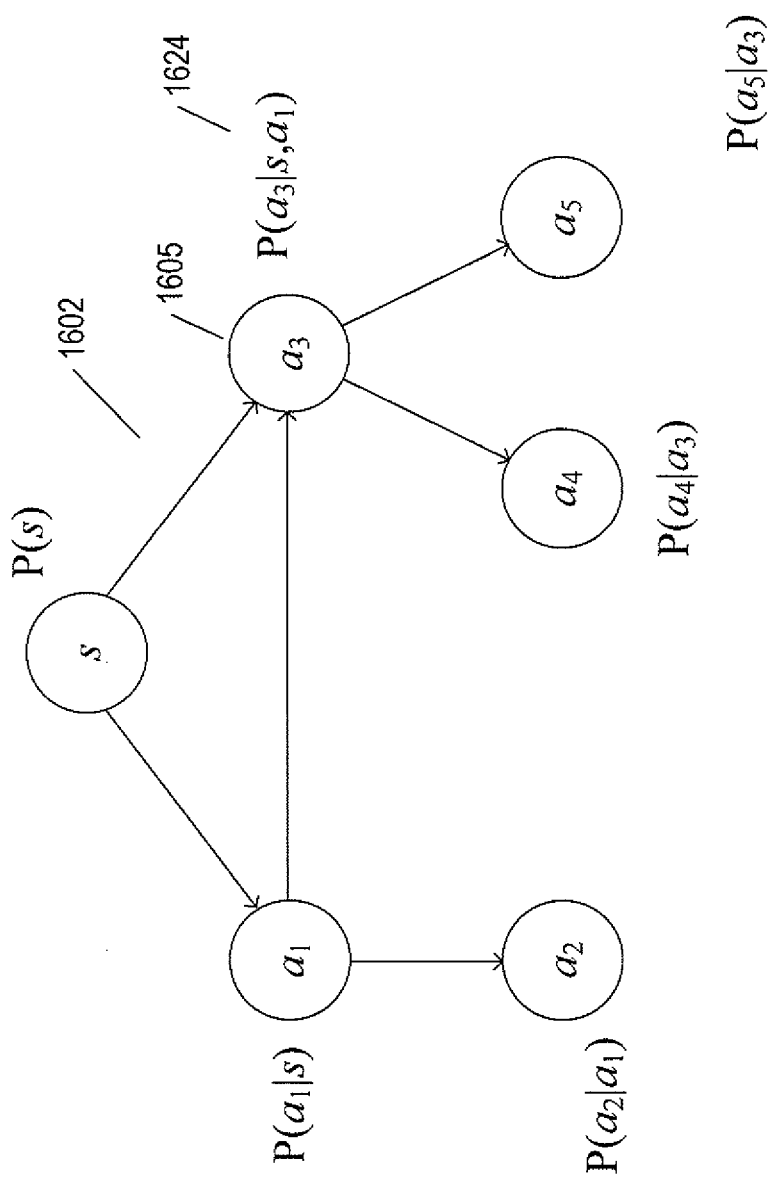

FIG. 16B shows a simpler representation of the hypothetical Bayesian network 1602 shown in FIG. 16A. Rather than showing depictions of the probability-distribution tables associated with each node, the probability distributions are represented by an expression, such as expression 1624 associated with node 1605. As indicated by expression 1626 in FIG. 16B, the hypothetical Bayesian network 1602 is a representation of the joint probability distribution P(s, $\alpha_1, \alpha_2, \alpha_3, \alpha_4, \alpha_5$) which can be alternatively expressed as the product of the non-conditional probability distribution for variable s, P(s), and the conditional probability distributions corresponding to the remaining nodes.

In the current example, the variables take on discrete values and therefore the probability distributions can be represented by tables. In other cases, when variables have real or floating-point values, the probability distributions may be represented by parameterized probability-distribution expressions, such as Gaussian, beta, gamma, binomial, Poisson, or other parameterized expressions for probability distributions. Having a description of a joint probability distribution allows for computation of many useful probabilities from incomplete data. For example, assuming that the variable s represents a global state variable of some type, when the computational system described by metrics is known to be in a particular state or, in other words, when the variable s has a particular value then the most probable values for the remaining variables or metrics can be easily computed from the Bayesian network.

FIG. 16C illustrates one of the problems with general Bayesian networks. In FIG. 16C, the size of the conditional probability distribution representation, or table, associated with example nodes having increasing number of conditional dependencies is shown graphically. In FIG. 16C, it is assumed that each variable can take on one of four different values. With one conditional dependency 1630, the conditional probability-distribution table is two-dimensional and includes 16 entries 1632. With two conditional dependencies 1634, the associated conditional probability-distribution table is three-dimensional and has 64 entries 1636. When the known has four conditional dependencies 1638, the associated conditional probability-distribution table is five-dimensional, although represented three-dimensionally in FIG. 16C, and has 1024 entries 1640. Thus, as the complexity of a Bayesian network increases, the amount of stored data increases exponentially. Once the tables increase in dimensions and volume, the computation necessary to make simple inferences based on partial data quickly becomes intractable.

Figure 16D:
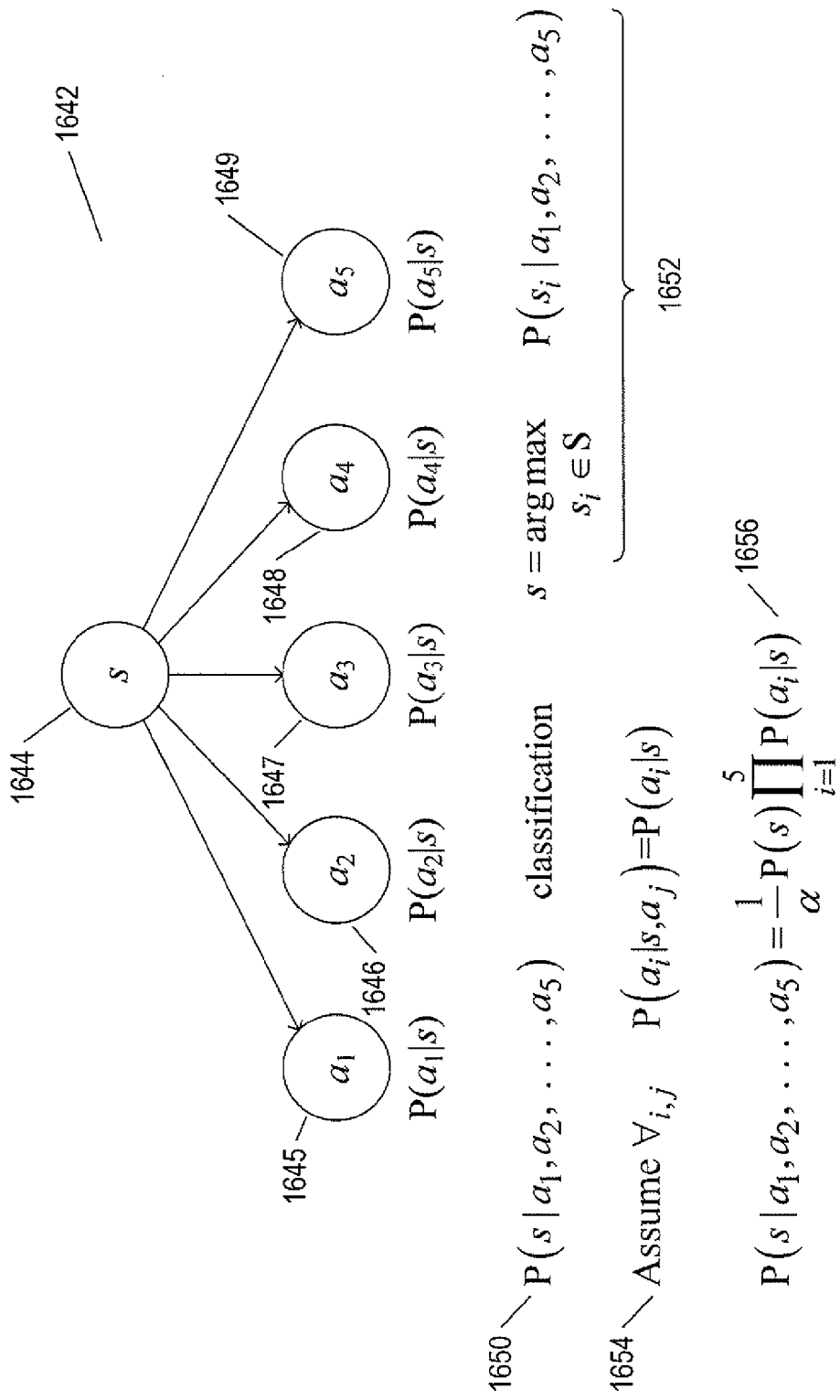

FIG. 16D illustrates one approach to simplifying the complexity of the Bayesian-network representation of a joint probability. FIG. 16D shows a simple naïve Bayesian network 1642 that includes a node representing the special independent variable s 1644 and five nodes 1645-1649 representing the conditionally dependent variables $\alpha_1$-$\alpha_5$. As indicated by expression 1650 in FIG. 16D, a naïve Bayesian network is often used as a classifier by computing the conditional probability that the special variable s has a particular value given known values for the remaining variables $\alpha_1$-$\alpha_5$. The most probable value for the special variable s is the particular value of s, $s_t$, that maximizes this conditional probability expression, as indicated by expression 1652 in FIG. 16D. The basic assumption for a naïve Bayesian network, as shown by expression 1654 in FIG. 16D, is that the special variable is independent and that all other variables are conditionally dependent only on the special variable. The conditional probability of the special variable having a particular value, given particular values for the remaining variables, can be computed as the product of the independent probability of the particular value of s and the conditional probabilities for the remaining variables, as indicated by expression 1656 in FIG. 16D.

Figure 17:
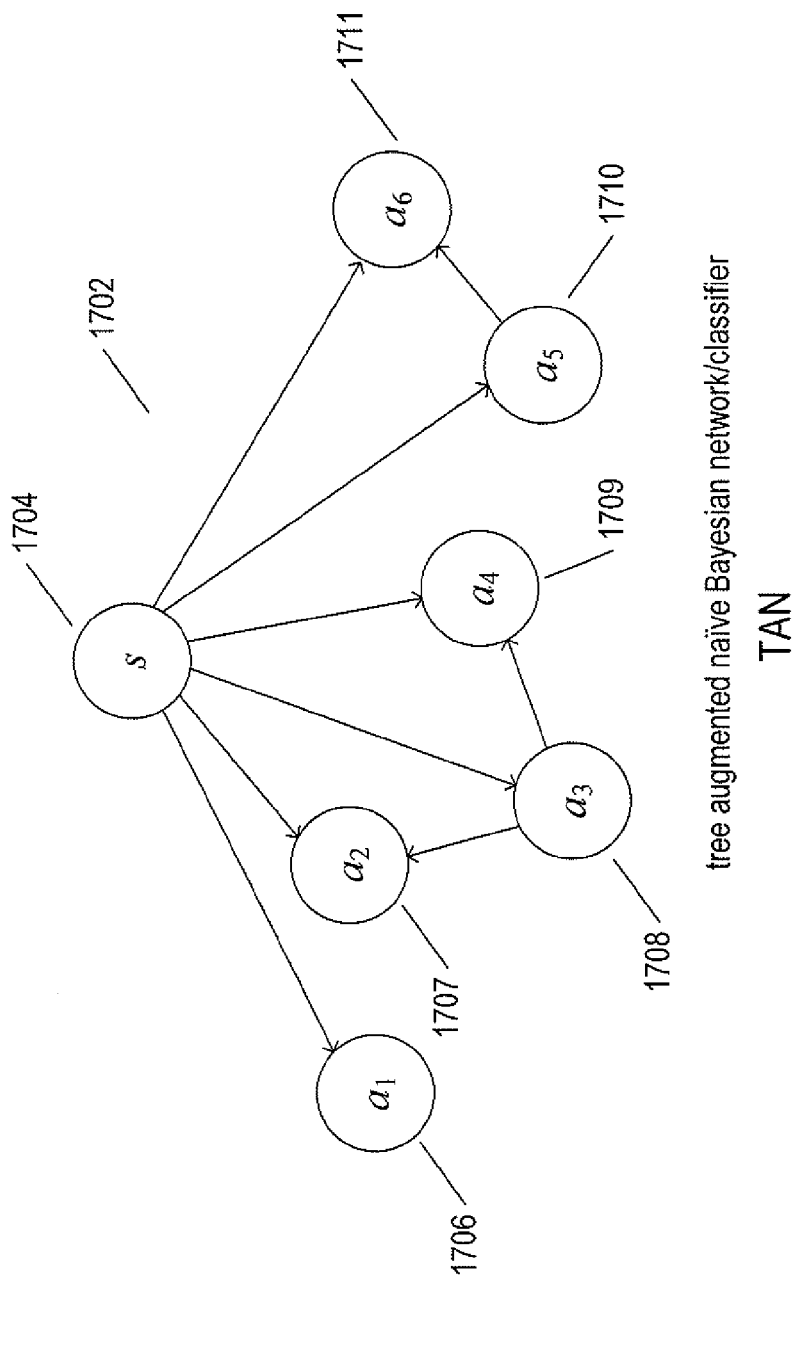
FIG. 17 illustrates an example TAN.

Naïve Bayesian networks simplify computations of inferences based on joint probability distributions and are surprisingly effective in many situations. However, a naïve Bayesian network may oversimplify the representation of certain types of joint probabilities by ignoring interdependencies between the variables. A compromise approach is to represent the joint probability distribution as a tree-augmented naïve Bayesian network/classifier ("TAN"). FIG. 17 illustrates an example TAN. The example TAN 1702 includes a node representing the special variable s 1704 and six nodes representing conditionally dependent variables $\alpha_1$-$\alpha_6$ 1706-1711. A TAN has a number of properties 1720 that are listed below the representation of the TAN 1702 in FIG. 17. A TAN has a single root node with no parents. Each non-root node of the TAN includes the root node as a parent. In other words, as shown in representation 1702, each non-special or non-root variable $\alpha_1$-$\alpha_6$ is linked to the root node by a directed edge. In addition, in order to incorporate a subset of the potential interdependencies between the non-special variables, each non-root node may have one additional parent. Therefore, as discussed above with reference to FIG. 16A, the conditional probability distribution associated with each node has at most three dimensions. Thus, the TAN is sufficiently constrained to prevent the exponential combinatorial explosion in the sizes of conditional probability-distribution representations associated with the nodes of the TAN. A final property shared by the Tan with Bayesian networks and naive Bayesian networks is that the TAN can be represented by a DAG.

Figure 18A:
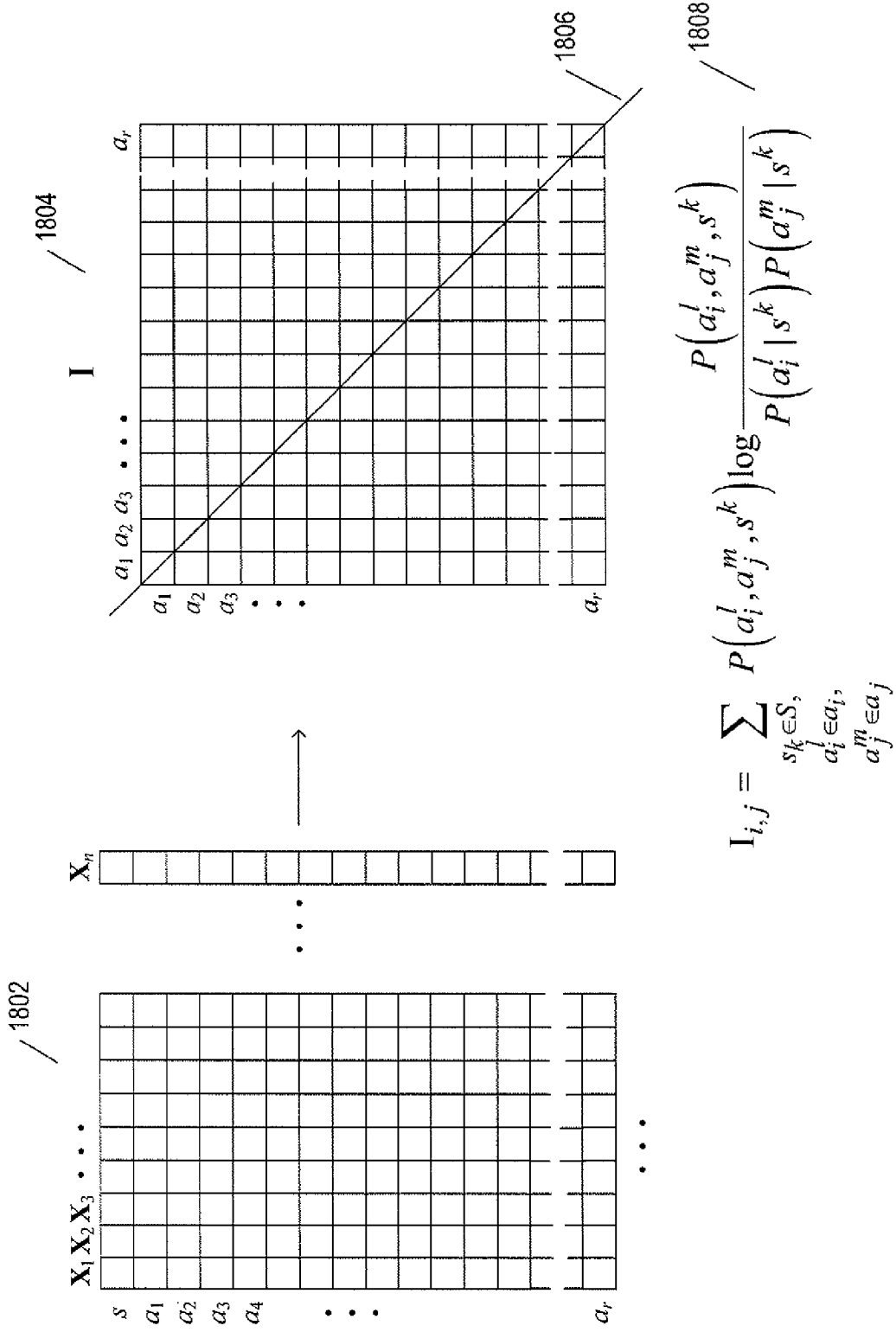
FIGS. 18A-E illustrate a method for constructing a TAN to describe the joint probability distribution represented by a set of metric data.
Figure 18B:
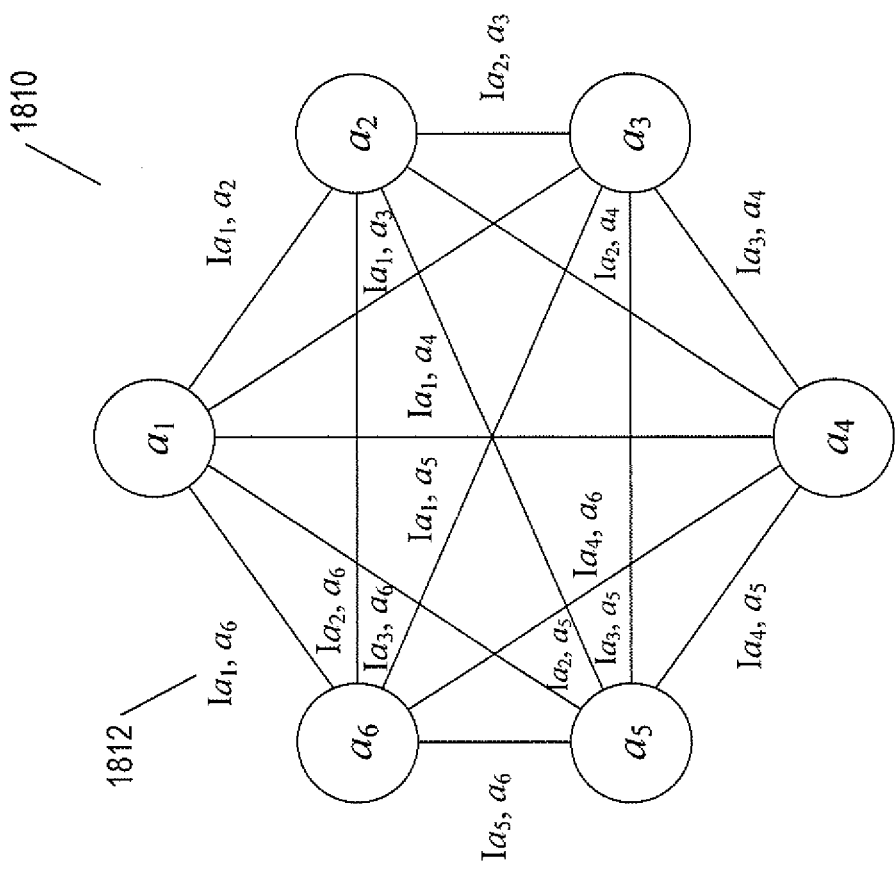

FIGS. 18A-E illustrate a method for constructing a TAN to describe the joint probability distribution represented by a set of metric data. In FIG. 18A, the metric-vector data set 1802 is shown as n metric vectors, each including values for the attributes or variables s and $\alpha_1$-$\alpha_r$. In a first step, a mutual conditional information table 1804 is computed based on the sample set represented by the metric vectors 1802. As indicated by diagonal line 1806, the mutual-conditional-information matrix I 1804 is symmetric, as a result of which only the upper or lower diagonal portion of the matrix needs to be computed. Expression 1808 illustrates computation of the mutual conditional information for a pair of non-root variables $\alpha_i$ and $\alpha_j$. Next, as shown in FIG. 18B, the non-root metric variables each represented by a node and the nodes are fully interconnected by undirected edges to form a fully connected graph 1810. Each edge in the graph is associated with the mutual conditional information computed for the nodes connected by the edge, as indicated by the edge labels, or weights, in FIG. 18B, such as edge label 1812.

Figure 18C:
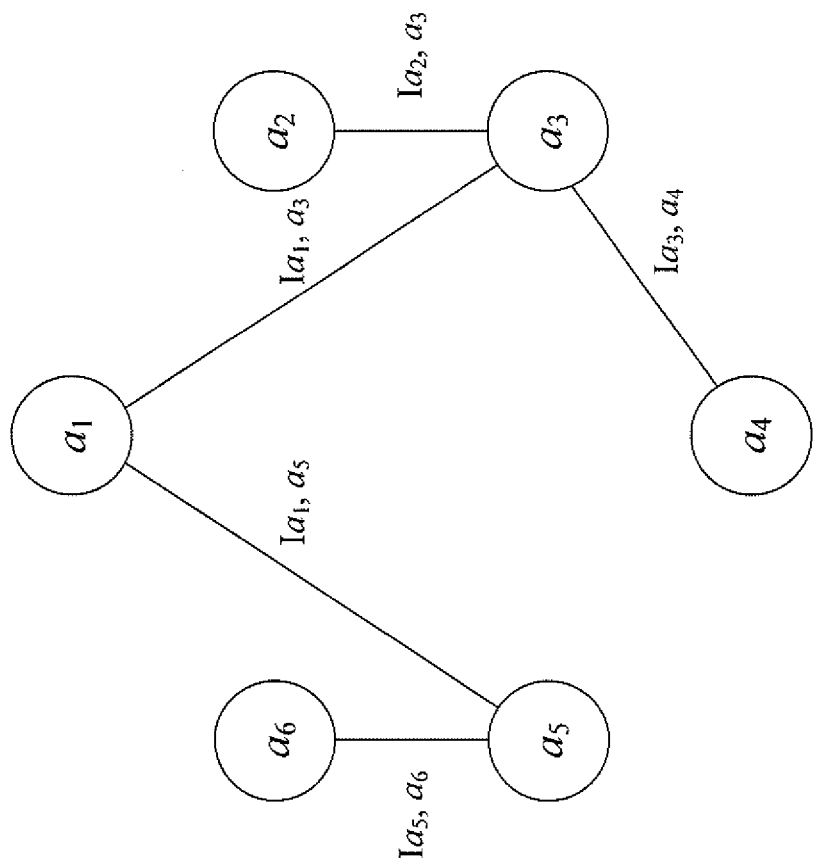
Figure 18D:
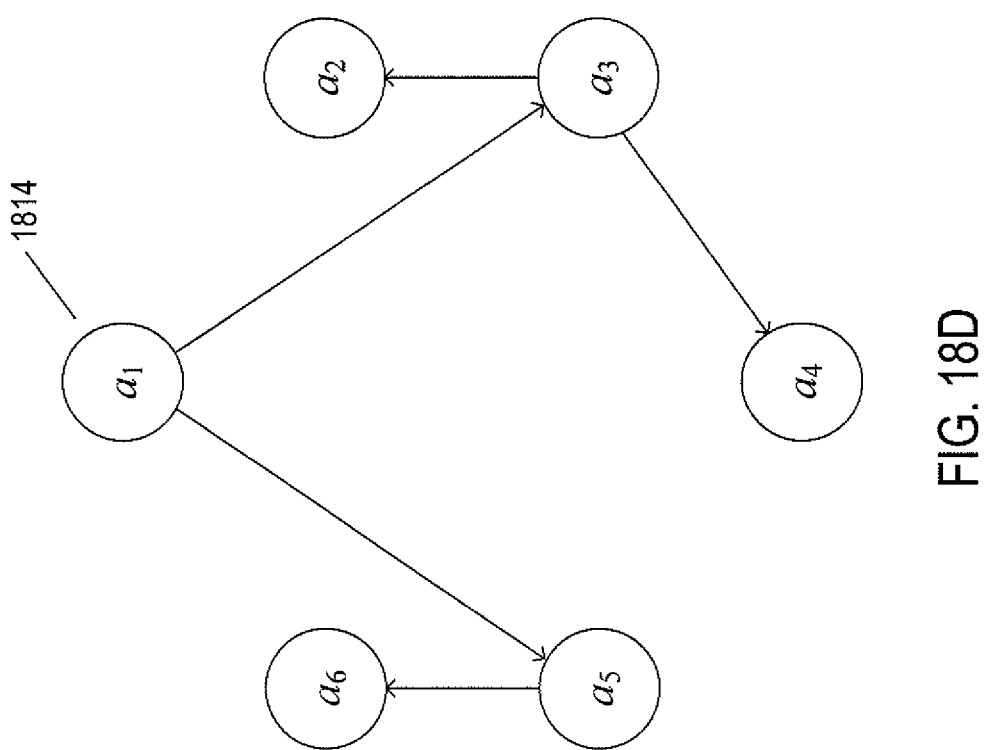
Figure 18E:
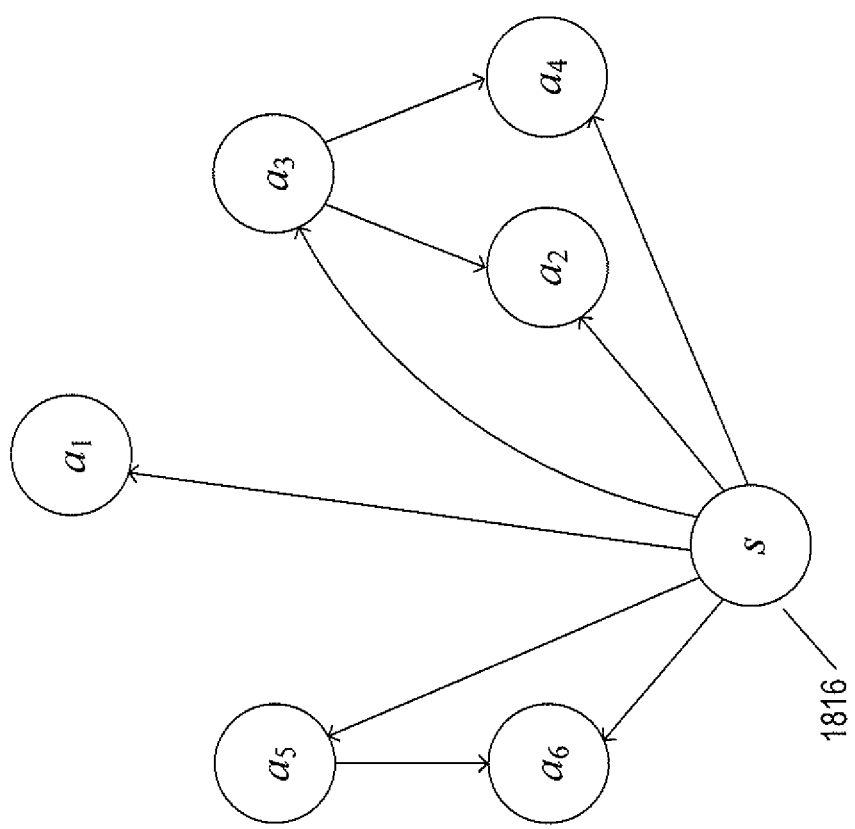

In a third step, the result of which is illustrated in FIG. 18C, a spanning tree with maximum weight is generated from the fully connected graph shown in FIG. 18B. A spanning tree has sufficient number of edges to interconnect all of the nodes. There are efficient methods for computing maximally weighted spanning trees from fully connected graphs with weight-associated non-directional edges. In a next step, the result of which is shown in FIG. 18D, one of the nodes, in this case node 1814, is selected as a root node and directions are assigned to the edges of the spanning tree emanating out and away from the root node. In a final step shown in FIG. 18E, a node for the special variable s 1816 is introduced into the graph and directly connected by directed edges with every other node already present within the graph.

A TAN is thus a compromise between the computational simplicity of a naïve Bayesian network and the complexity of a general Bayesian network. Unlike a general Bayesian network, a TAN does not include all of the potential conditional dependencies between variables but, unlike a naïve Bayesian network, includes at least an important subset of these conditional dependencies.

Figure 19:
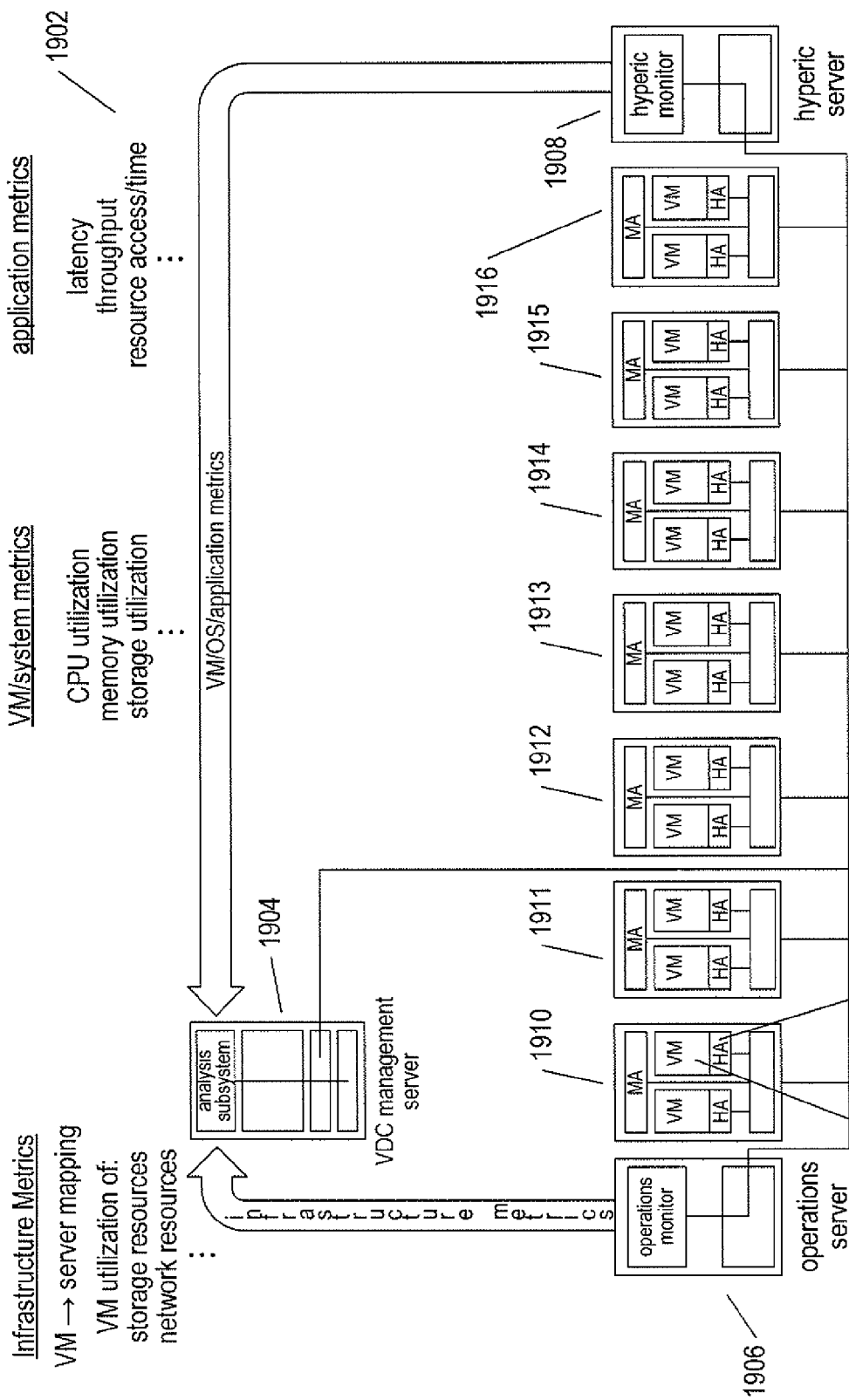
FIGS. 19-22 illustrate an implementation of the analysis subsystem to which the current application is directed.

Analysis of Subsystem and Analytic Methods to which the Current Application is Directed FIGS. 19-22 illustrate an implementation of the analysis subsystem to which the current application is directed. FIG. 19 provides a high-level diagram of the analysis subsystem within a virtual data center. The virtual data center 1902 includes a VDC management server 1904, an operations server 1906, and a hyperic server 1908 in addition to a large number of application servers 1910-1916. In the illustrated implementation, the analysis subsystem to which the current application is directed is included as a subcomponent of the VDC management server 1904. In alternative implementations, the analysis subsystem may be a subcomponent of a separate server computer. The operations server 1906 monitors and collects infrastructure metrics related to the virtual data center. Infrastructure metrics include mappings of virtual machines to servers and virtual-machine utilizations of various types of virtual-data-center resources, including storage resources and network resources. The hyperic server 1908 receives information from hyperic agents associated with virtual machines, such as hyperic agent 1920 associated with virtual machine 1922 executing within server 1910. The hyperic agents collect and forward, to the hyperic server, metrics related to the virtual machine and system, including CPU utilization, memory utilization, and storage utilization as well as application metrics with regard to applications executed by the VM. Application metrics may include measures of the latency, throughput, and access to resources per unit period of time. Infrastructure metrics are forwarded by the operations server to the analysis subsystem and system/application metrics are forwarded to the analysis subsystem by the hyperic server 1908.

The currently disclosed analysis subsystem may be used to provide the results of inferences with respect to complex conditional probability distributions involving metrics received from multiple metrics sources, including the hyperic server and operations server in the implementation shown in FIG. 19.

Figure 20:
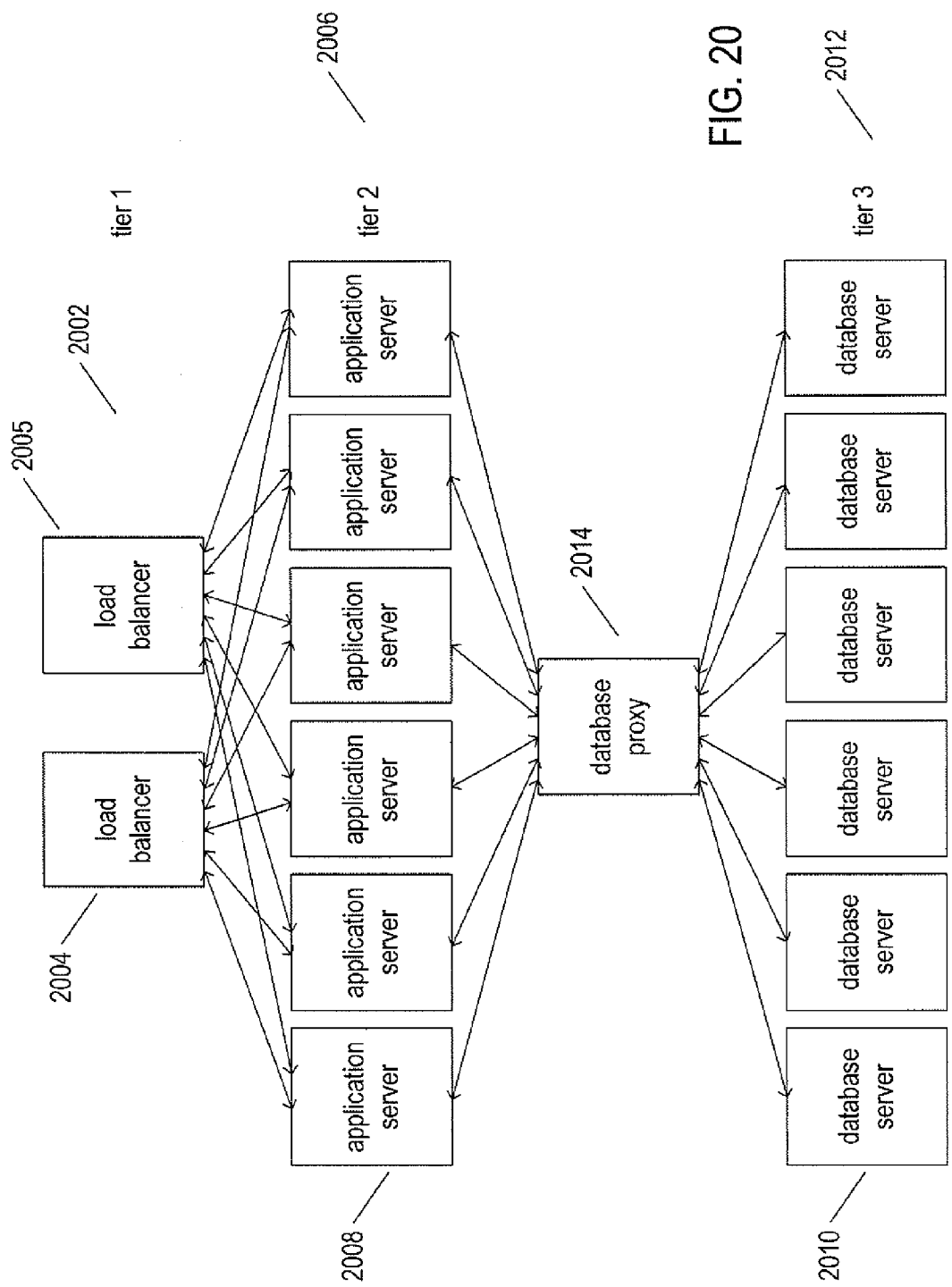

The analysis subsystem is particularly suited for providing inferences related to a multi-tiered application distributed among many virtual and physical servers within the virtual data center or a cloud-computing environment. FIG. 20 illustrates a multi-tiered application. The multi-tiered application may support an e-commerce retailing website, for example, or a distributed, Internet-based computational service, as another example. A first tier 2002 include two or more load-balancer components 2004-2005 running on two or more servers. These load-balancer components may function as web servers that receive remote requests and distribute the remote requests among second-tier application servers. The second tier 2006 includes multiple application servers, such as application server 2008, that receive requests from the load balancer components, execute the requests, and return responses through the load-balancer components to remote entities. The application servers may, in turn, employ services provided by a number of database servers, such as database server 2010, residing in a third tier 2012. An application server accesses a database server through a database proxy server 2014 which, like the load-balancer components, distributes database tasks among multiple database servers.

Figure 21:
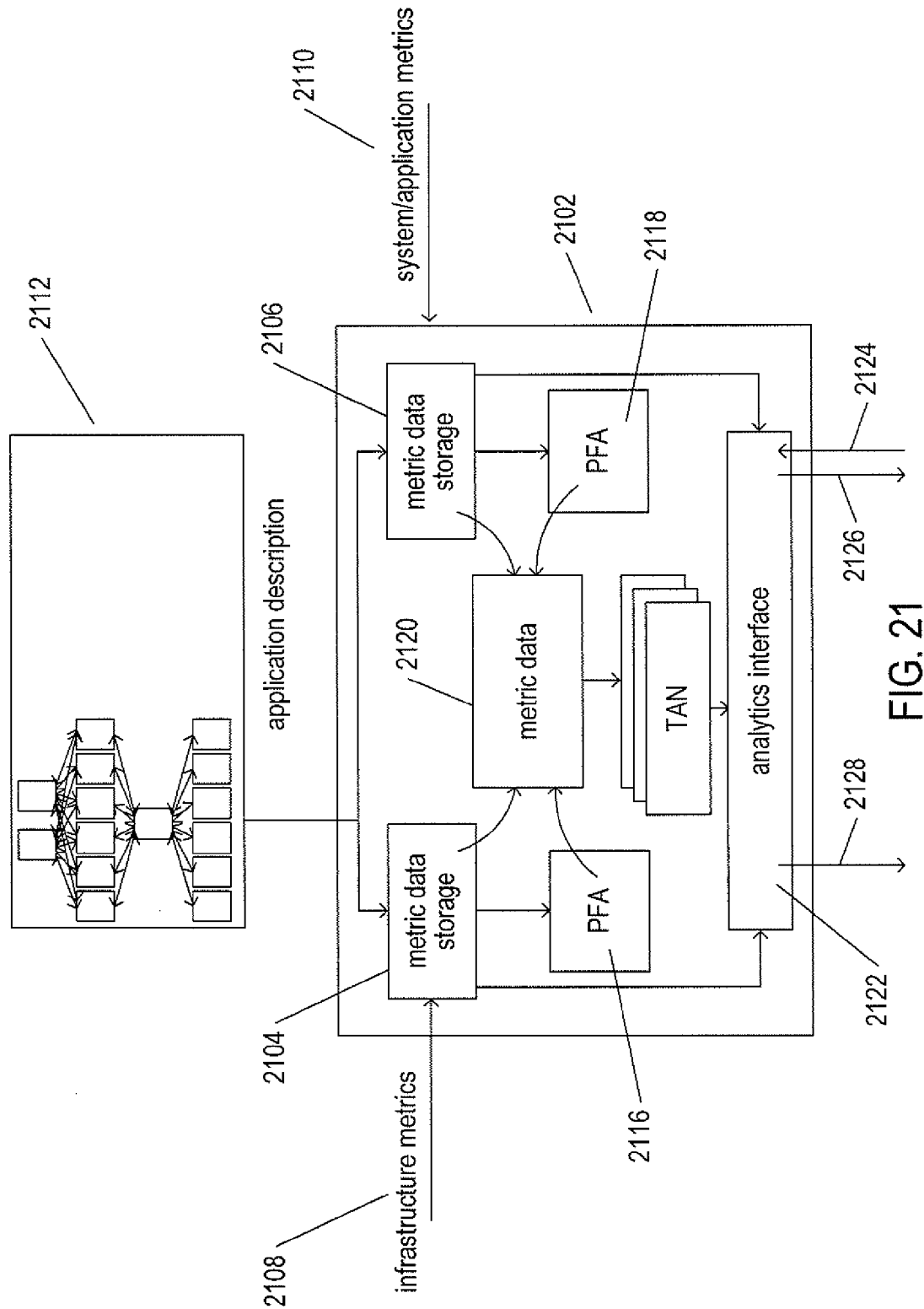

FIG. 21 illustrates one implementation of the analysis subsystem to which the current document is directed. The analysis subsystem 2102 includes metric-data storage containers 2104 and 2106 to receive metric data from each of multiple metric sources 2108 and 2110, respectively. In addition, the analysis subsystem receives an application description 2112 that describes a multi-tiered application, such as the multi-tiered application shown in FIG. 20. This description may include an indication of the topology of the multi-tiered application and identities of the various multi-tiered-application components. The application description is used to select metrics from the incoming metric streams 2108 and 2110 related to the multi-tiered application for storage in the metric-data storage containers 2104 and 2106. At regular intervals, the stored metric data is subjected to principal feature analysis 2116 and 2118 in order to determine a subset of attributes or dimensions for the received metric data, and the received metric data is then projected into the principal attributes or features and stored in a processed-metric-data storage container 2120. The analysis subsystem creates one or more TANs from the metric data stored in a processed-metric-data storage container, or updates already existing TANs, at intervals, based on the metric data in order to represent the information as a joint probability distribution. The analysis subsystem additionally includes an analytics interface 2122 that receives requests from various monitoring and diagnostic components of the VDC management server or other servers 2124 and uses the one or more TANS to generate inference-based information in response to the requests which is returned to the requestors 2126. In addition, the analytics interface may asynchronously report various types of warnings, error conditions, and deleterious states detected by the analytics interface 2128 to various management subsystems within the VDC management server.

Figure 22:
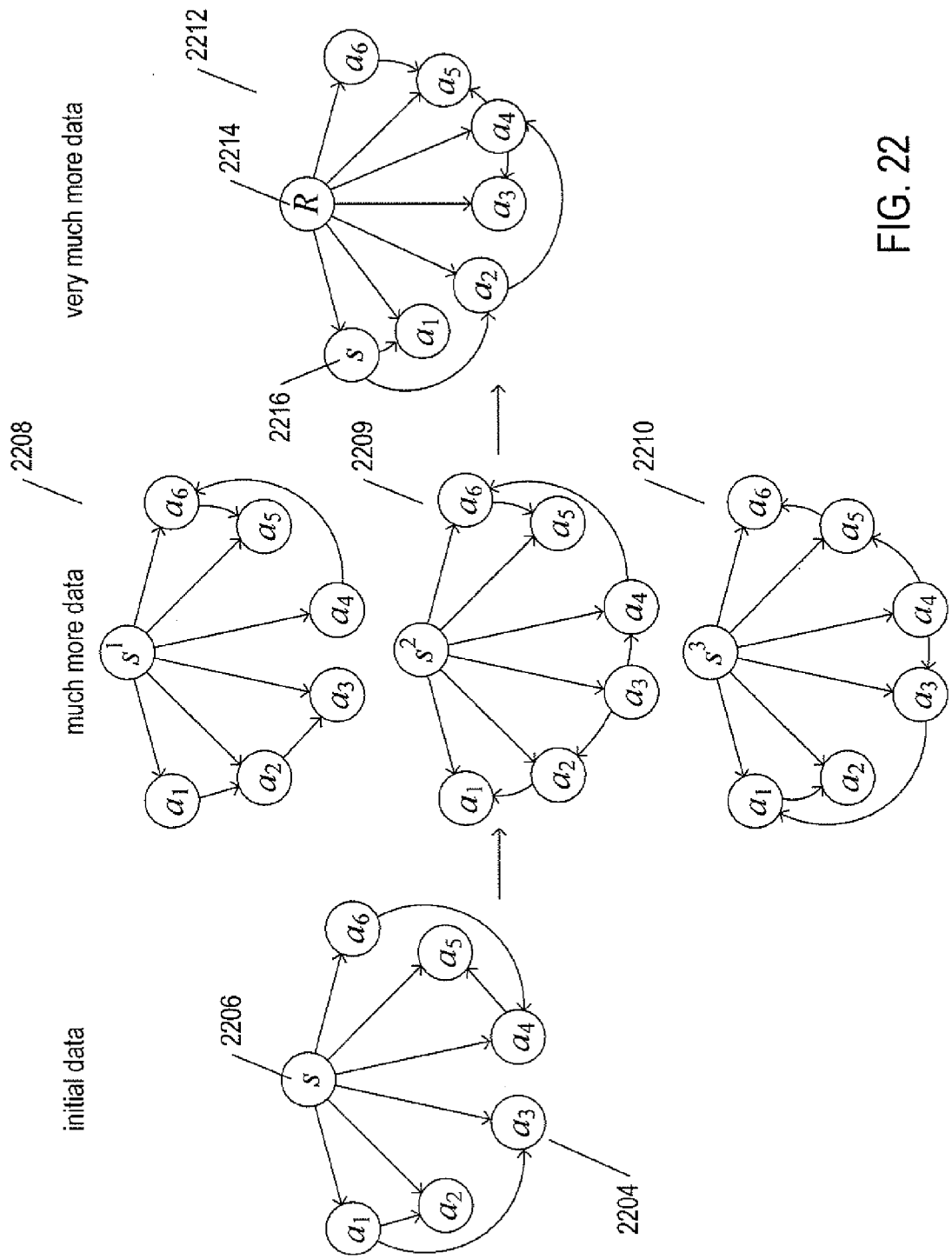

FIG. 22 illustrates a progression of conditional probability-distribution representations involving one or more TANs that may be constructed and employed by the analytics subsystem to which the current application is directed. Once a sufficient number of initial metric data is collected, following invocation of the analytic subsystem with respect to a particular multi-tiered application, the analytic subsystem prepares an initial TAN 2204. In general, the root node 2206 of the initial TAN is a special derived state or status metric, such as a service-level-objective ("SLO") violation. The principal attributes included in the TAN are those multi-tiered-application metrics that are determined to be most useful for explaining different special-metric values for the multi-tiered application, as determined by principal feature analysis. This initial TAN 2204 has many possible uses within the analysis subsystem. One use is to provide, to a management module, a list of attributes most highly correlated with, or having highest probabilities with respect to, a particular value of the special variable s. When an SLO violation occurs, a management module may provide a diagnosis interface to a system administrator that allows the system administrator to explore detailed metrics-based operational states of the multi-tiered application in order to diagnose underlying problems associated with the SLO violation. However, as discussed above, the virtual data center may generate and store values for tens of thousands, hundreds of thousands, or more attributes, which represents a far greater among of data than can be efficiently inspected and analyzed by a system administrator. Using the TAN 2204, the analytic subsystem can provide, to the management interface, a list or subset of metrics that are most highly correlated with, or generally best explain, the underlying causes of a particular SLO violation. The management interface can then display values of these metrics to the system administrator to facilitate diagnosis of underlying causes of the SLO violation. As another example, the analysis subsystem may use the TAN to identify particular metrics that have extremely low-probability values given a particular SLO violation. Such outlying metrics may have particular utility for diagnosis of a current problem, since they may represent unexpected or surprising states of various subcomponents, components, and subsystems of the multi-tiered application.

Over time, as the analytic subsystem receives and processes more and more metric data from the various metric-data sources, the analysis subsystem may accumulate a sufficient amount of the data to generate a separate TAN 2208-2210 for some or all different values of the special variable s. This represents a next phase for the analytics system. Separate TANS for particular special-variable values may provide more precise information with respect to the conditional probability distributions of the other variables given particular values of the special variable. As illustrated in FIG. 22, each of the separate TANS may feature different patterns of conditional dependencies among the non-root variables, as opposed to a single initial TAN 2204, in which the conditional dependencies are fixed over all possible special-variable values. In a final phase, after collection of large amount of additional metric data, the analysis subsystem, using feedback from the management interface, may create a root-cause TAN 2212 that features a new root-cause special variable 2214. In this case, the former special variable 2216 becomes one of the non-special variables. A root-cause TAN may be used to quickly determine the underlying causes of SLO violations or other types of undesirable system states. In this case, the analysis subsystem may compute the most probable root cause given the known values of the principal attributes included in the root-cause TAN. Of course, progression to a root-cause TAN is predicated on collection of a sufficient number of metrics and root-cause feedback from the management interface to have a sufficient sample for computing the joint probability distribution of root causes and principal-attribute values.

Figure 23A:
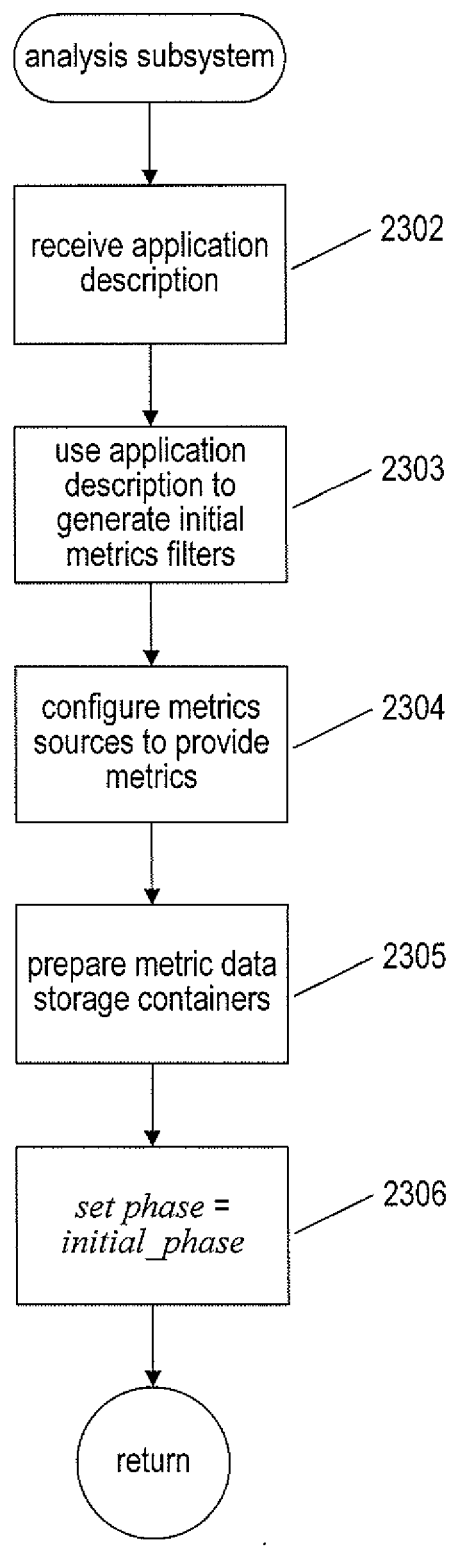
FIGS. 23A-G illustrate implementation and operation of the analysis subsystem to which the current document is directed.

FIGS. 23A-G illustrate implementation and operation of the analysis subsystem to which the current document is directed. FIG. 23A provides a control-flow diagram of analysis-subsystem initialization. In step 2302, a newly invoked analysis subsystem receives an application description of the multi-tiered application. In step 2303, the analysis subsystem uses the application description to generate initial metrics filters to filter incoming metrics from a variety of metric sources. In step 2304, the analysis subsystem configures the metrics sources to provide streams of metric data from a computational system in which the multi-tiered application executes. In step 2305, the analysis subsystem prepares metric data-storage containers for the incoming metric data extracted from metric-data streams provided by the metric-data sources. Finally, in step 2306, a variable phase is set to the value initial_phase.

Figure 23B:
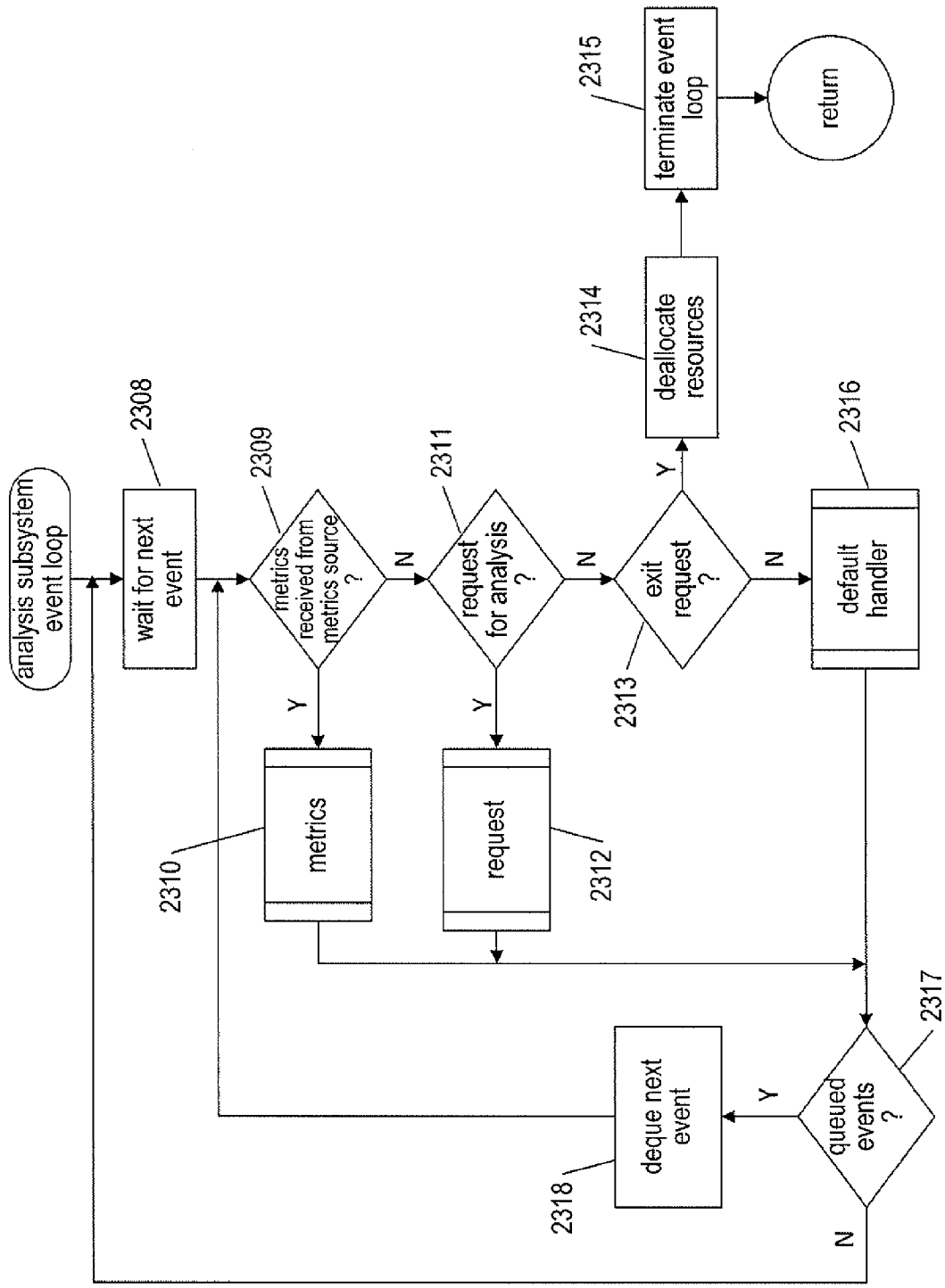

FIG. 23B illustrates an event loop that is continuously executed by the analysis subsystem following initialization. In step 2308, the analysis subsystem waits for a next event to occur. When the next-occurring event is reception of metrics from a metrics source, as determined in step 2309, the incoming metrics are handled by a call to a metrics handler 2310. When the most recently occurring event is a request for analysis, as determined in step 2311, the request is handled by a call to a request handler 2312. When the request is a request to terminate execution of the analysis subsystem, as determined in step 2313, then, in step 2314, the analysis subsystem deallocates any of various resources allocated for processing, including metric-data storage containers and other memory-resident entities and, in step 2315, terminates event-loop operation. Otherwise, a default handler is invoked, in step 2316, to handle any other types of events. After handling of a most recently occurring event, the analysis subsystem determines, in step 2317, whether there are any queued events detected while the just-handled event is being processed. If so, then a next event is dequeued from the queue, in step 2318, and control returns to step 2309. Otherwise, control returns to step 2308.

Figure 23C:
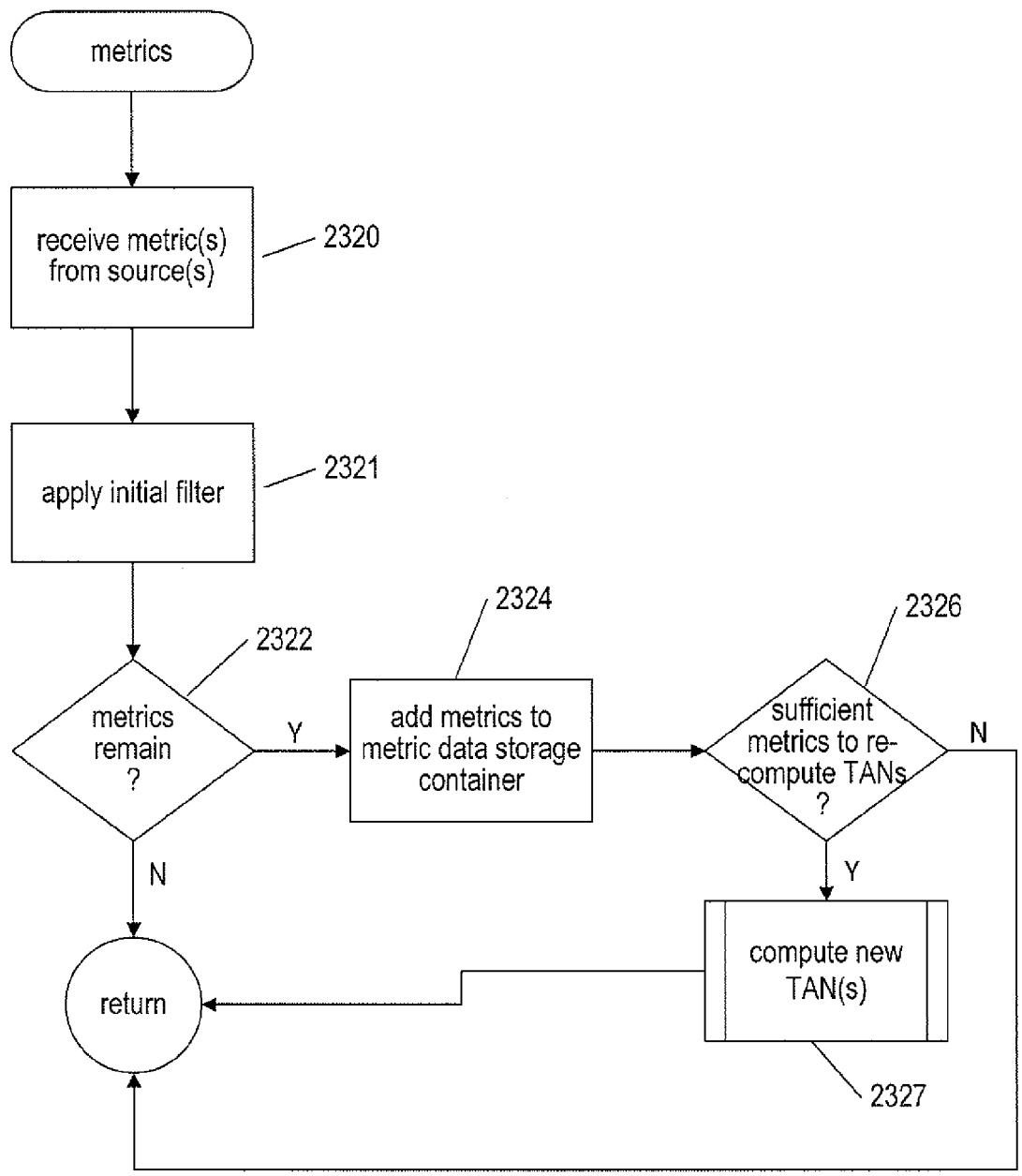

FIG. 23C shows a control-flow diagram for the metrics handler called in step 2310 of FIG. 23B. In step 2320, the metrics handler receives one or more metrics from one or more metrics sources. In step 2321, the metrics handler applies an initial filter generated during analysis-subsystem initialization from the application description to the received metric or metrics. When one or more metrics remain following filtering, as determined in step 2322, these remaining metrics are added to the metric data-storage container, in step 2324. When there are a sufficient number of metrics to recompute one or more TANs, as determined in step 2326, then the routine "compute new TANs" is called, in step 2327.

Figure 23D:
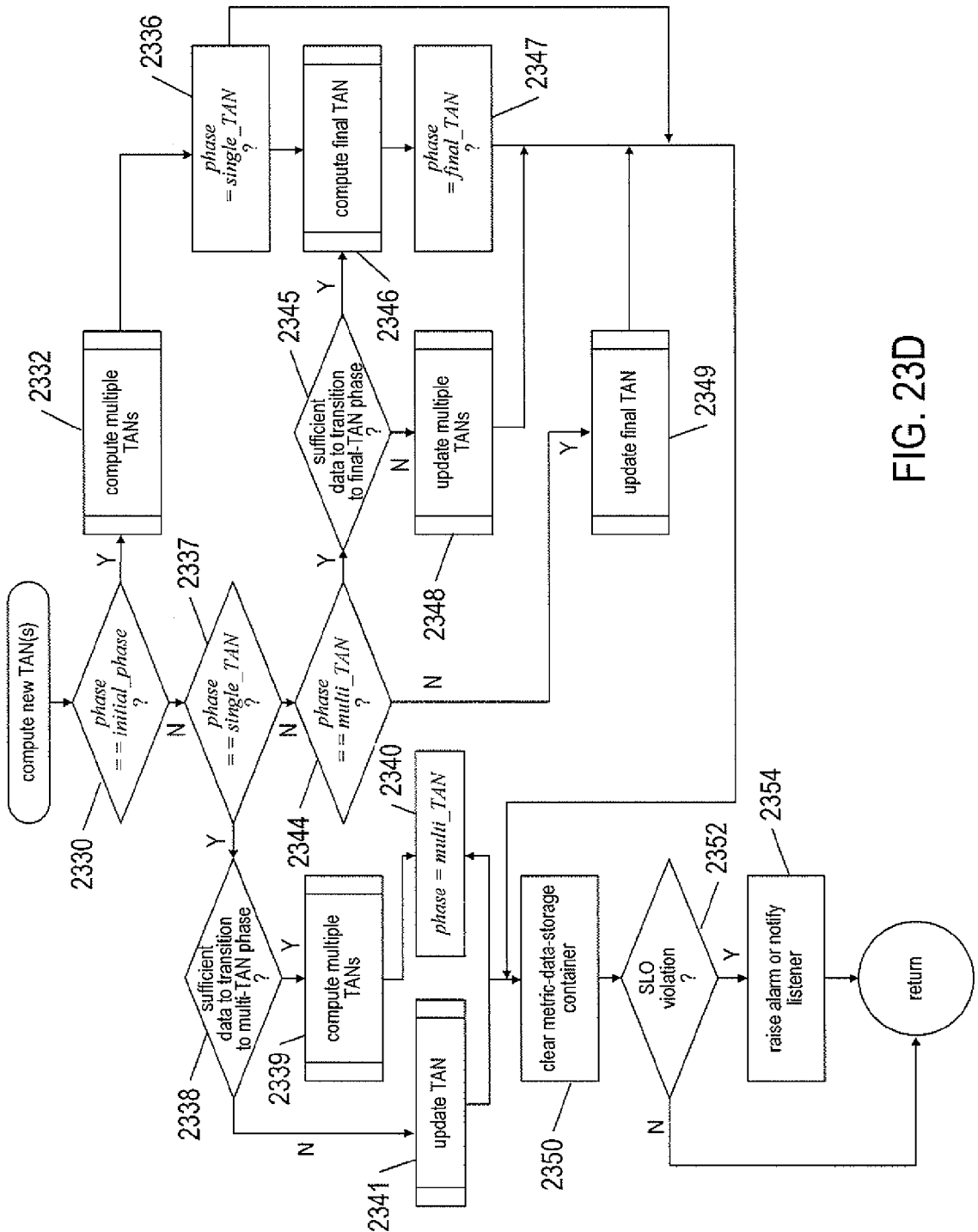

FIG. 23D provides a control-flow diagram for the routine "compute new TANs" called in step 2327 in FIG. 23C. When the value of the variable phase is initial_phase, as determined in step 2330, the routine "compute initial TAN" is called in step 2332. Following computation of the initial TAN, the variable phase is set to the value single_TAN, in step 2336. Otherwise, when the current value of the variable phase is single_TAN, as determined in step 2337, and when there is sufficient data to transition to the multi-TAN phase, as determined in step 2338, then the routine "compute multiple TANs" is called in step 2339 to compute a set of TANs as described above with reference to FIG. 22. Following computation of the multiple TANs, the value of the variable phase is set to multi_TAN in step 2340. When the value of the variable phase is single_TAN, as determined in step 2337, and there is not sufficient data to transition to the multi-TAN phase, as determined in step 2338, then the routine "update TAN" is called, in step 2341, to update the initial TAN. When the value of the variable phase is multi_TAN as determined in step 2344, and when there is sufficient data to transition to the final-TAN phase, as determined in step 2345, then, in step 2346, the routine "compute final TAN" is called to compute a root-cause TAN, as discussed above with reference to FIG. 22. Following computation of the final TAN, the variable phase is set to the value final_TAN, in step 23347. When the value of the variable phase is multi_TAN and there is insufficient data to transition to the final-TAN phase, as determined in step 2345, then the routine "update multiple TANs" is called, in step 2348 to update the multiple TANs based on the data in the metric-data-storage containers. When the value of the variable phase is final_TAN, then the routine "update final TAN" is called in step 2349. Following processing of the data stored in the metric-data-storage containers, the metric-data-storage containers are cleared, in step 2350. When, as determined in step 2352, when there is an SLO violation, as determined from the current state of the system, the analytics subsystem raises an alarm or notifies a listening entity in step 2354, in certain implementations.

In the currently described implementation, the analysis subsystem either maintains a single TAN, multiple TANs, or a final root-cause TAN. In alternative embodiments, the analysis subsystem may continue to maintain an initially created single TAN and multiple TANs as it transitions between phases, in order to be able to respond to many different types of information requests.

Figure 23E:
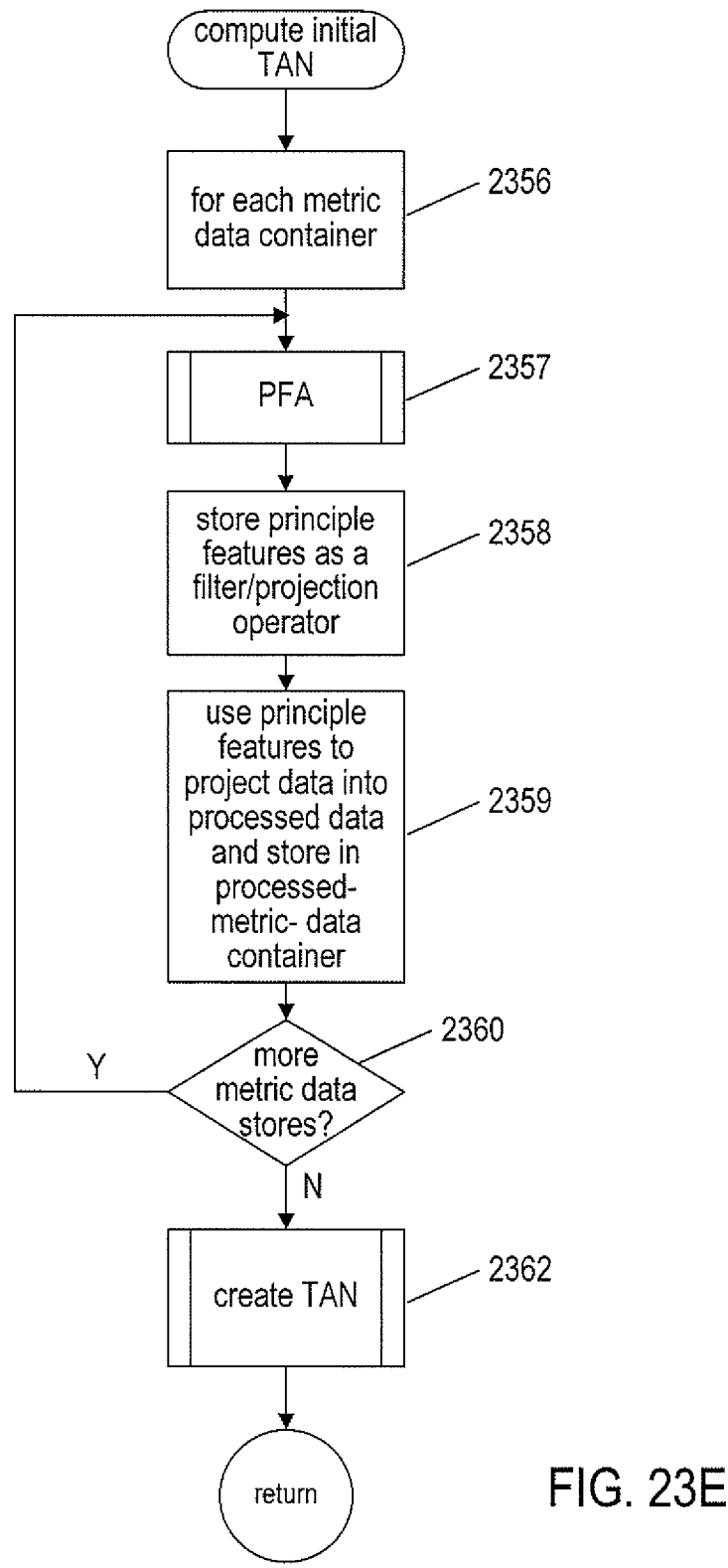

FIG. 23E shows a control-flow diagram for the routine "compute initial TAN" called in step 2332 of FIG. 23D. In the for-loop of steps 2356-2360, each metric-data container associated with a particular metric-data source is processed by applying principal feature analysis, in step 2357, storing the determined principal features as a filter/projection operator in step 2358, and using the filter/projection operator, in step 2359, to project the metric data into processed data that is stored in the processed-metric-data container for updating or constructing TANs. Then, in step 2362, a TAN is created from the data stored in the processed-metric-data container by the TAN-creation method discussed above with reference to FIGS. 18A-E. Similar procedures are carried out for creation of multiple TANs and the final TAN.

Figure 23F:
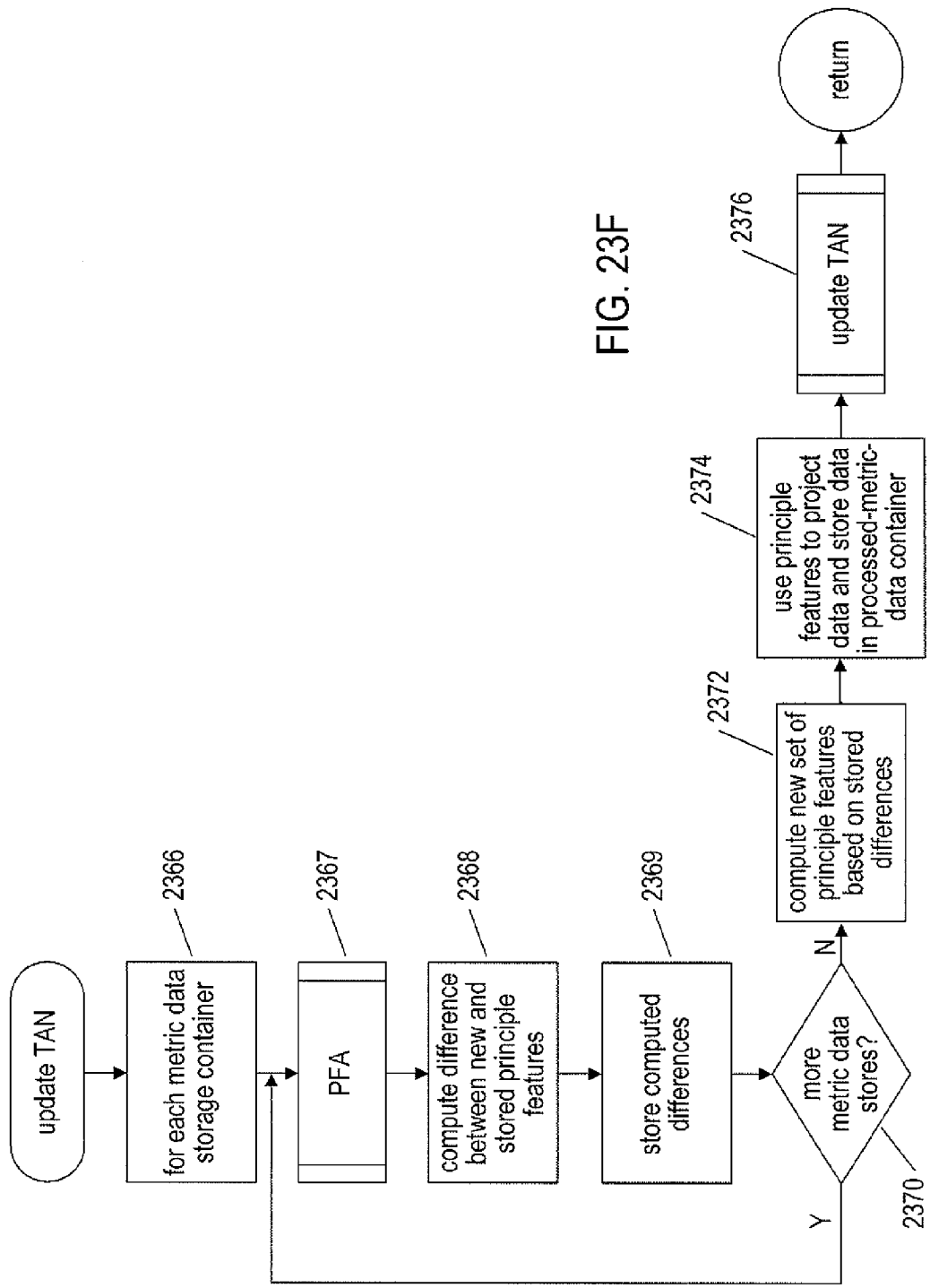

FIG. 23F provides a control-flow diagram for the routine "update TAN" called in step 2341 of FIG. 23D. In the for-loop of steps 2366-2370, each metric-data container associated with a metric-data source is processed by carrying out principal feature analysis, in step 2367, computing a difference between a newly computed principal features and previously computed principal features, in step 2368, and storing the newly computed difference in step 2369. Following completion of processing of the metric-data-storage containers associated with metric sources, a new set of principal features is computed based on the stored differences, in step 2372 and these new principal features are used to project and store the data stored in the metric-data storage containers into the processed-metric-data container, in step 2374. Then, in step 2376, a currently existing TAN is updated based on the data stored in the processed-metric-data container. In the case that the feature set does not change, update of the TAN involves re-computation of the conditional-probability distributions associated with nodes based on the new data. Otherwise, certain nodes of the pre-existing TAN may be removed and new nodes added followed by re-computation of the conditional probability distributions associated with the nodes.

Figure 23G:
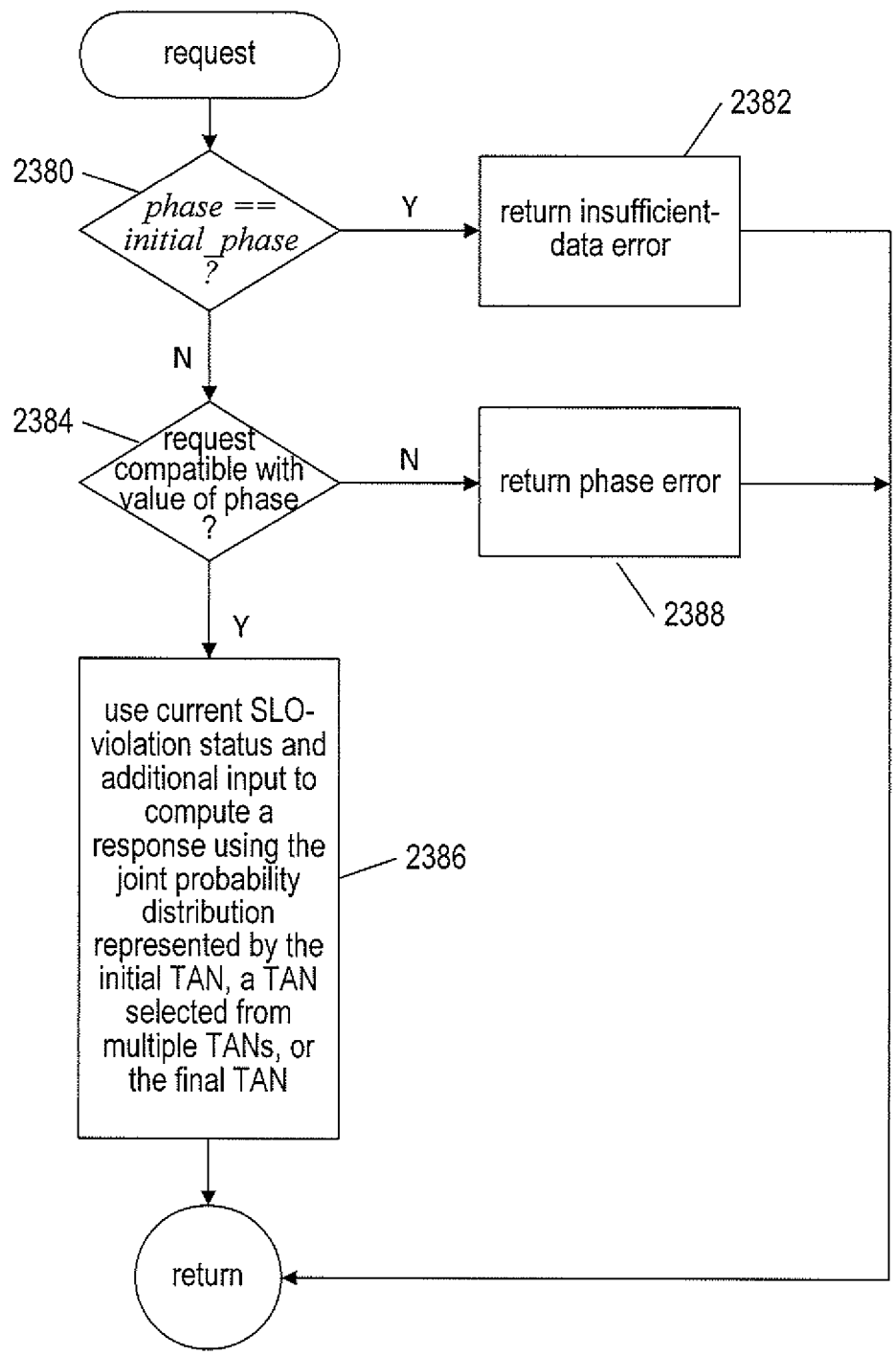

FIG. 23G provides a control-flow diagram for the request handler called in step 2310 of FIG. 23B. When the value of the variable phase is initial_phase, as determined in step 2380, the handler returns, to the requesting entity, an indication of insufficient data to handle the request in step 2382. Otherwise, when the request is compatible with the current value of the variable phase, as determined in step 2384, then, in step 2386, the analysis subsystem uses the current SLO-violation status for the multi-tiered application and additional input to compute a response using the joint probability distribution represented by the initial TAN, a TAN selected from multiple TANs, or the final TAN, and returns the response to the requesting entity in step 2386. Otherwise, a phase error is returned in step 2388. Many different types of requests can be processed by the analytics subsystem, as indicated above, the analytic subsystem may return a list of attributes most strongly correlated with an SLO violation, in order to facilitate diagnosis of the SLO violation by a system administrator working through a management interface of the VDC server. Alternatively, the analysis subsystem may return a list of attributes with most unexpected values given the current SLO violation. In yet other cases, the analysis subsystem may employ a final TAN to return the most probable underlying causes for a current SLO violation. A myriad of additional types of requests may be handled, involving many different types of inferences made possible by one or more TANs created and maintained by the analysis subsystem.

Although the present invention has been described in terms of particular embodiments, it is not intended that the invention be limited to these embodiments. Modifications within the spirit of the invention will be apparent to those skilled in the art. For example, many different analysis-subsystem implementations can be obtained by varying any of many different design and development parameters, including virtualization layer, operating system, modular organization, programming language, control structures, data structures, server hardware, hardware modification, and other such design and development parameters. A variety of different techniques may be used to perform principal feature analysis and to construct and make inferences based on one or more TANs. In alternative implementations, general Bayesian networks, naïve Bayesian networks, or compromise-type Bayesian networks with more conditional dependencies than in a TAN may alternatively be employed as the basis for inference.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. An analysis subsystem that monitors a multi-tiered application within a distributed computing system, the analysis subsystem comprising:
   one or more processors;
   one or more memories;
   one or more mass-storage devices;
   communications subsystems that allow the analysis subsystem to communicate with external servers and other computational entities;
   metric-data storage containers, implemented within one or more of the one or more memories and one or more mass-storage devices, that store metric data; and
   computer instructions, stored in one or more of the one or more memories that, when executed by the one or more processors, control the analysis subsystem to
      collect infrastructure metrics from one or more infrastructure metrics sources in one or more metric-data storage containers,
      collect system and application metrics from one or more system and application metrics sources in one or more metric-data storage containers,
      process the collected infrastructure, system, and application metrics to select a subset of the infrastructure, system, and application metrics relevant to the multi-tiered application that are then stored in one or more metric-data storage containers,
      use the selected subset of the infrastructure, system, and application metrics to generate a representation of a conditional probability distribution for the selected subset of the infrastructure, system, and application metrics, and
      use the representation of the conditional probability distribution for the selected subset of the infrastructure, system, and application metrics to generate data for transmission to, and storage within, one or more of diagnostics, management, and monitoring subsystems.

2. The analysis subsystem of claim 1 wherein infrastructure metrics include one or more of:
   metrics that represent mappings of virtual machines to servers within the distributed computing system;
   metrics that represent virtual-machine utilizations of distributed-computing-system storage resources; and
   metrics that represent virtual-machine utilizations of distributed-computing-system network resources.

3. The analysis subsystem of claim 1 wherein system metrics include one or more of:
   metrics that represent CPU utilization;
   metrics that represent memory utilization; and
   metrics that represent storage utilization.

4. The analysis subsystem of claim 1 wherein application metrics include one or more of:
   metrics that represent latency in application responses to requests;
   metrics that represent throughput of requests to the application; and
   metrics that represent that number of accesses to resources per unit period of time.

5. The analysis subsystem of claim 1 wherein the infrastructure metrics sources include:
   an operations monitor running within an operations server; and
   an operations monitor running within a distributed-computing-system management server.

6. The analysis subsystem of claim 1 wherein system and application metrics sources include:
   a Hyperic server that collects system and application metrics from Hyperic agents within application servers;
   a system monitor running within a management server; and
   an application monitor running within a management server.

7. The analysis subsystem of claim 1 wherein the analysis subsystem processes the collected infrastructure, system, and application metrics to select a subset of the infrastructure, system, and application metrics relevant to the multi-tiered application by carrying out principle feature analysis.

8. The analysis subsystem of claim 7 wherein principle feature analysis comprises:
   collecting n metric row vectors $X_1, X_2, \ldots, X_n$, each of dimension p, into a matrix X;
   constructing a column vector u with p entries, each entry of vector u including a numeric mean of the entries in a column of the matrix X;
   transposing the column vector u to a row vector and multiplying the row vector with a column vector containing all "1" entries to produce a matrix M;
   subtracting the matrix M from the matrix X to produce s matrix B containing mean-subtracted metric data;
   multiplying the matrix B with the transpose of matrix B, $B^T$, and multiplying the resulting p×p matrix by $$\frac{1}{n-1}$$

to produce a covariance matrix C;
   determining eigenvalues $\lambda_1, \lambda_2, \ldots, \lambda_p$ and eigenvectors $v_1, v_2, \ldots, v_p$ of the covariance matrix C;
   combining the eigenvectors together to produce a matrix V;
   using the matrix V to diagonalize the covariance matrix C to produce the diagonal matrix D having values along the diagonal that are the eigenvalues of the covariance matrix;
   rearranging the eigenvalues in order of decreasing magnitude, with the corresponding eigenvectors identically rearranged, to produce matrices D' and V';
   using the matrix D' to choose a value q as the dimension of the subset of the metric data generated by principal feature analysis;
   selecting the first q columns of matrix V' to form the p×q matrix $A_q$;
   selecting p q-dimensional rows $v_1, v_2, \ldots, v_p$ from the matrix $A_q$;
   using k-means clustering to cluster the selected rows of matrix $A_q$ into r clusters, where p>r>q; and
   selecting the q-dimensional vectors closest to the centroids of each cluster as the features for lower-dimensional metric vectors that together form the metric-data subset generated by the principal feature analysis.

9. The analysis subsystem of claim 8 wherein using the matrix D' to choose a value q as the dimension of the subset of the metric data generated by principal feature analysis further comprises:
defining a value $g_j$ as the sum of the values along the diagonal of matrix D' down to and including the $j^{th}$ eigenvalue $\lambda'_j$; and
choosing a value q so that $g_q$ is greater than or equal to a threshold percentage times $g_p$.

10. The analysis subsystem of claim 8 wherein k-means clustering comprises:
selecting r vectors from the p q-dimensional vectors $v_1, v_2, \ldots, v_p$ selected from the matrix $A_q$ as representative vectors for r clusters that are used as the initial centroids for the clusters; and
iteratively reconstructing the r clusters until there is no change in cluster membership from the most recently constructed set of clusters and the previous set of clusters by
assigning each unassigned vector to a cluster with a centroid closest to the unassigned vector, and
computing a new centroid for each cluster in step.

11. The analysis subsystem of claim 1 wherein the representation of a conditional probability distribution for the selected subset of the infrastructure, system, and application metrics comprises one or more Bayesian networks selected from among:
Bayesian networks,
naive Bayesian networks;
tree-augmented naive Bayesian networks; and
Bayesian, naive Bayesian, or tree-augmented naive Bayesian networks augmented with additional information.

12. The analysis subsystem of claim 11 wherein a tree-augmented naive Bayesian network includes:
a first node representing a special independent metric;
additional nodes each representing a metric that is conditionally dependent on the first node and conditionally dependent on at most one other of the additional nodes; and
directed edges representing conditional dependencies.

13. The analysis subsystem of claim 11 wherein a tree-augmented naive Bayesian network is constructed from the selected subset of the infrastructure, system, and application metrics relevant to the multi-tiered application, represented as a set of metric vectors, by:
generating a mutual conditional information matrix from the metric vectors;representing all but the special independent metric by nodes;
fully interconnecting the nodes by undirected edges to form a fully connected graph, each edge in the graph associated with the mutual conditional information computed for the nodes connected by the edge;
generating a spanning tree with maximum weight from the fully connected graph;
selecting one of the nodes as a root node;
assigning directions to the edges of the spanning tree emanating out and away from the root node; and
introducing a node for the special metric and directly connecting the special-metric node by directed edges to every other node.

14. The analysis subsystem of claim 11 wherein the analysis subsystem initially creates a single tree-augmented naive Bayesian network with a special metric corresponding to a service-level-objective-violation metric.

15. The analysis subsystem of claim 14 wherein, as more metric data is collected and processed by the analysis subsystem, the analysis subsystem creates multiple tree-augmented naive Bayesian networks, each with a special metric corresponding to a particular service-level-objective violation.

16. The analysis subsystem of claim 14 wherein, as more metric data is collected and processed by the analysis subsystem, the analysis subsystem creates a root-cause multiple tree-augmented naive Bayesian network with a special metric corresponding to a particular root cause.

17. A method carried out by an analysis subsystem that monitors a multi-tiered application within a distributed computing system, the analysis subsystem having one or more processors, one or more memories, one or more mass-storage devices, communications subsystems that allow the analysis subsystem to communicate with external servers and other computational entities, and metric-data storage containers, implemented within one or more of the one or more memories and one or more mass-storage devices, the method comprising:
collecting infrastructure metrics from one or more infrastructure metrics sources in one or more metric-data storage containers,
collecting system and application metrics from one or more system and application metrics sources in one or more metric-data storage containers,
processing the collected infrastructure, system, and application metrics to select a subset of the infrastructure, system, and application metrics relevant to the multi-tiered application that are then stored in one or more metric-data storage containers,
using the selected subset of the infrastructure, system, and application metrics to generate a representation of a conditional probability distribution for the selected subset of the infrastructure, system, and application metrics, and
using the representation of the conditional probability distribution for the selected subset of the infrastructure, system, and application metrics to generate data for transmission to, and storage within, one or more of diagnostics, management, and monitoring subsystems.

18. The method of claim 17 wherein:
infrastructure metrics include one or more of
metrics that represent mappings of virtual machines to servers within the distributed computing system,
metrics that represent virtual-machine utilizations of distributed-computing-system storage resources,
metrics that represent virtual-machine utilizations of distributed-computing-system network resources;
system metrics include one or more of
metrics that represent CPU utilization,
metrics that represent memory utilization, and
metrics that represent storage utilization; and
application metrics include one or more of
metrics that represent latency in application responses to requests,
metrics that represent throughput of requests to the application, and
metrics that represent that number of accesses to resources per unit period of time.

19. The method of claim 17 further comprising processing the collected infrastructure, system, and application metrics to select a subset of the infrastructure, system, and application metrics relevant to the multi-tiered application by carrying out principle feature analysis.

20. The method of claim 17 wherein the representation of a conditional probability distribution for the selected subset of the infrastructure, system, and application metrics comprises one or more Bayesian networks selected from among:
- Bayesian networks,
- naive Bayesian networks;
- tree-augmented naive Bayesian networks; and
- Bayesian, naive Bayesian, or tree-augmented naive Bayesian networks augmented with additional information.

21. A physical data-storage device encoded with computer instructions that, when executed by the one or more processors of an analysis subsystem that monitors a multi-tiered application within a distributed computing system, the analysis subsystem having the one or more processors, one or more memories, one or more mass-storage devices, communications subsystems that allow the analysis subsystem to communicate with external servers and other computational entities, and metric-data storage containers, implemented within one or more of the one or more memories and one or more mass-storage devices, control the analysis subsystem to
- collect infrastructure metrics from one or more infrastructure metrics sources in one or more metric-data storage containers;
- collect system and application metrics from one or more system and application metrics sources in one or more metric-data storage containers;
- process the collected infrastructure, system, and application metrics to select a subset of the infrastructure, system, and application metrics relevant to the multi-tiered application that are then stored in one or more metric-data storage containers;
- use the selected subset of the infrastructure, system, and application metrics to generate a representation of a conditional probability distribution for the selected subset of the infrastructure, system, and application metrics; and
- use the representation of the conditional probability distribution for the selected subset of the infrastructure, system, and application metrics to generate data for transmission to, and storage within, one or more of diagnostics, management, and monitoring subsystems.

* * * * *